US012585134B2

(12) United States Patent
Teng et al.

(10) Patent No.: US 12,585,134 B2
(45) Date of Patent: Mar. 24, 2026

(54) DISPLAY MODULE WITH THE DIVERGENCE ANGLE OF OUTGOING BEAM CONSTRAINED AGAIN BY THE CORRESPONDING DEFLECTION APERTURE

(71) Applicant: SUN YAT-SEN UNIVERSITY, Guangdong (CN)

(72) Inventors: Dongdong Teng, Guangdong (CN); Lilin Liu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 17/367,445

(22) Filed: Jul. 5, 2021

(65) Prior Publication Data
US 2022/0229308 A1 Jul. 21, 2022

(30) Foreign Application Priority Data
Jan. 15, 2021 (CN) .......................... 202110056403.8

(51) Int. Cl.
G02B 27/22 (2018.01)
G02B 27/12 (2006.01)
(Continued)

(52) U.S. Cl.
CPC ........... G02B 27/123 (2013.01); G02B 27/18 (2013.01); G02B 30/30 (2020.01); H04N 13/10 (2018.05); H04N 13/363 (2018.05)

(58) Field of Classification Search
CPC ........ G02B 30/27; G02B 30/30; G02B 30/23; G02B 30/25; G02B 27/18; H04N 13/363; H04N 13/32
(Continued)

(56) References Cited

U.S. PATENT DOCUMENTS 5,745,266 A * 4/1998 Smith .................. G02B 5/3083
359/13
5,917,562 A * 6/1999 Woodgate .............. H04N 13/38
348/E13.043
(Continued)

FOREIGN PATENT DOCUMENTS

CN 109782453 5/2019

OTHER PUBLICATIONS

R. Häussler et al., "Large real-time holographic 3D displays: enabling components and results," Applied Optics, vol. 56, No. 13, May 1, 2017, pp. F45-F52.

*Primary Examiner* — Audrey Y Chang
(74) *Attorney, Agent, or Firm* — MUNCY, GEISSLER, OLDS & LOWE, P.C.

(57) ABSTRACT

The invention discloses a display module with the divergence angle of an outgoing beam constrained again by the corresponding deflection aperture, which includes a multi-view display structure, a deflection-aperture array and a control device. The multi-view display structure includes a display screen, a light-splitting device, and a backlight-source assembly for providing backlights when a backlit-type display screen is adopted. The light-splitting device guides light beams from each group of pixels or sub-pixels to the corresponding viewing zone. A deflection aperture with a small size is designed for constraining the divergence angle of deflected light beams. Multiple deflection apertures play the function of enlarging the field of view, which is very limited when only a single deflection aperture exists. With orthogonal characteristics being assigned to deflection apertures for suppressing noise and/or for projecting more views, three-dimensional display with natural focus will get implemented with large field of view and low noises.

13 Claims, 40 Drawing Sheets

(51) Int. Cl.
     *G02B 27/18*        (2006.01)
     *G02B 30/30*        (2020.01)
     *H04N 13/10*        (2018.01)
     *H04N 13/363*      (2018.01)

(58) Field of Classification Search
     USPC ....................................... 359/463, 630, 464
     See application file for complete search history.

(56)              References Cited

U.S. PATENT DOCUMENTS

| 6,134,051 | A | * | 10/2000 | Hayakawa | ........... | G02B 17/086 |
| | | | | | | 359/640 |
| 7,116,477 | B2 | * | 10/2006 | Nishihara | .............. | G02B 30/27 |
| | | | | | | 359/464 |
| 11,012,673 | B2 | | 5/2021 | Liu et al. | | |
| 2003/0197933 | A1 | * | 10/2003 | Sudo | ...................... | H04N 13/31 |
| | | | | | | 359/464 |
| 2010/0238529 | A1 | * | 9/2010 | Sampsell | ............. | G03H 1/0408 |
| | | | | | | 359/25 |
| 2010/0245406 | A1 | * | 9/2010 | Redert | ................... | H04N 13/32 |
| | | | | | | 348/E13.001 |
| 2014/0253843 | A1 | * | 9/2014 | Kanno | ................. | G02B 5/0278 |
| | | | | | | 349/62 |
| 2017/0034504 | A1 | * | 2/2017 | Bui | ........................ | H04N 13/32 |

* cited by examiner $VZ_9(t+2\Delta t/3)$ $VZ_8(t+\Delta t/3)$ $VZ_7(t)$ $VZ_6(t+2\Delta t/3)$ $VZ_5(t+\Delta t/3)$ $VZ_4(t)$ $VZ_3(t+2\Delta t/3)$ $VZ_2(t+\Delta t/3)$ $VZ_1(t)$ $P_{VZ}$ $VZ_9(t+2\Delta t/3)$ $VZ_8(t+2\Delta t/3)$ $VZ_7(t+2\Delta t/3)$ $VZ_6(t+\Delta t/3)$ $VZ_5(t+\Delta t/3)$ $VZ_4(t+\Delta t/3)$ $VZ_3(t)$ $VZ_2(t)$ $VZ_1(t)$ $P_{VZ}$

FIG. 39

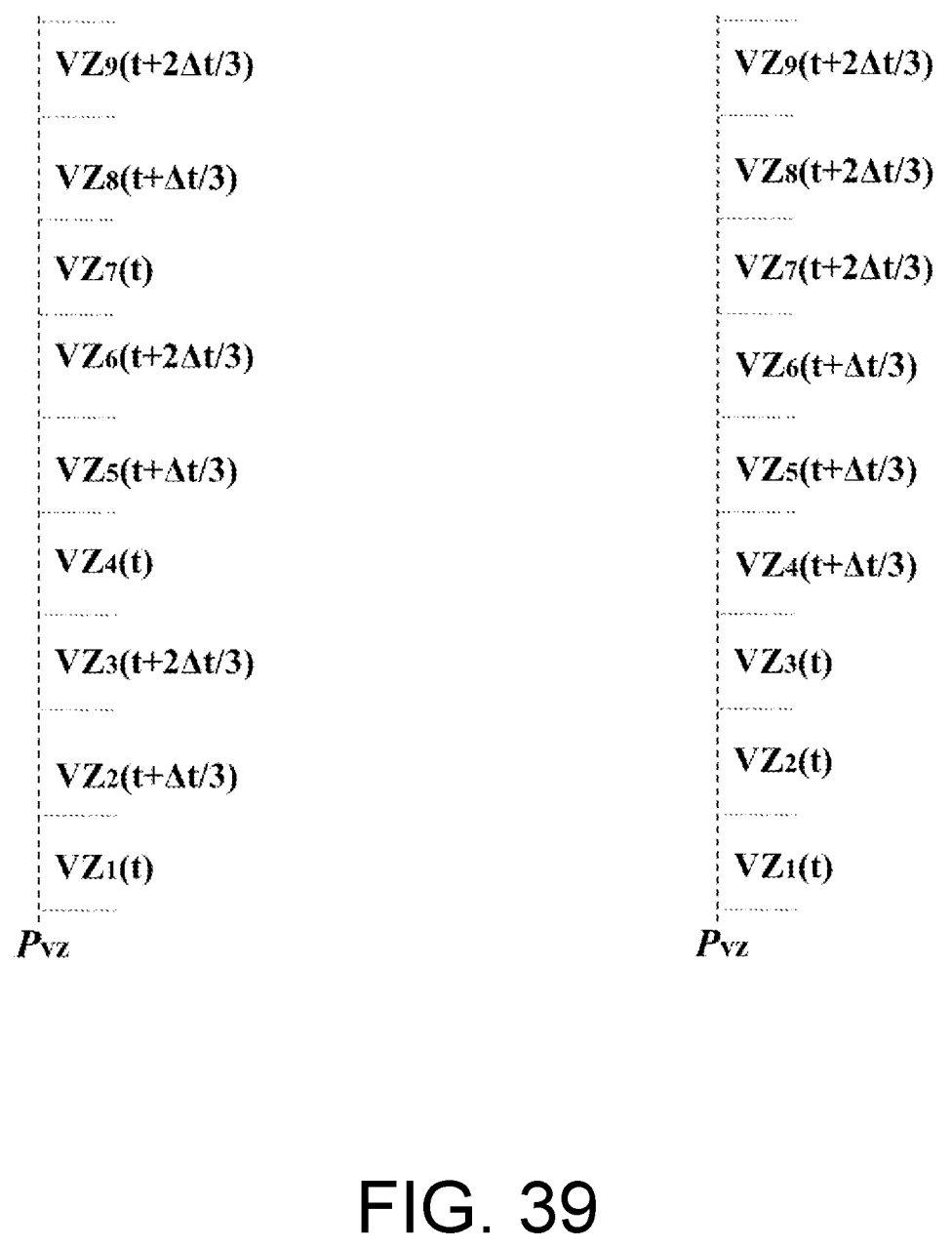

DISPLAY MODULE WITH THE DIVERGENCE ANGLE OF OUTGOING BEAM CONSTRAINED AGAIN BY THE CORRESPONDING DEFLECTION APERTURE

CROSS REFERENCE TO RELATED APPLICATION

This application claims the priority benefit of China application serial no. 202110056403.8 filed Jan. 15, 2021. The entirety of the above-mentioned patent application is hereby incorporated by reference herein and made a part of the specification.

TECHNICAL FIELD

The present invention relates to the field of three-dimensional display technology, and more particularly, to a display module with the divergence angle of an outgoing beam constrained again by a corresponding deflection aperture.

BACKGROUND

As a potential new-generation mobile terminal platform, Virtual Reality (VR)/Augmented Reality (AR) predicts a wide application prospect. However, most existing VR/AR systems display three-dimensional scenes based on conventional stereoscopic technology. Through projecting a two-dimensional image to each eye of the viewer respectively, the depth perception of the viewer is triggered by spatial intersection of the visual directions of the viewer's two eyes. In this process, an eye of the viewer needs to keep focusing on the display screen to see the corresponding two-dimensional image clearly. Thereby, an inconsistency between the focusing depth of an eye and the converging depth of the viewer's two eyes, i.e., vergence accommodation conflict (VAC) problem exists. This inconsistency brings visual discomfort to the viewer, particularly in the case of near-eye display, which is a bottleneck problem for the popularization and application of three-dimensional displays.

Currently, efforts are paid to find ways of pushing this bottleneck problem away. Maxwellian view and More-than-one-views-for-an-eye are two most feasible technique routes. The former takes small-size apertures as observing windows for each eye of the viewer, which reduces the divergence angle of a beam perceived by the eye. Thus, a small light intensity gradient of a beam along the depth direction reduces the relative traction force of the pixel who exits this beam to the eye's focus. Then the converging effect of the two eyes will pull the focus of an eye to the converging depth, settling the VAC problem in a certain depth range. More-than-one-views-for-an-eye technology projects different views through different segments of a pupil, to guarantee that, to a displayed point, at least two passing-through beams along different directions being perceived by the pupil of a same eye. When the light distribution of the superimposed point has stronger focus traction ability than the related pixel's light distribution, the focus of the eye will be dragged to the displayed point for VAC-free display. The More-than-one-views-for-an-eye technology has often been used for comfortable visual effect. For example, in Chinese Patent "A three-dimensional display method by More-than-one-views-for-an-eye", with Patent Publication No. CN109782453A and Publication date 2019 May 21, based on multi-view display structure with limited number of viewing zones, a projection lens was inserted between the displayed view and the viewing zones of a multi-view display structure. The projection lens was designed to enlarge the displayed views and reduce the interval between adjacent viewing zones, so to guarantee that two or more views can reach to a same eye through small-interval viewing zones.

SUMMARY OF THE INVENTION

The present invention is designed for a VAC-free display module by Maxwellian view or/and More-than-one-views-for-an-eye technologies. Here, a multi-view display structure is employed to project multiple views to different viewing zones through a light-splitting device. A small-size deflection aperture corresponding to a viewing zone is designed to guide beams from the multi-view display structure to the eye with small divergence angles. Multiple deflection apertures corresponding to different viewing zones are designed to enlarge the field of view, which is small when only one deflection aperture exists.

The present invention provides a display module with a divergence angle of an outgoing beam constrained again by a corresponding deflection aperture, comprising:

a multi-view display structure arranged for an eye of a viewer, comprising a display screen and a light-splitting device;

wherein the light-splitting device guides light beams from different pixel or subpixel groups on the display screen to corresponding viewing zones, respectively, and pixels or subpixels of a same group are arranged throughout the display screen;

a deflection-aperture array composed of deflection apertures, which respectively correspond to different viewing zones;

wherein, each deflection aperture guides the projected light beams from the corresponding pixel or subpixel group, which corresponds to the viewing zone being corresponded by this deflection aperture, to transmit to the observing zone for the eye through deflecting an incident light beam, and an orthogonal projection of each deflection aperture on a plane perpendicular to the eye's corresponding visual direction is smaller than 2.5 mm along all directions;

a control device connected with the multi-view display structure for controlling an light information loading of the display screen, wherein the light information loaded by each pixel or subpixel of the display screen at a time point is the projection light information of the scene to be displayed along the reverse direction of its projection direction;

wherein, the projection direction of a pixel or subpixel is the propagation direction of the light beam projected by the pixel or subpixel and entering the observing zone for the eye;

the display module with the divergence angle of the outgoing beam constrained again by the corresponding deflection aperture is designed to guarantee that, for each displayed object point, at least one passing-through beam entering the pupil of the eye.

Furthermore, the display screen of the multi-view display structure is a backlit-type display device, with backlights provided by a backlight-source assembly.

Furthermore, the light-splitting device is an one-dimensional grating consisting of strip-like grating units, which is arranged to guide light beams from the display screen to generate one-dimensional distributed strip-like view zones by light splitting.

Furthermore, the light-splitting device is a lenticular grating or a slit grating.

Furthermore, the light-splitting device is a microstructure array composed of microstructures, which correspond to the pixels or the subpixels of display screen in an one-to-one manner;

wherein, each microstructure deflects the propagation direction of the incident or exit beam to or from the corresponding pixel or subpixel, and thus guides light beams from a pixel or subpixel group to the corresponding viewing zone.

Furthermore, the light-splitting device is a converging structure;

wherein, the display screen is a backlit-type display device, a backlight-source assembly projects a plurality of backlights sequentially, and the light-splitting device converges backlights to respective corresponding viewing zones.

Furthermore, the display screen is a backlit-type display device and a backlight-source assembly providing a plurality of backlights to the display screen is of an optical waveguide structure;

wherein, the backlight-source assembly projects backlights along different directions at M time-points of a time period respectively, where $M \geq 2$.

Furthermore, the backlight-source assembly includes a light source, a collimating device, an entrance pupil, an optical waveguide body, a coupling-in device reflective surfaces, a coupling-out device, an exit pupil, and a timing deflector;

wherein, the exit light from the light source is collimated by the collimating device, then enters the coupling-in device through the entrance pupil; the coupling-in device guides the light in the optical waveguide body to the coupling-out device, by reflections of the reflection surfaces; the coupling-out device makes the light be coupled out of the optical waveguide body through the exit pupil at a parallel state; the timing deflector time-sequentially deflects the incident light from the exit pupil under the control of the control device, to provide backlights along different directions.

Furthermore, the backlight-source assembly includes multiple timing light sources which time-sequentially turned on under the control of the control device, a collimating device, an entrance pupil, an optical waveguide body, a coupling-in device, reflective surfaces, a coupling-out device, and an exit pupil;

wherein, a light exiting from a light source is collimated by the collimating device, then enters the coupling-in device through the entrance pupil; the coupling-in device guides the light in the optical waveguide body to the coupling-out device 1037, by reflections of the reflection surfaces; the coupling-out device makes the light be coupled out of the optical waveguide body through the exit pupil at a parallel state.

Furthermore, the display screen is attached with a unidirectional scattering film for scattering incident or exit light to or from a pixel or subpixel along an one-dimensional direction.

Furthermore, a converging device is located in front of or behind the display screen for converging the incident light.

Furthermore, deflection apertures respectively corresponding to adjacent viewing zones only allow lights with different orthogonal characteristics to be deflected out;

wherein, a pixel or subpixel group only projects light of an orthogonal characteristics capable of being deflected out by the corresponding deflection aperture.

Furthermore, the deflection aperture corresponding to each viewing zone is respectively replaced by N sub-deflection apertures, which respectively allows N kinds of mutually different orthogonal characteristic lights to be deflected out;

wherein, the pixel or subpixel group corresponding to each viewing zone is divided into N sub-pixel or sub-subpixel groups, which correspond to these N sub-deflection apertures in an one-to-one manner, and each sub-pixel or sub-subpixel group only projects light of orthogonal characteristic capable of being deflected out by the corresponding sub-deflection aperture, wherein $N \geq 2$;

wherein, the orthogonal projection of a sub-deflection aperture on the plane perpendicular to the eye's visual direction is smaller than 2.5 mm along all directions.

Furthermore, the orthogonal characteristic are two linear polarization states whose polarization directions are perpendicular to each other, or two polarization states of left-handed polarization and right-handed polarization, or temporal orthogonal states in which the deflection apertures or sub-deflection apertures play functions at different time-points, or color orthogonal states which respectively allow lights with different wavelengths being deflected out, or feasible combination of two or more of the two linear polarization states, the two polarization states, temporal orthogonal states and color orthogonal states.

Furthermore, the display module comprises a relay device to guide the projected light from the multi-view display structure to propagate through the deflection aperture array to the observing zone for the eye;

wherein, the orthogonal projection of each deflection aperture's image with respect to the relay device on the plane perpendicular to the eye's visual direction is smaller than 2.5 mm along all directions.

Furthermore, the display module comprises a relay device to guide the projected light from the multi-view display structure to propagate through the deflection aperture array to the observing zone for the eye;

wherein, the orthogonal projection of each sub-deflection aperture's image with respect to the relay device on the plane perpendicular to the eye's visual direction is smaller than 2.5 mm along all directions.

Furthermore, the relay device is a lens, or a lens group, or a phase element capable of projecting an image of the multi-view display structure.

Furthermore, the relay device is an eyeglass structure which guides light by reflecting the light.

Furthermore, the relay device is a free-form surface device.

Furthermore, the backlight-source assembly consists of more than one optical waveguide structures, with different optical waveguide structures projecting backlight to different segments of the display screen.

Furthermore, each deflection aperture of the deflection-aperture array has a phase modulation function of adjusting a deflected beam's divergence angle.

Furthermore, each sub-deflection aperture of the deflection-aperture array has a phase modulation function of adjusting a deflected beam's divergence angle.

Furthermore, deflection apertures of the deflection aperture array is divided into L deflection-aperture groups, $L \geq 1$;

wherein, for each deflection aperture group, all its deflection apertures project an image of the multi-view display structure to a corresponding depth of the deflection aperture group.

Furthermore, the sub-deflection apertures of the deflection-aperture array are divided into L groups, L≥1;

wherein, for each sub-deflection-aperture group, all its sub-deflection apertures project an image of the multi-view display structure to a corresponding depth of the sub-deflection aperture group.

Compared with existing display techniques and structures thereof, the technical solutions of the present invention have the following advantages:

The present invention provides a display module with the divergence angle of an outgoing beam constrained again by the corresponding deflection aperture. Deflected by a small-size deflection aperture or sub-deflection aperture, light beam from a pixel or sub-pixel is guided to the eye along a special direction and with a small divergence angle. For a displayed spatial point, with a precondition that at least a passing-through beam is guided to the eye, the VAC-free display gets implemented based on Maxwellian view or/and More-than-one-views-for-an-eye techniques. By arranging a plurality of deflection apertures or sub-deflection apertures, which correspond to different viewing zones, small field of view due to a small-size deflection aperture or sub-deflection aperture gets enlarged. Furthermore, orthogonal characteristics are assigned to the deflection apertures or sub-deflection apertures for noise suppression and/or the ability of adopting more deflection apertures or sub-deflection apertures. Based on the proposed designs of present invention, comfortable three-dimensional displays with low noise, large depth of field and large field of view are expected.

DESCRIPTION OF THE DRAWINGS

FIG. 39 is a schematic diagram of the distribution of viewing zones when backlight-source assembly shown in FIG. 38 is adopted.

DETAILED DESCRIPTION

Figure 1:
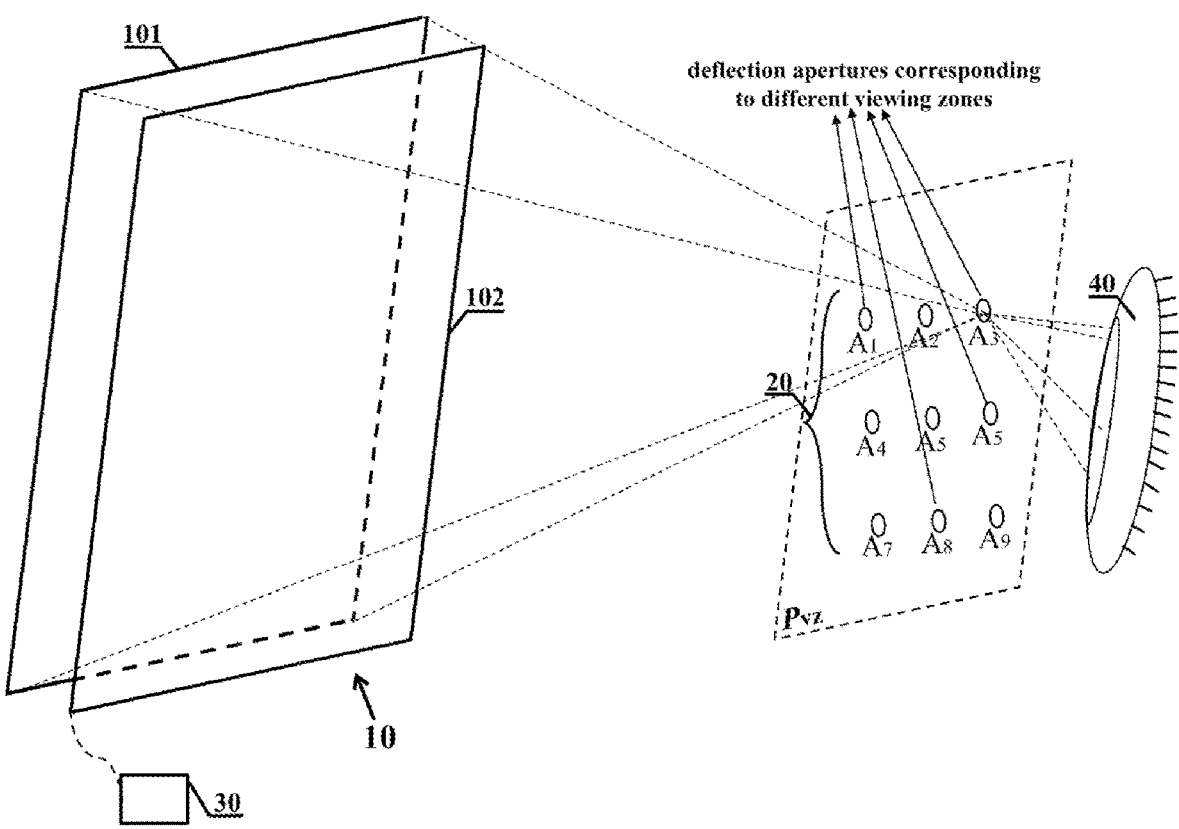
FIG. 1 shows a basic structure of a display module.
Figure 2:
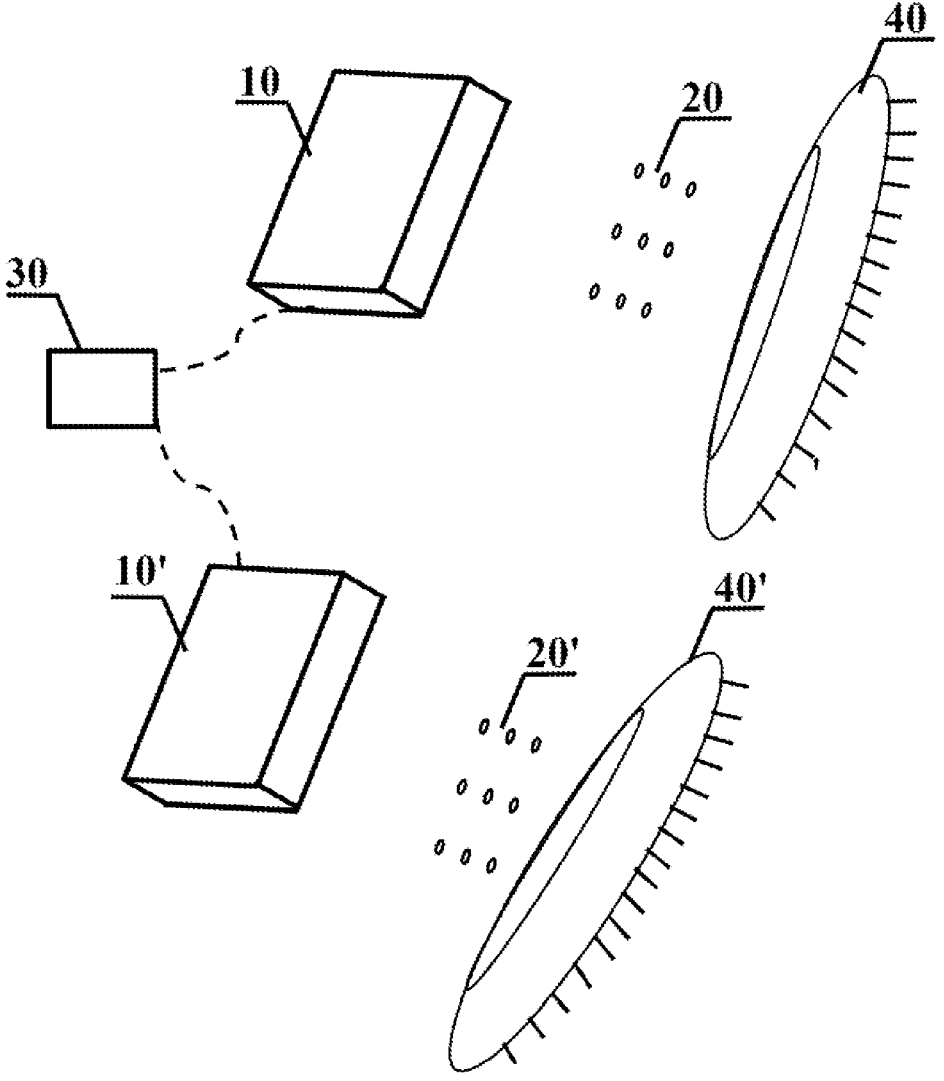
FIG. 2 shows a near-eye VR system with a display module as an eyepiece.

The accompanying drawings are drawn for illustrative purposes, and will not be taken as restriction on the present patent application. In order to better explain the embodiment, certain parts of the drawings may be omitted, scaled up or scaled down, and do not represent the dimensions of the actual products. It is understandable to those skilled in the art that some well-known structures, repetitive structures in the drawings and their descriptions may be omitted. The present invention designs a multi-view display structure 10, where light beams from different pixel or subpixel groups on a display screen 101 are guided to the corresponding viewing zones through a light-splitting device 102 respectively. Then through deflection apertures or sub-deflection apertures which are set respectively corresponding to different viewing zones, the light beams are guided to the observing zone for an eye 40 of the viewer, as shown in FIG. 1. Besides the light-splitting device 102, a small size deflection aperture or sub-deflection aperture further constrains the divergence angle of the deflected beam. Designing the spatial arrangement of the deflection apertures or sub-deflection apertures to guarantee that at least a whole image of the target object with a large field of view can be presented to the eye 40, the focus of the viewer can get free from the display screen 101, through Maxwellian view or/and More-than-one-views-for-an-eye technique routes. The display module constructed by a multi-view display structure 10 and a deflection-aperture array 20 can work as an eyepiece of a head-mounted VR/AR system. A near-eye VR/AR system can get implemented by two such eyepieces. FIG. 2 shows a near-eye VR system with transmission-type deflection apertures, where each deflection aperture deflects the propagation direction of a transmission beam. A couple consisting of multi-view display structure 10 and deflection aperture array 20 corresponds to the eye 40 of the viewer, and another couple consisting of multi-view display structure 10' and deflection aperture array 20' corresponds to the other eye 40' of the viewer. They share a common control device 30. The deflection apertures in FIG. 2 can also be reflective-type apertures, in this case, the structure shown in FIG. 2 converts into an AR system. At least, the space between deflection apertures allows the ambient light passing through. The display module here can not only constrain the convergence angle of a beam deflected to the eye by the small size deflection aperture, but also present an image with large field of view to the eye by multiple deflection apertures. Furthermore, the orthogonal characteristics are endowed to the deflection apertures for VAC-free three-dimensional display of lower noise or/and larger field of view. The technical solution of the invention is further described in combination with the accompanying drawings and the embodiments.

Embodiment 1

Figure 3:
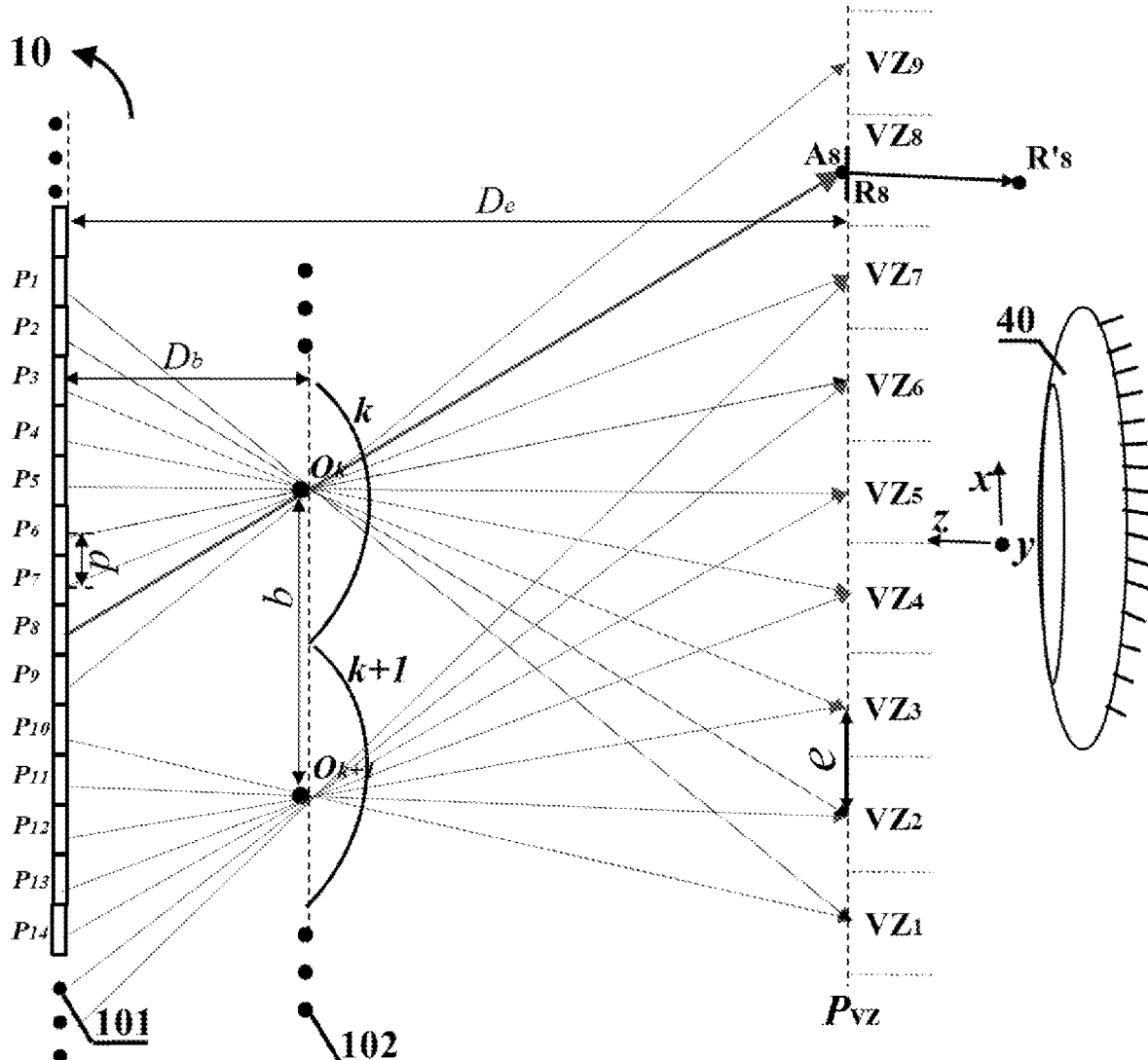
FIG. 3 is a multi-view display structure with a lenticular grating as the light-splitting device.

A lenticular grating formed by one-dimensional aligned cylindrical lenses is taken as the light-splitting device 102, as shown in FIG. 3. Such light-splitting device is referred as an one-dimensional-grating light-splitting device 102. For clarity of illustration, FIG. 3 shows only two grating elements k and k+1, and pixels $p_1$, $p_2$, $p_3$, $p_4$, $p_5$, $p_6$, $p_7$, $p_8$, $p_9$, $p_{10}$, $p_{11}$, $p_{12}$, $p_{13}$, $p_{14}$ corresponding to these two grating elements are drawn. The grating elements are aligned along the x direction. The optical centers of the grating elements k and k+1 in the xz plane are denoted as $O_k$ and $O_{k+1}$ respectively. The display screen 101 and the light-splitting device 102 construct a multi-view display structure 10. In the FIG. 3, b is the pitch size between adjacent grating elements along the x direction, p is the pitch size between adjacent said pixels along the x direction, $D_b$ is the distance between the display screen 101 and the grating elements, $D_e$ is the distance between the display screen 101 and the plane $P_{vz}$ of viewing zones, and e is the interval between adjacent viewing zones along the x direction. The relationships between them follow the formula:

$$\frac{p}{e} = \frac{D_b}{D_e - D_b} \text{ and } \frac{b}{Mp} = \frac{D_e - D_b}{D_e}.$$

Figure 4:
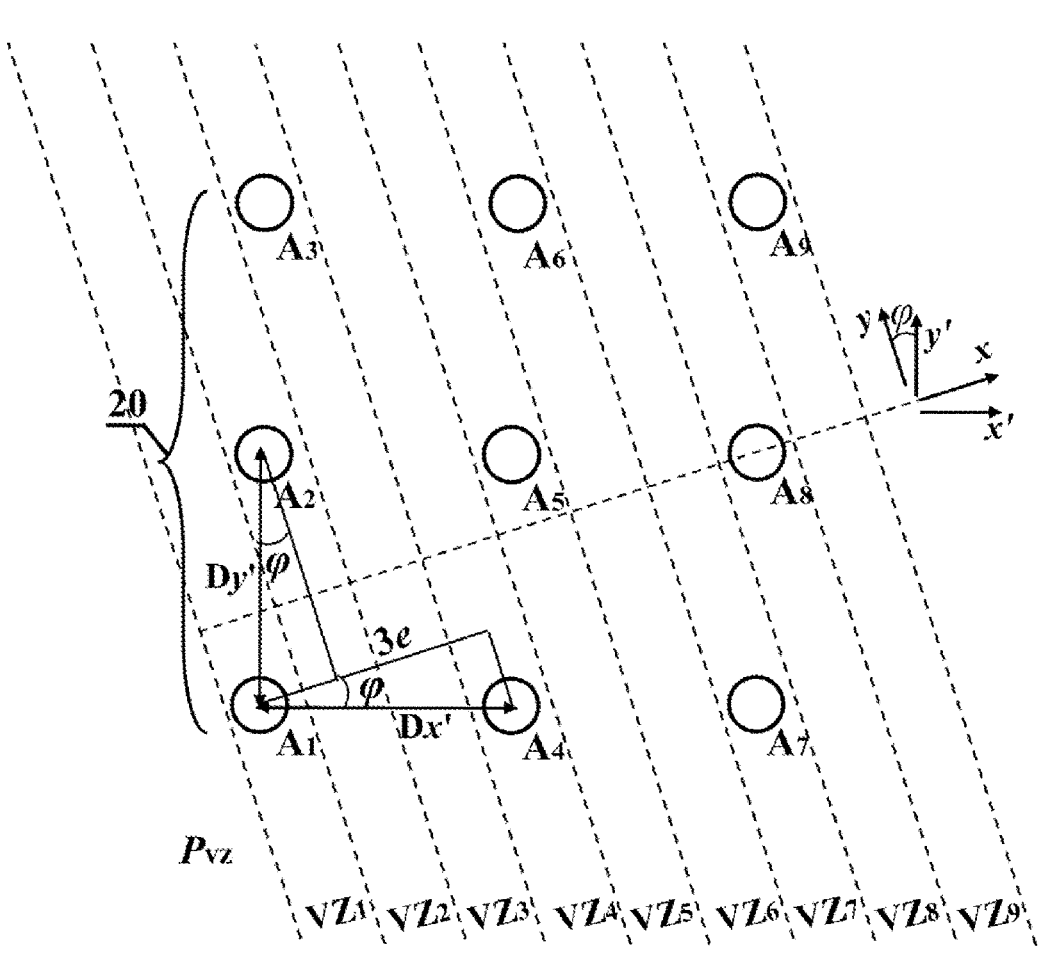
FIG. 4 is a schematic diagram of the two-dimensional distributed deflection apertures which correspond to one-dimensional distributed strip-like viewing zones.

Then, the multi-view display structure 10 projects M images to M strip-like viewing zones in an one-to-one manner, such as the M=9 strip-like viewing zones shown in FIG. 4, $VZ_1$, $VZ_2$, $VZ_3$, . . . , and $VZ_9$. A strip-like viewing zone has a long direction which is perpendicular to the one-dimensional alignment direction of the viewing zones. The M images are projected by M pixel groups of the display screen 101, respectively. There is no common pixel between different pixel groups, and the pixels of a pixel group are distributed throughout the display screen 101. The M pixel groups correspond to the M view zones one by one. A pixel in a pixel group takes the viewing zone corresponded by this pixel group as the corresponding viewing zone. The pixels of the display screen 101 are arranged along x' direction and y' direction. The x' direction is often not coincident with the aligning direction x of the grating elements, such as an included angle φ shown in FIG. 4. This is a common solution for three-dimensional display based on grating, which benefit obtaining a small interval value p between adjacent pixels corresponding to adjacent viewing zones along aligning direction of the viewing zones, more consistent uniform resolution along two-dimensional directions, and the suppression of Moire fringe effect. Adjacent M pixels whose exiting beams are guided to M different viewing zones make up a basic pixel periodic set, such as a basic pixel periodic set $p_1, p_2, \ldots, p_9$ in FIG. 3. They are distributed in a two-dimensional area on the display screen 101. Pixels of a basic pixel periodic set shown in FIG. 3 are the projections of these physical pixels on the xz plane. Projections of these pixels on the xz plane may overlap partially. For clarity of illustration, the possible overlapping is not shown in FIG. 3. The pixel structure of display screen 101 can also be designed such that there is a dislocation along the row direction between adjacent pixels respectively belong two adjacent rows that is smaller than the pixel spacing in the row direction. In this case, the pixel arrangement direction x' and the grating unit arrangement direction x may be designed to be consistent.

Corresponding to each viewing zone, a corresponding deflection aperture is placed respectively. Each deflection aperture inherits the corresponding relationship between the corresponding viewing zone and the pixels. All deflection apertures constitute a deflection-aperture array 20, as shown in FIG. 4. The deflection aperture $A_8$ corresponding to the viewing zone $VZ_8$ is located on the x axis, and other deflection apertures $A_1, A_2, \ldots, A_7$ and $A_9$ are not on the x axis. The deflection aperture $A_8$ takes the pixel group corresponding to $VZ_8$ as the corresponding pixel group. In the xz plane of FIG. 3, only deflection aperture $A_8$ is shown. The deflection apertures shown in FIG. 4 are with a circular shape. Actually, the deflection apertures can be with other shapes. It is an optimal way to place a deflection aperture in the corresponding viewing zone. However, under the premise that light beams projected by all pixels of the corresponding pixel group can be incident on a deflection aperture, this deflection aperture can also be placed near the corresponding viewing zone, for example, being with a certain distance away from the corresponding viewing zone along the z direction perpendicular to the xy plane. In the following parts of this embodiment, deflection apertures are optimally placed at the corresponding viewing zones being shown as an example, but the non-optimal placement ways can also be applied to the following parts of this embodiment and will not be repeated. The light beams from a pixel group are modulated by corresponding deflection aperture, then propagate along the modulated direction. The control device 30 controls each pixel to load projection light information of the scene to be displayed along the reverse direction of this pixel's projection direction. At a time point, the projection direction corresponding to each pixel is the propagation direction of the light beam projected by this pixel and incident on the observing zone where the eye 40 may be placed in. Taking the pixel $p_8$ of FIG. 3 as an example, its projected light is guided by the corresponding grating unit k to the corresponding viewing zone $VZ_8$. Then, after being deflected by deflection aperture $A_8$ located at the viewing zone $VZ_8$, the beam from the pixel $p_8$ propagates along the direction $R_8R'_8$ to the observing zone for the eye 40. Here, the point $R_8$ may be any spatial point within the deflection aperture $A_8$, which optimally takes the geometric center point of the deflection aperture $A_8$. The direction $R_8R'_8$ is the projection direction corresponding to the pixel $p_8$. The loading light information of the pixel $p_8$ is the projection light information of the scene to be displayed along the reverse direction of the direction $R_8R'_8$. Here, a transmission-type deflection aperture is taken as an example. Similarly, the deflection aperture can also be reflection-type. In the following parts of this patent application, the loading light information of a pixel is determined by this way. So, the image projected by a pixel group through the corresponding deflection aperture is a view of the scene to be displayed with respect to the deflection aperture. The interval between orthogonal projections of adjacent deflection apertures on the plane perpendicular to the eye's visual direction is designed to be smaller than the pupil diameter $D_p$ of the viewer's eye 40. For example, the orthogonal projections of $D_{x'}$ and $D_{y'}$, which are lines connecting centers of adjacent deflection apertures along x' direction and y' direction respectively in FIG. 4, on the plane perpendicular to the visual direction should be designed smaller than the pupil diameter $D_p$. Then, for the viewer's eyes 40 being close enough to the deflection-aperture array, at least a complete view from corresponding pixel group can be perceived. In this case, for a displayed point, at least one passing-through beam reaches to the eye 40's pupil. Designing the orthogonal projection of a deflection aperture on the plane perpendicular to the eye's visual direction to be smaller than 2.5 mm (half of the average diameter of human's pupil) along all directions, the beam deflected by the deflection aperture and received by the eye 40 from a pixel has a small divergence angle. This means a small light intensity gradient along the propagation direction. Then, when only one complete image, i.e., one complete view, is received by the viewer's eye, a VAC-free three-dimensional display get implemented by the binocular system shown in FIG. 2 based on Maxwellian view technique. As the interval between adjacent deflection apertures gets decreased, more than one passing-through beams for a displayed point will be perceived by the eye 40. In this case, a VAC-free three-dimensional display will get realized by the binocular system shown in FIG. 2 based on More-than-one-views-for-an-eye technique.

The deflection apertures are physical objects. A spatial distance between the viewer's eye 40 and the deflection-aperture array 20 is necessary, to accommodate the adherent tissue of the eye 40, such as the eyelash. As the distance between the deflection-aperture array 20 and the eye 40 increases, the light information perceived by the eye 40 through a deflection aperture changes from a complete view to a partial view. When a complete view cannot be received through one deflection aperture, light information received by the eye 40 can be a stitched image of different parts of different views deflected and emitted through two or more adjacent deflection apertures. In this case, the interval between orthogonal projections of adjacent deflection apertures on the plane perpendicular to the eye's visual direction is necessary to be smaller than the pupil diameter $D_p$. With this premise, for each displayed point, at least one passing-through beam can be perceived by the eye 40. The Maxwellian view and More-than-one-views-for-an-eye will play functions together when partial displayed points are with only one passing-through beam perceived by the eye 40 and other displayed points are with more than one passing-through beams perceived by the eye 40.

Figure 5:
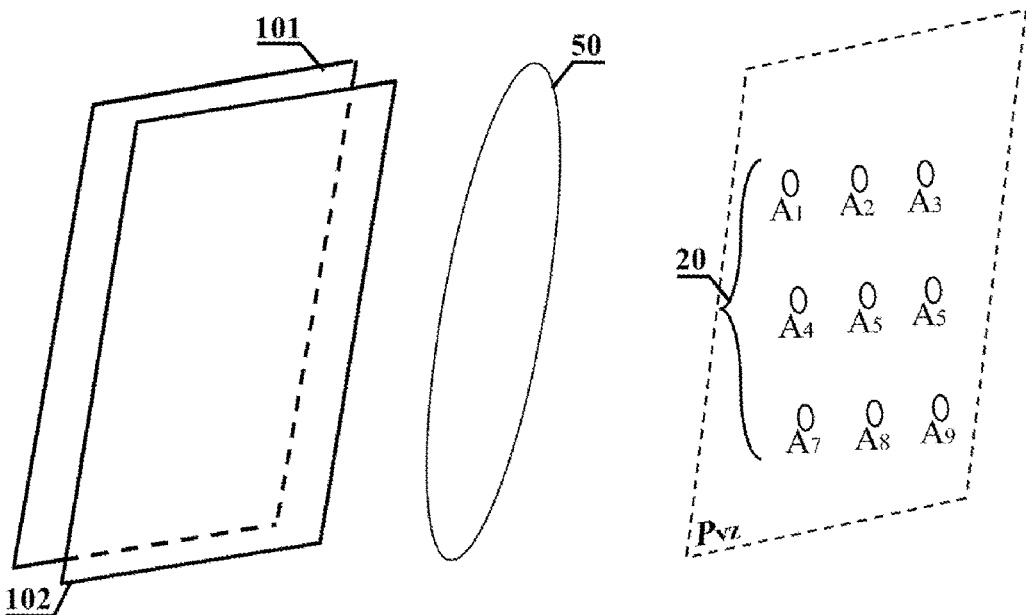
FIG. 5 shows an example I of a display module with a lens as the relay device.

A relay device 50 can also be introduced, as the lens shown in FIG. 5. This lens-type relay device 50 projects a magnified virtual image of the multi-view display structure 10, accompanied by changes brought to the distribution of the viewing zones. The virtual image of the multi-view display structure is taken as the effective multi-view display structure, and the images of the viewing zones with respect to this lens-type relay device are taken as the effective viewing zones. With the effective multi-view display structure and the effective viewing zones working together, VAC-free three-dimensional display will also get implemented in a similar way. The lens-type relay device 50 can also be a group of lenses, phase element, etc.

Figure 6:
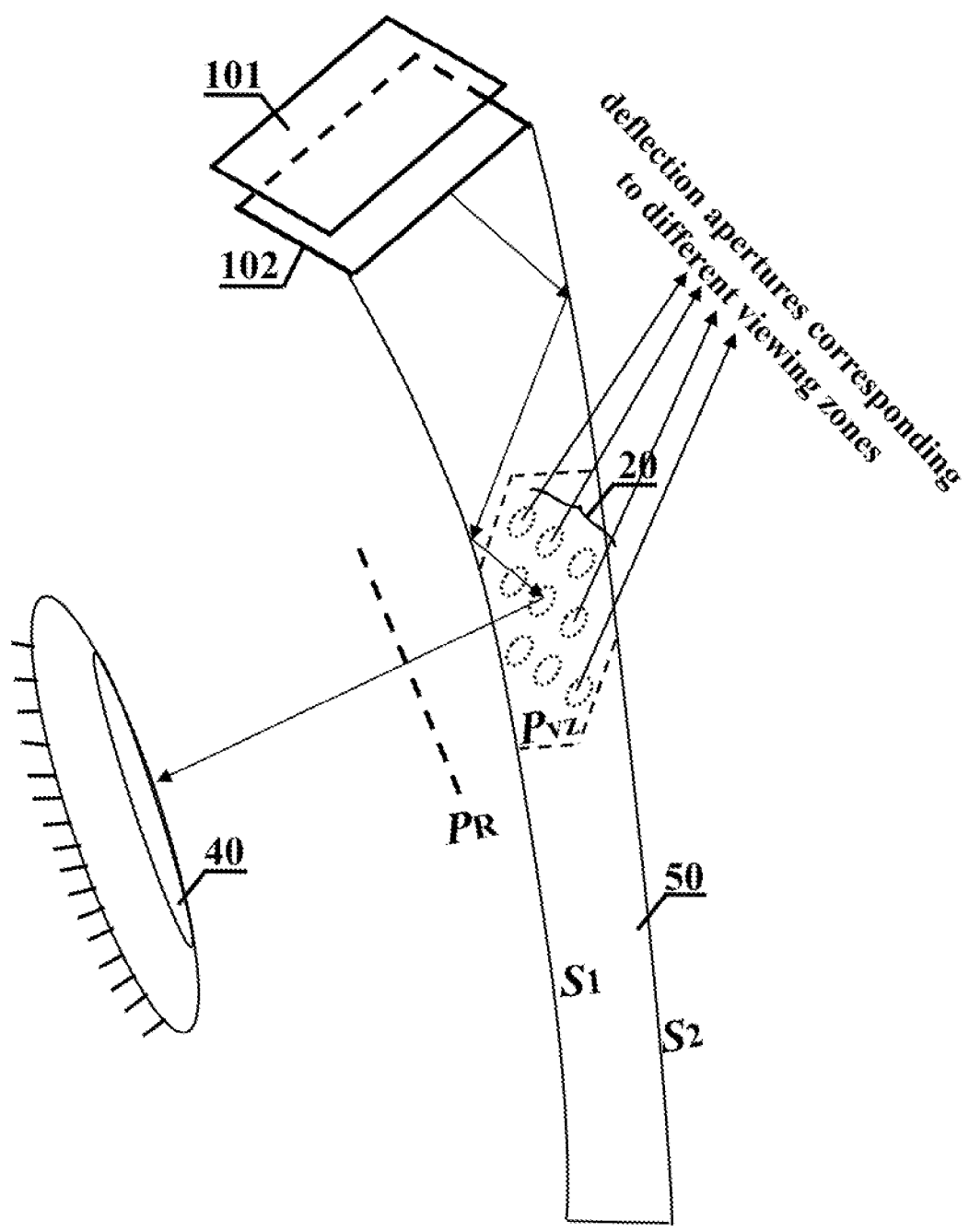
FIG. 6 shows an example I of a display module with an eyeglass-type relay device.
Figure 7:
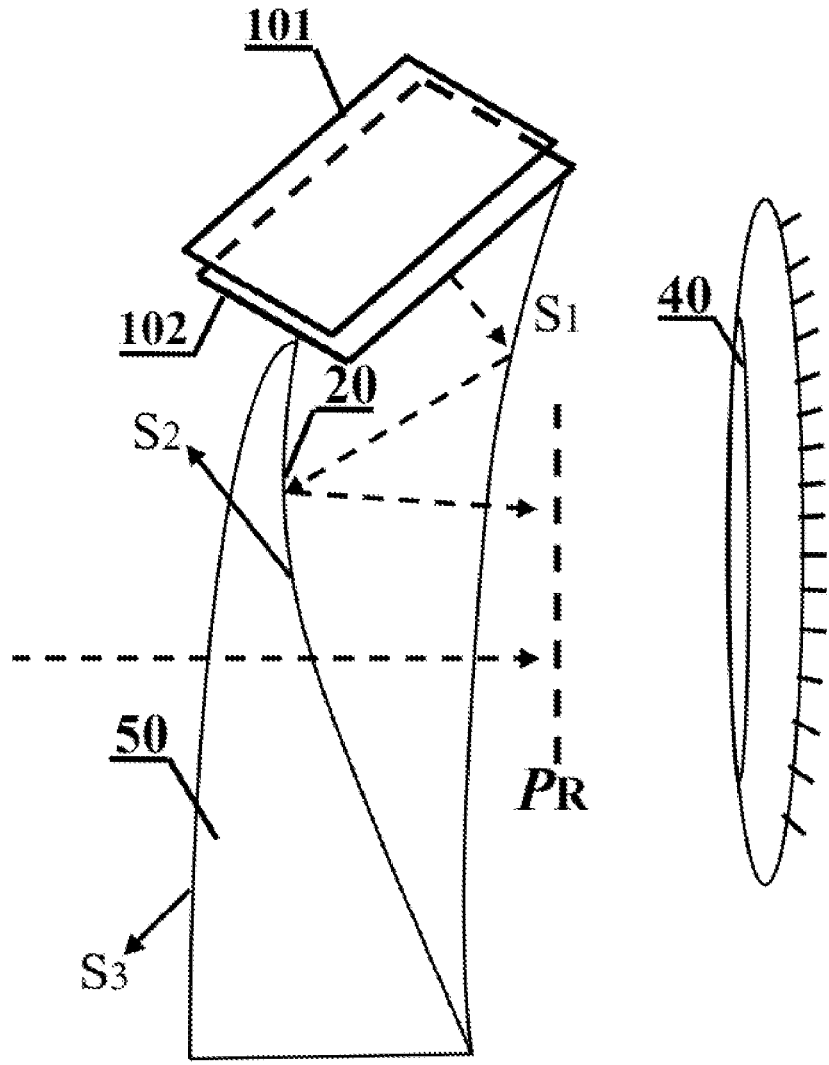
FIG. 7 shows an example I of a display module with a free-form surface device as the relay device.

Deflection apertures shown in FIG. 1 can be of transmission-type, such as prisms. They also can be reflection-type deflection apertures, such as reflective surfaces. The deflection apertures deflect the incident light through phase modulation. FIG. 6 shows a deflection-aperture array of reflection-type deflection apertures, which is integrated into an eyeglass-type relay device 50. This eyeglass-type relay device 50 is with two surfaces S1 and S2. Light beams projected from the multi-view display structure 10 through the light-splitting device 102 propagate through reflections by the surfaces S1 and S2 in turn, and are reflected by each deflection aperture of the deflection aperture array 20, and finally transmit through surface S1 to the area located by the eye 40. On the eyeglass-type relay device 50, the surfaces S1 and S2 allow the external ambient light to transmit. The reflection of surfaces S1 and S2 to the light beams projected by the display screen 10 can be realized by designing the light beams projected by the display screen 10 at a larger incidence angle. The external ambient light and the projected light beams reflected by the deflection aperture array 20 transmit through the surfaces S1 and S2 at a small incident angle. The orthogonal projection of each deflection aperture on the plane $P_R$ is smaller than 2.5 mm along all directions. Here, plane $P_R$ is perpendicular to the visual direction of the eye 40. On the plane $P_R$, the orthogonal projections of adjacent deflection apertures are with an interval smaller than the eye's pupil diameter $D_p$. The relay device 50 can also be a free-form surface device composed of free-form surfaces as shown in FIG. 7. This kind of relay device 50 plays functions of deflection guidance and imaging at the same time. The multi-view display structure 10 is imaged by the surfaces S1 and S2 together. The surface S3 compensates the influence of the surfaces S1 and S2 on the external ambient light. In FIG. 7, the deflection aperture array 20 can also be set on the free-form surface S2, or other positions. When deflected beams from the deflection apertures pass through the delay device 50, the image of each deflection aperture with respect to the relay device 50 should be designed with its orthogonal projection smaller than 2.5 mm along all directions on the plane $P_R$, so as to guarantee a small divergence angle of the deflected beams. At the same time, on the plane $P_R$, the orthogonal projection of the image of each deflection aperture with respect to the relay device 50 is arranged in such a way that the orthogonal projections of adjacent deflection apertures are with an interval smaller than the eye's pupil diameter $D_p$, so as to ensure that at least one light beam passing through each object point to be displayed is incident on the observer's eye 40.

Figure 8:
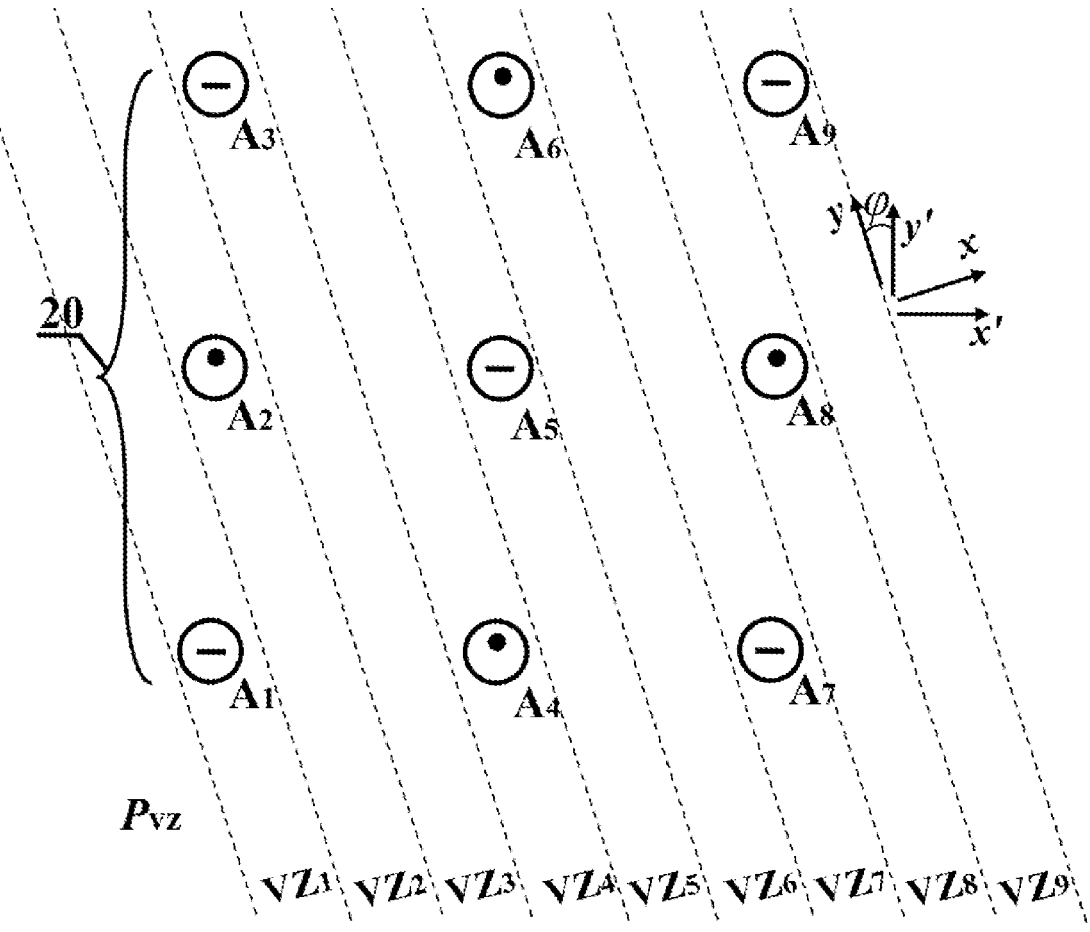
FIG. 8 is a schematic diagram of deflection apertures with linear polarization characteristics, corresponding to one-dimensional distributed strip-like viewing zones.
Figure 9:
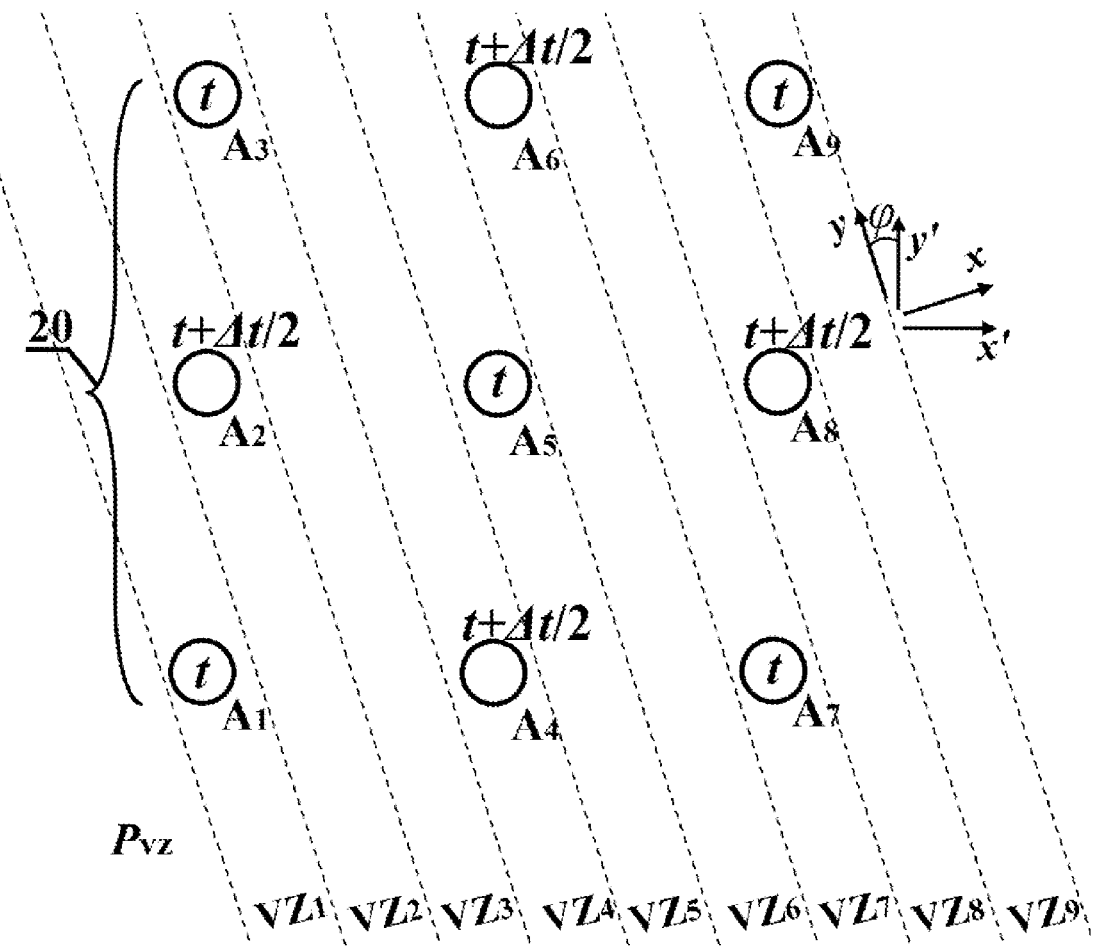
FIG. 9 is a schematic diagram of deflection apertures with temporal orthogonal characteristics, corresponding to one-dimensional distributed strip-like viewing zones.

In the figures of present patent application, the viewing zones generated by the multi-view display structure 10 are shown with dotted lines as boundaries. The dotted-line boundary only shows the spatial relative relationship between different viewing zones, and does not indicate that the spatial distribution range of the light from the corresponding pixel group or sub-pixel group is exactly restricted by corresponding dotted lines. In fact, on the plane of viewing zones, the distribution regions of light from pixel or subpixel groups corresponding to adjacent viewing zones may overlap partially. That is, light emitted from a pixel or sub-pixel group may enter into the adjacent non-corresponding viewing zone as crosstalk noise. To suppress this kind of noise, the deflection apertures corresponding to adjacent viewing zones can be set with different orthogonal characteristics. Then, each deflection aperture only allows light with corresponding orthogonal characteristics being deflected out, with incident light with non-corresponding orthogonal characteristics being blocked. Meanwhile, light from a pixel or sub-pixel group is designed with orthogonal characteristics corresponding to the corresponding deflection aperture. FIG. 8 shows an example that two adjacent deflection apertures are with two linear polarization states as the orthogonal characteristics, respectively. These two linear polarization states are with polarization directions perpendicular to each other, and are denoted with "·" and "–", respectively. Specifically, the deflection aperture $A_1$ corresponding to the viewing zone $VZ_1$ is with "–" characteristics, the deflection aperture $A_2$ corresponding to the viewing zone $VZ_2$ is with "·" characteristics, the deflection aperture $A_3$ corresponding to the viewing zone $VZ_3$ is with "–" characteristics, the deflection aperture $A_4$ corresponding to the viewing zone $VZ_4$ is with "·" characteristics, the deflection aperture $A_5$ corresponding to the viewing zone $VZ_5$ is with "–" characteristics, the deflection aperture $A_6$ corresponding to the viewing zone $VZ_6$ is with "·" characteristics, the deflection aperture $A_7$ corresponding to the viewing zone $VZ_7$ is with "–" characteristics, the deflection aperture $A_8$ corresponding to the viewing zone $VZ_8$ is with "·" characteristics, the deflection aperture $A_9$ corresponding to the viewing zone $VZ_9$ is with "–" characteristics. The characteristics of each deflection aperture can be endowed by an attached polarizer. Correspondingly, the pixel group corresponding to the viewing zone $VZ_1$ emits "–" light, the pixel group corresponding to the viewing zone $VZ_2$ emits "·" light, the pixel group corresponding to the viewing zone $VZ_3$ emits "–" light, the pixel group corresponding to the viewing zone $VZ_4$ emits "·" light, the pixel group corresponding to the viewing zone $VZ_5$ emits "–" light, the pixel group corresponding to the viewing zone $VZ_6$ emits "·" light, the pixel group corresponding to the viewing zone $VZ_7$ emits "–" light, the pixel group corresponding to the viewing zone $VZ_8$ emits "·" light, the pixel group corresponding to the viewing zone $VZ_9$ emits "–" light. The orthogonal characteristics can also be two polarization states of left-handed polarization and right-handed polarization, or temporal orthogonal states in which the deflection apertures or sub-deflection apertures play functions at different time-points of a time period. FIG. 9 shows an example in which temporal orthogonal states are adopted as orthogonal characteristics. In a time period t~t+Δt, two time-points t and t+Δt/2 are taken. At the time-point t, only deflection aperture $A_1$ corresponding to the viewing zone $VZ_1$, deflection aperture $A_3$ corresponding to the viewing zone $VZ_3$, deflection aperture $A_5$ corresponding to the viewing zone $VZ_5$, deflection aperture $A_7$ corresponding to the viewing zone $VZ_7$, and deflection aperture $A_9$ corresponding to the viewing zone $VZ_9$ are activated for light deflecting; the pixel groups corresponding to the activated deflection apertures get light information being loaded by the control device 30 synchronously and other pixel groups are set with no light information being loaded. Similarly, at the time-point t+Δt/2, only deflection aperture $A_2$ corresponding to the viewing zone $VZ_2$, deflection aperture $A_4$ corresponding to the viewing zone $VZ_4$, deflection aperture $A_6$ corresponding to the viewing zone $VZ_6$, and deflection aperture $A_8$ corresponding to the viewing zone $VZ_8$ are activated for light deflecting; the pixel groups corresponding to the activated deflection apertures get light information being loaded by the control device 30 synchronously and other pixel groups are set with no light information being loaded. When the temporal orthogonal states are used as the orthogonal characteristics, a deflection aperture should be with a gate switchable by the control device 30. For example, liquid crystal gates corresponding to different deflection apertures in an one-to-one manner can activate some deflection apertures and shut down other deflection apertures at a time-point by the control device 30. FIG. 9 describes the process with two time-points in a time period as an example. More time-points will work in a similar way. Furthermore, the orthogonal characteristics can take other type of states, or feasible combination of different types of states, as long as a deflection aperture with corresponding orthogonal characteristics can block light with other non-corresponding orthogonal characteristics. More kinds of orthogonal characteristics will make crosstalk noise between more adjacent deflection apertures be suppressed.

Figure 10:
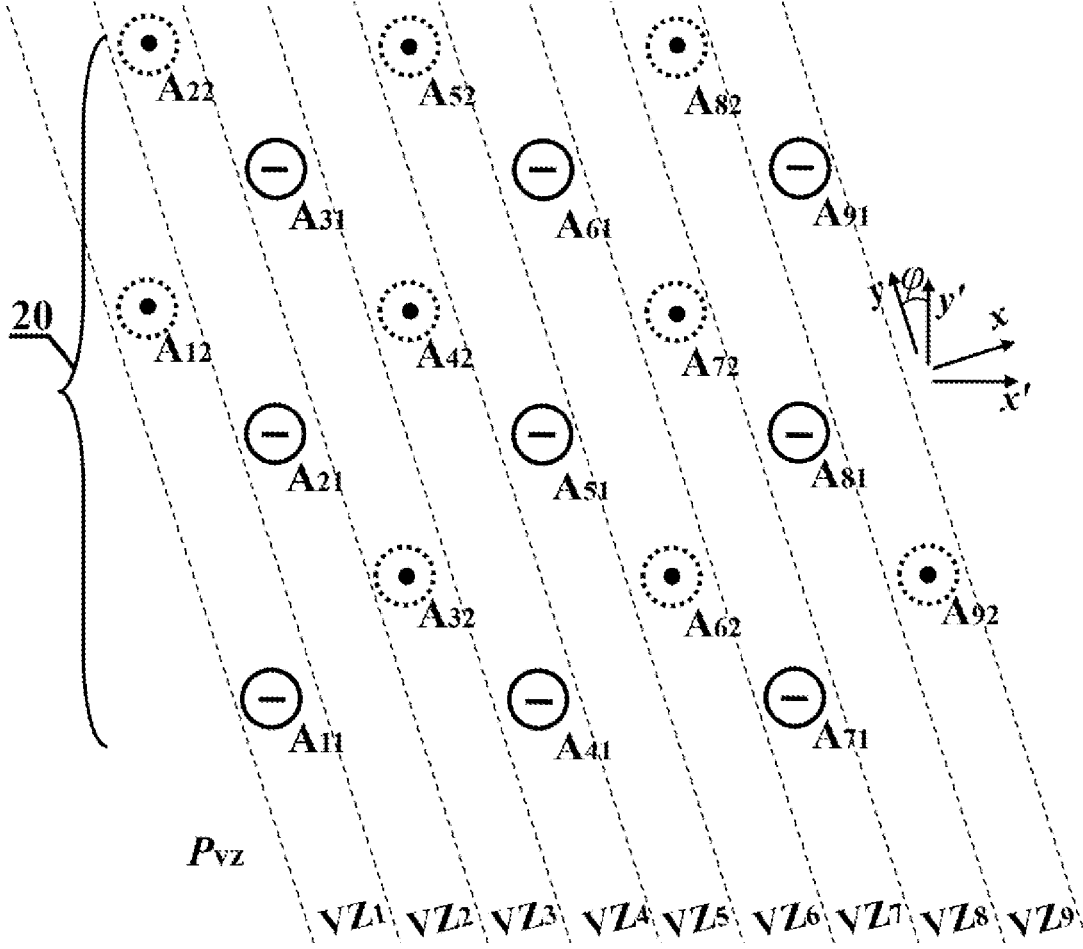
FIG. 10 is a schematic diagram of sub-deflection apertures with linear polarization characteristics, corresponding to one-dimensional distributed strip-like viewing zones.

A deflection aperture corresponding to a viewing zone can be replaced by N (N≥2) sub-deflection apertures, which respectively allow light of mutually different orthogonal characteristics to be deflected out. On the plane $P_R$ perpendicular to the eye's visual direction, the orthogonal projections of adjacent sub-deflection apertures or the orthogonal projections of images of adjacent sub-deflection apertures with respect to the relay device 50 are set with an interval smaller than the pupil diameter $D_p$. As shown in FIG. 10 with $\varphi=\pi/4$, along two directions at included angles of $\pi/4$ and $3\pi/4$ with respect to the x' axis, the interval between orthogonal projections of adjacent sub-deflection apertures on the plane $P_R$ is smaller than the pupil diameter $D_p$. At the same time, the orthogonal projection size of a sub-deflection aperture on the plane $P_R$ is less than 2.5 mm so as to guarantee a small divergence angle of a defected beam. The pixels corresponding to each viewing zone are divided into N sub-pixel groups, which correspond to the N sub-deflection apertures in an one-to-one manner. A sub-pixel group only projects light of orthogonal characteristic capable of being deflected out by the corresponding sub-deflection aperture. Relative to a deflection aperture, N sub-deflection apertures can offer a higher distribution density or number to project more images into the eye 40, or provide a larger observing zone for the eye 40. In FIG. 10, N=2 linear polarization directions perpendicular to each other are taken as orthogonal characteristics, and N=2 sub-deflection apertures correspond to each view zone. For example, the sub-deflection apertures $A_{11}$ and $A_{12}$ corresponding to the viewing zone $VZ_1$ only allow "·" light and "–" light being reflected out respectively. The pixels of the pixel group corresponding to the viewing zone $VZ_1$ are divided into N=2 sub-pixel groups, which project "·" light and "–" light respectively. Then, the sub-pixel group of "·" light projects a perspective view of the scene to be displayed with respect to the sub-deflection apertures $A_{11}$, the sub-pixel group of "–" light projects a perspective view of the scene to be displayed with respect to the sub-deflection apertures $A_{12}$. Other sub-deflection apertures follow the same rules.

Figure 11:
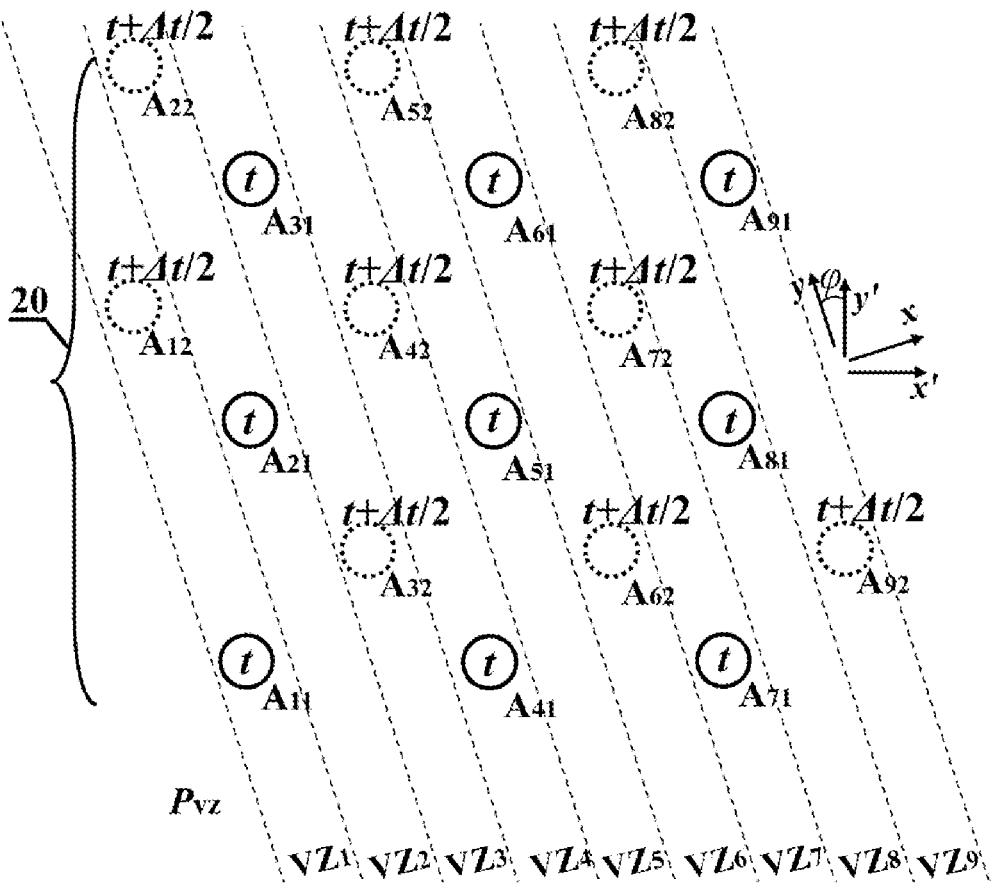
FIG. 11 is a schematic diagram of sub-deflection apertures with temporal orthogonal characteristics, corresponding to one-dimensional distributed strip-like viewing zones.

FIG. 11 shows a schematic diagram of sub-deflection apertures with temporal orthogonal characteristics. Here, different sub-deflection apertures corresponding to a same viewing zone are turned on by the control device 30 sequentially at different time-points of a time period, and only one sub-deflection aperture of them is turned on at a time-point. Light information loaded on a pixel at a time-point is projection light information of the scene to be displayed along the reverse direction of this pixel's projection direction at this time-point. The projection direction of a pixel is the propagation direction of a light beam projected by this pixel and reaching to the observing zone for the eye 40. Here, a beam projected by a pixel to the observing zone is deflected by the corresponding sub-deflection at a time-point. At different time-points of a time period, beams from a pixel are deflected out by different sub-deflection apertures, respectively. That is to say, a pixel corresponds to different sub-deflection apertures at different time-points of a time period.

Figure 12:
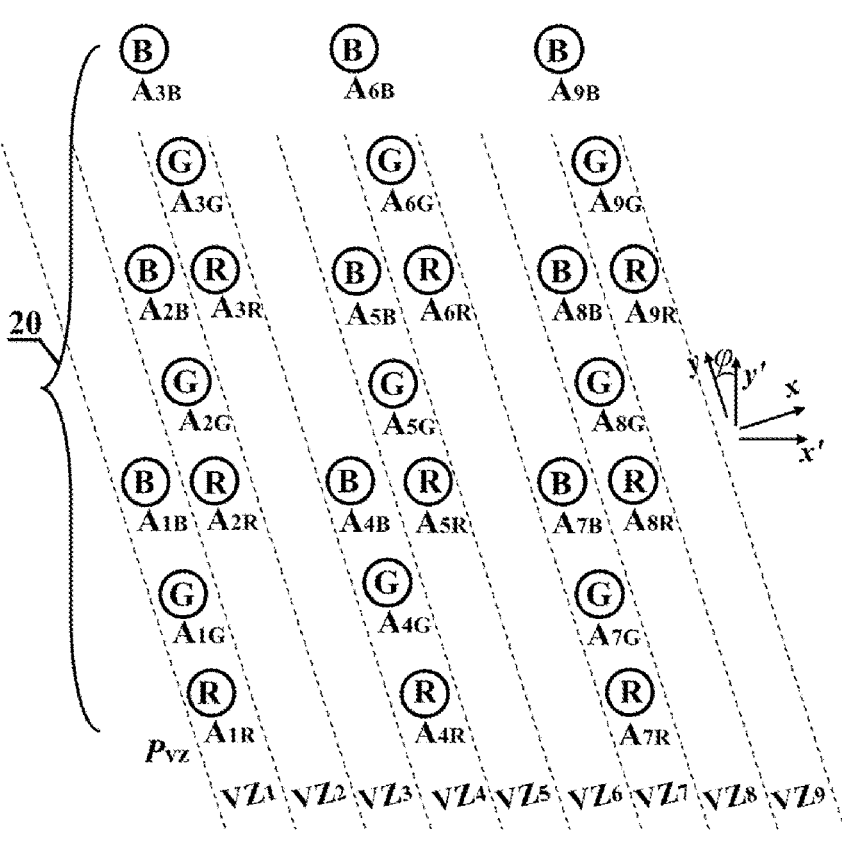
FIG. 12 shows an example I of sub-deflection apertures with color orthogonal characteristics, corresponding to one-dimensional distributed strip-like viewing zones.
Figure 13:
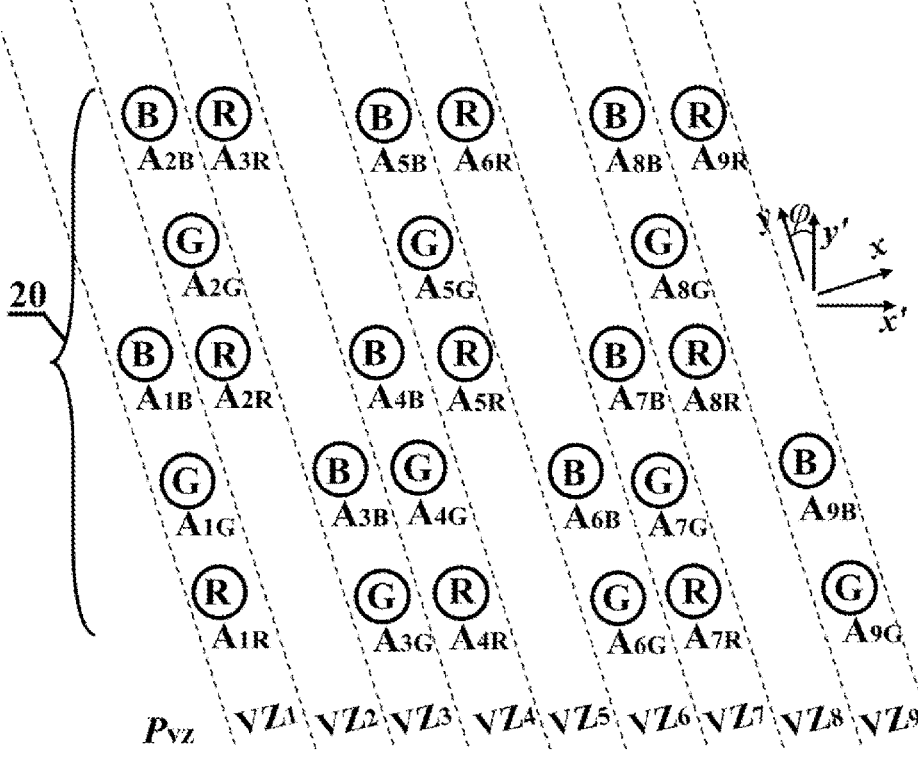
FIG. 13 shows an example II of sub-deflection apertures with color orthogonal characteristics, corresponding to one-dimensional distributed strip-like viewing zones.
Figure 14:
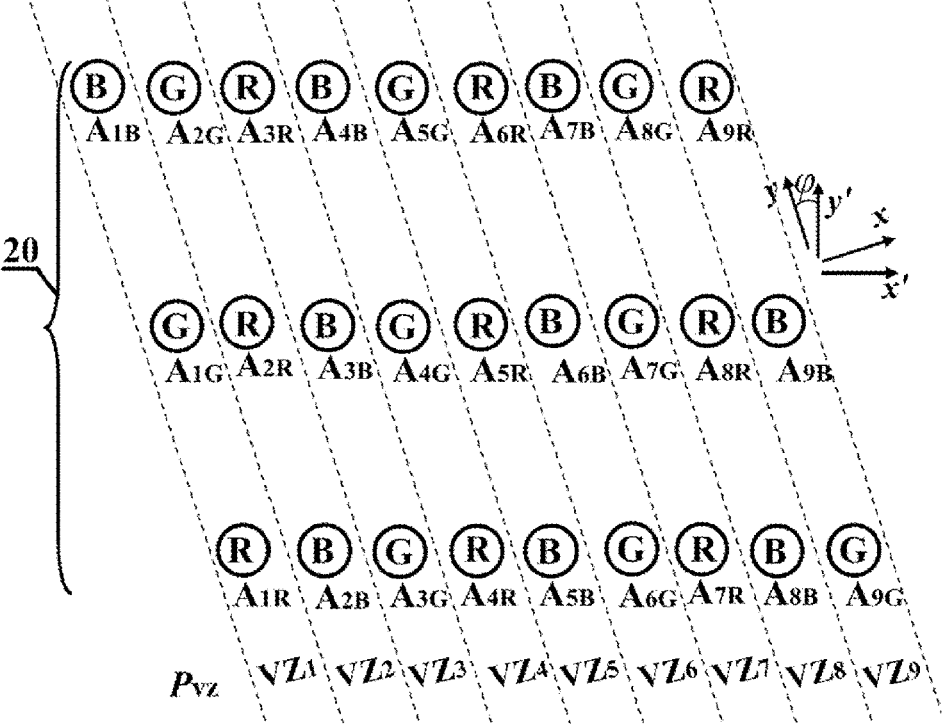
FIG. 14 shows an example III of sub-deflection apertures with color orthogonal characteristics, corresponding to one-dimensional aligned strip-like viewing zones.

FIG. 12 takes color orthogonal states as the orthogonal characteristics of the N=3 sub-deflection apertures corresponding to a viewing zone. Each pixel of the display screen 101 is composed of three subpixels of red (R) light, green (G) light and blue (B) light, which are called R subpixel, G subpixel and B subpixel, respectively. Specifically, N=3 sub-deflection apertures $A_{1R}$, $A_{1G}$, and $A_{1B}$ corresponding to the viewing zone $VZ_1$ allow only the R light, the G light, and the B light deflected out, respectively. The color orthogonal characteristics of a sub-deflection aperture can be endowed by attaching a color filter. For example, the sub-deflection apertures $A_{1R}$, $A_{1G}$, and $A_{1B}$ are respectively attached with filters that only allow R light, G light, and B light passing through. Then, all the R subpixels of the pixel group corresponding to the viewing zone $VZ_1$ construct the R subpixel group, to display the red light information of the perspective view with respect to the sub-deflection apertures $A_{1R}$, all the G subpixels of the pixel group corresponding to viewing zone $VZ_1$ construct the G subpixel group, to display the green light information of the perspective view with respect to the sub-deflection apertures $A_{1G}$, all the B subpixels of the pixel group corresponding to the viewing zone $VZ_1$ construct the B subpixel group, to display the blue light information of the perspective view with respect to the sub-deflection apertures $A_{1B}$. This process is applicable to other sub-deflection apertures and subpixel groups. In this process, the arrangement of the sub-deflection apertures can be different, such as the arrangement shown in FIG. 13, or shown in FIG. 14. In FIG. 13, the sub-deflection apertures with different color orthogonal states are aligned along the long direction of the corresponding viewing zone, and the sub-deflection apertures corresponding to adjacent viewing zones are arranged with dislocations. In FIG. 14, the sub-deflection apertures with different color orthogonal states are aligned along the long direction of the corresponding viewing zone, and the sub-deflection apertures corresponding to adjacent viewing zones are arranged in rows, with adjacent sub-deflection apertures in a row taking different color orthogonal characteristics. Above-mentioned orthogonal characteristics can be compounded together for getting more states, so that more sub-deflection apertures can be assigned to a viewing zone. Similarly, the orthogonal projection size of a sub-deflection aperture on the plane $P_R$ perpendicular to the eye's visual direction is set to be less than 2.5 mm along all directions. At the same time, the interval between the orthogonal projections of adjacent sub-deflection apertures on the plane $P_R$ is smaller than the pupil diameter $D_p$.

Similarly, light information for a subpixel is the color-component projection light information of the scene to be displayed along the reverse direction of this subpixel's projection direction at a time-point. The projection direction of a subpixel is the propagation direction of a light beam projected by this subpixel and reaching to the observing zone for the eye 40.

Figure 15:
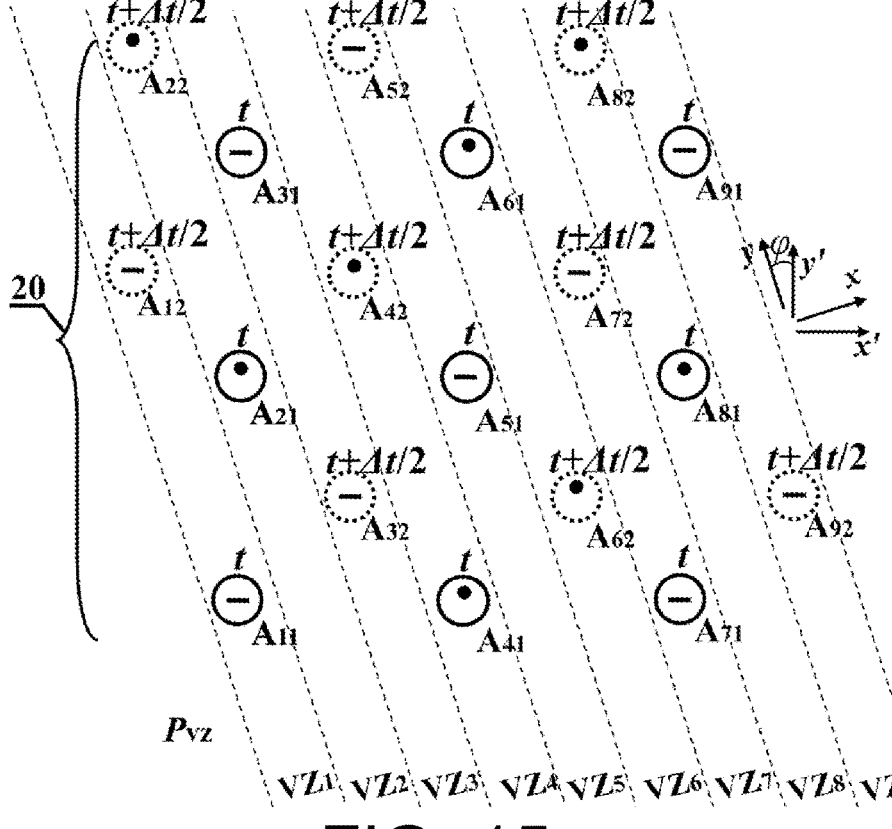
FIG. 15 is a schematic diagram of an arrangement example in which adjacent sub-deflection apertures corresponding to one-dimensional distributed strip-like viewing zones have different orthogonal characteristics.

When multiple sub-deflection apertures are assigned to a viewing zone, the multiple sub-deflection apertures corresponding to adjacent viewing zones can also be with different orthogonal characteristics, so as to suppress the crosstalk noises between light information projected to adjacent viewing zones. In an example shown in FIG. 15, two sub-deflection apertures corresponding to a same viewing zone are with temporal orthogonal characteristics. In the specific case of viewing zone $VZ_1$, in a time period t~t+Δt, the sub-deflection aperture $A_{11}$ gets activated only at time-point t, to deflect the light beams from the pixel group corresponding to viewing zone $VZ_1$ to the observing zone. At time-point t+Δt/2, only the sub-deflection aperture $A_{12}$ gets activated, to deflect the light beams from the pixel group corresponding to viewing zone $VZ_1$ to the observing zone. In this case, pixels of the pixel group corresponding to viewing zone $VZ_1$ are divided into two sub-pixel groups in time sequence. These two sub-pixel groups are composed of the same pixels, but project different views to different sub-deflection apertures at different time-points within a time period. Simultaneously, sub-deflection apertures corresponding to adjacent viewing zones are with different linear polarization characteristics, specifically "·" and "−" in FIG. 15. For example, sub-deflection apertures $A_{11}$ and $A_{12}$ corresponding to $VZ_1$ are with "−" characteristics and block "·" light. Sub-deflection apertures $A_{21}$ and $A_{22}$ corresponding to $VZ_2$ are with "·" characteristics and block "−" light. Correspondingly, pixels corresponding to viewing zone $VZ_1$ project "−" light, and pixels corresponding to viewing zone $VZ_2$ project "·" light. Other viewing zones and corresponding sub-deflection apertures are set similarly.

Figure 16:
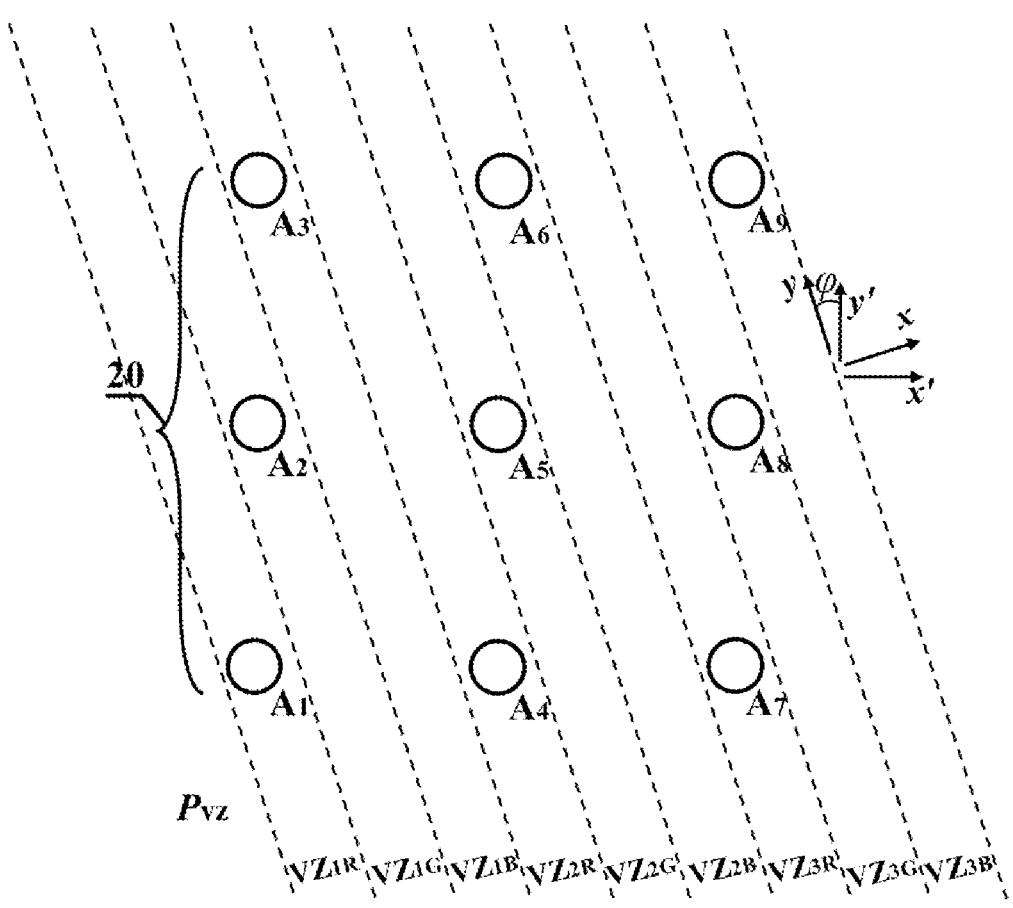
FIG. 16 is a schematic diagram of one-dimensional distributed strip-like viewing zones corresponding to different subpixel groups.
Figure 17:
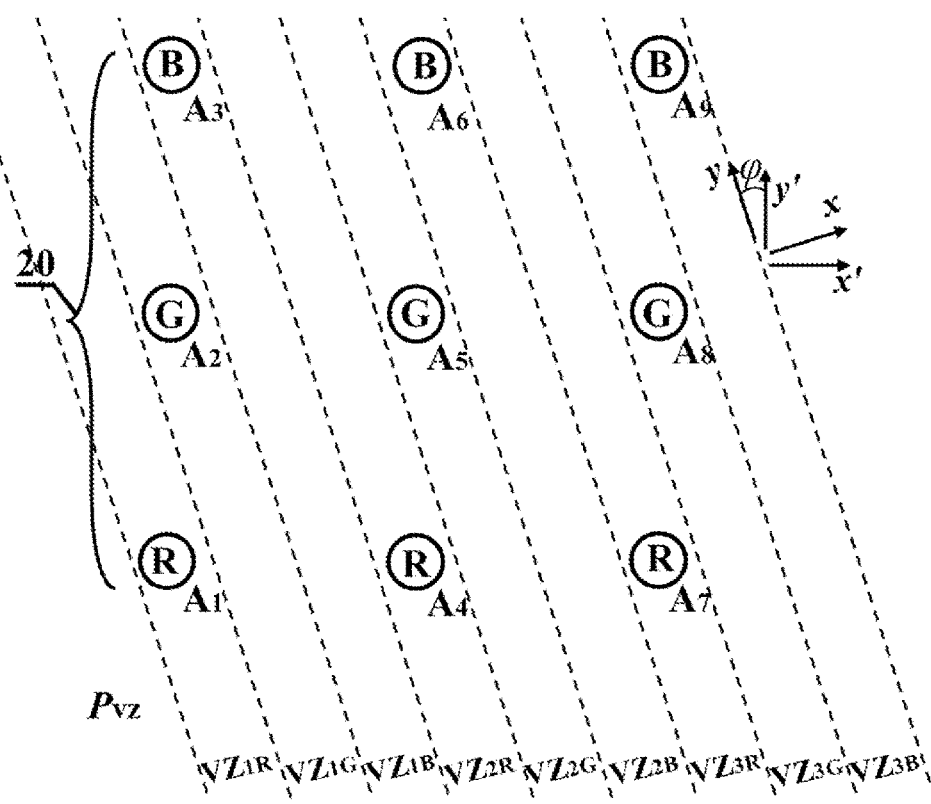
FIG. 17 shows a design example I for noise suppression where one-dimensional distributed strip-like viewing zones corresponding to different subpixel groups get presented.
Figure 18:
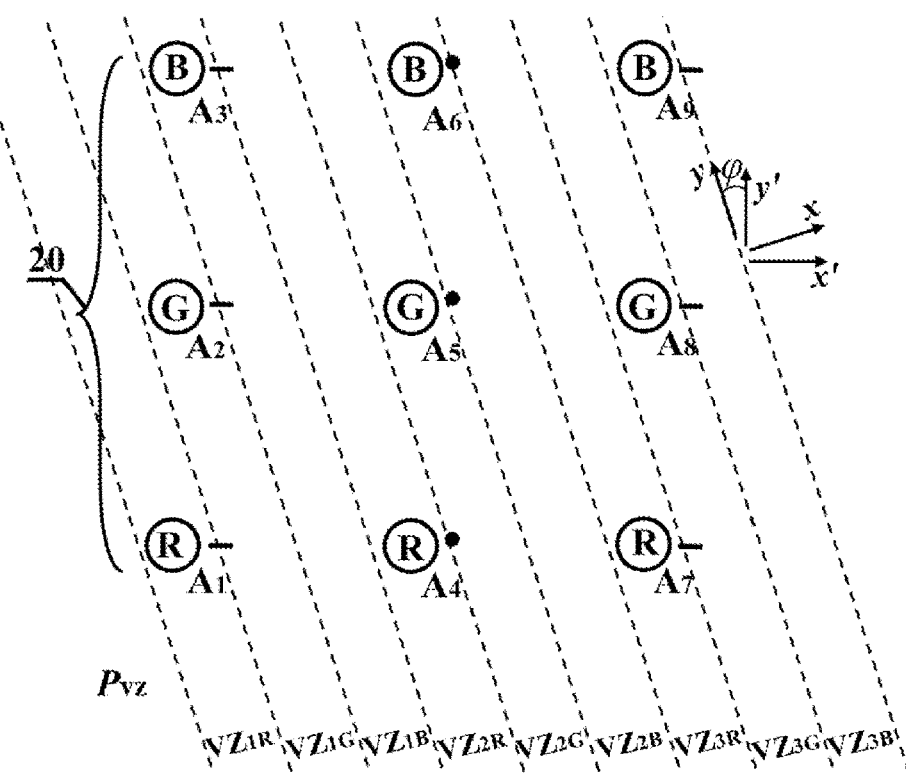
FIG. 18 shows a design example II for noise suppression where one-dimensional distributed strip-like viewing zones corresponding to different subpixel groups get presented.

In above examples, the light-splitting device 102 guides light from different pixel groups of the display screen 101 to corresponding viewing zones, respectively. The light-splitting device 102 can also guide light from different subpixel groups to corresponding viewing zones, respectively. As shown in FIG. 16, a display screen 101 with three kinds of subpixels is adopted. Among them, R subpixels emit R light, G subpixels emit G light, and B subpixels emit B light. The R subpixels are divided into three subpixel groups, whose projected light is guided to viewing zones $VZ_{1R}$, $VZ_{2R}$, and $VZ_{3R}$ by the light-splitting device 102, respectively. The G subpixels are divided into three subpixel groups, whose exit light is guided to viewing zones $VZ_{1G}$, $VZ_{2G}$, and $VZ_{3G}$ by the light-splitting device 102, respectively. The B subpixels are divided into three subpixel groups, whose exit light is guided to viewing zones $VZ_{1B}$, $VZ_{2B}$, and $VZ_{3B}$ by the light-splitting device 102, respectively. Similarly, a deflection aperture is set for each viewing zone, correspondingly. In this case, the deflection apertures corresponding to adjacent viewing zones can be designed with different orthogonal characteristics, so as to suppress crosstalk noise between light information projected to adjacent viewing zones. FIG. 17 takes three color orthogonal states as example. Concretely, taking three adjacent viewing zones $VZ_{1R}$, $VZ_{1G}$, and $VZ_{1B}$ as an example, their corresponding deflection apertures $A_1$, $A_2$, and $A_3$ are with three color orthogonal characteristics, respectively allowing only R light, G light, and B light deflected out. That is, the deflection aperture $A_1$ allows R light to be deflected out, but blocks G light and B light, the deflection aperture $A_2$ allows G light to be deflected out, but blocks B light and R light, the deflection aperture $A_3$ allows B light to be deflected out, but blocks G light and R light. These characteristics can get implemented by attaching a corresponding color filter to each deflection aperture. For example, a color filter which allows R light passing through and blocks G light and B light is attached to the deflection aperture $A_1$. The crosstalk noise between light information projected to adjacent three viewing zones will be suppressed effectively. FIG. 18 shows orthogonal characteristics combining three color orthogonal states and two linear polarization orthogonal states. Specifically, deflection aperture $A_1$ corresponding to the viewing zone $VZ_{1R}$ is with both R color orthogonal state and "−" linear polarization state, and only allow "−" R light deflected out. Deflection aperture $A_2$ corresponding to the viewing zone $VZ_{1G}$ is with both G color orthogonal state and "−" linear polarization state, and only allow "−" G light deflected out. Deflection aperture $A_3$ corresponding to the viewing zone $VZ_{1B}$ is with both B color orthogonal state and "−" linear polarization state, and only allow "−" B light deflected out. Deflection aperture $A_4$ corresponding to the viewing zone $VZ_{2R}$ is with both R color orthogonal state and "·" linear polarization state, and only allow "−" R light deflected out. Deflection aperture $A_5$ corresponding to the viewing zone $VZ_{2G}$ is with both G color orthogonal state and "·" linear polarization state, and only allow "·" G light deflected out. Deflection aperture $A_6$ corresponding to the viewing zone $VZ_{2B}$ is with both B color orthogonal state and "−" linear polarization state, and only allow "−" B light deflected out. Other viewing zones and corresponding deflection apertures follow similar design laws. A subpixel group only projects light of characteristics identical to that of the corresponding deflection aperture. Thus, crosstalk noise between light information projected to adjacent 6 viewing zones gets suppressed. Furthermore, similar to what are shown by FIG. 10 and FIG. 11, a deflection aperture corresponding to a viewing zone can be replaced by two or more sub-deflection apertures with different orthogonal characteristics. Simultaneously, corresponding sub-subpixel group is set for a sub-deflection aperture.

Figure 19:
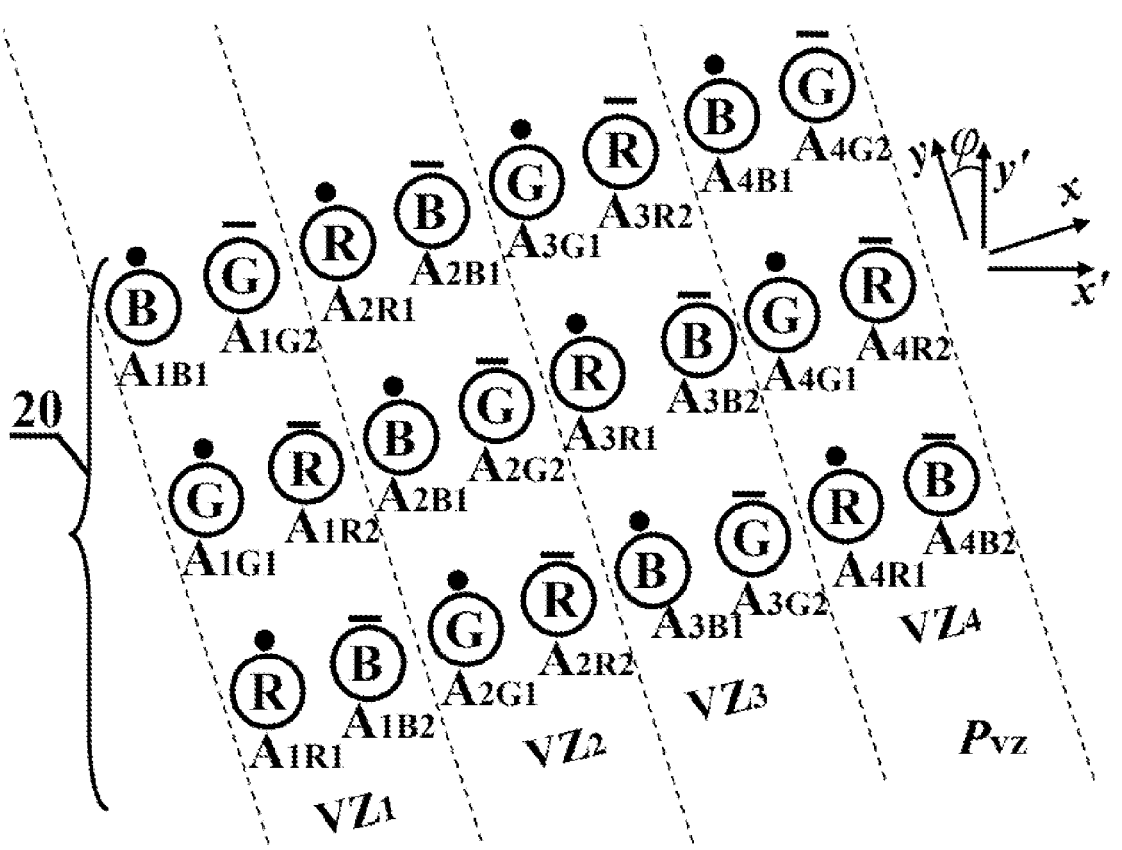
FIG. 19 shows an example where sub-deflection apertures corresponding to a same strip-like viewing zone are arranged along the arrangement direction of the viewing zones.

The sub-deflection apertures corresponding to a viewing zone discussed above are all aligned along a direction perpendicular to viewing zones' alignment direction. The sub-deflection apertures for a viewing zone can also be arranged along other directions, such as the two-dimensional arrangement shown in FIG. 19. Here, six sub-deflection apertures with different color and/or linear polarization orthogonal states are designed for each viewing zone. For example, sub-deflection aperture $A_{1R1}$ corresponding to the viewing zone $VZ_1$ is with both R color orthogonal state and "·" linear polarization state. Sub-deflection aperture $A_{1R2}$ corresponding to the viewing zone $VZ_1$ is with both R color orthogonal state and "−" linear polarization state. Sub-deflection aperture $A_{1G1}$ corresponding to the viewing zone $VZ_1$ is with both G color orthogonal state and "·" linear polarization state. Sub-deflection aperture $A_{1G2}$ corresponding to the viewing zone $VZ_1$ is with both G color orthogonal state and "−" linear polarization state. Sub-deflection aperture $A_{1B1}$ corresponding to the viewing zone $VZ_1$ is with both B color orthogonal state and "·" linear polarization state. Sub-deflection aperture $A_{1B2}$ corresponding to the viewing zone $VZ_1$ is with both B color orthogonal state and "−" linear polarization state. All R subpixels of the pixel group corresponding to the viewing zone $VZ_1$ are divided into two sub-subpixel groups. These two sub-subpixel groups exit "·" light and "−" light, respectively, and so respectively correspond to sub-deflection apertures $A_{1R1}$ and $A_{1R2}$. All G subpixels of the pixel group corresponding to viewing zone $VZ_1$ are divided into two sub-subpixel groups. These two sub-subpixel groups exit "·" light and "−" light, respectively, and so respectively correspond to sub-deflection apertures $A_{1G1}$ and $A_{1G2}$. All B subpixels of the pixel group corresponding to viewing zone $VZ_1$ are divided into two sub-subpixel groups. These two sub-subpixel groups exit "·" light and "–" light, respectively, and so respectively correspond to sub-deflection apertures $A_{1B1}$ and $A_{1B2}$. Other viewing zones and corresponding sub-deflection apertures follow the similar design laws. With the premise that the orthogonal projection of a sub-deflection aperture or the orthogonal projection of image of the sub-deflection aperture with respect to the relay device 50 on the plane $P_R$ is smaller than $D_p$ along all directions, the designment of more than one sub-deflection aperture along the viewing zones' arrangement direction for a same viewing zone allows a larger viewing-zone interval. When color orthogonal states are endowed to the deflection apertures or the sub-deflection apertures, it is preferable that at least one beam of R color, one beam of G color, and one beam of B color that passing through a displayed point can reach to the eye' pupil, when this displayed point is with all these three kinds of color light information.

Figure 20:
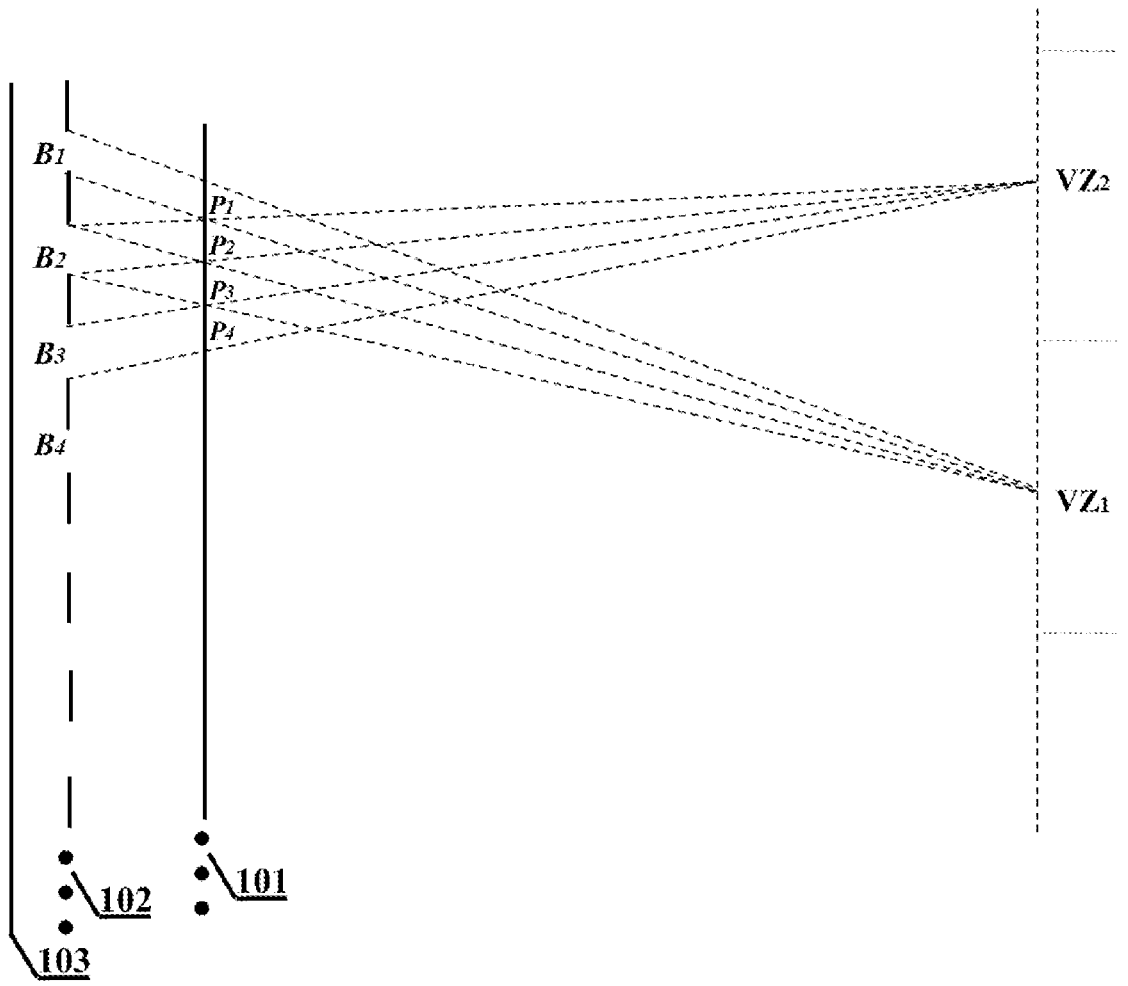
FIG. 20 is a schematic diagram of a multi-view display structure with an one-dimensional grating placed behind the display screen as the light-splitting device.

In above example, a lenticular grating is taken as an one-dimensional-grating light-splitting device 102. This kind of one-dimensional-grating light-splitting device 102 can also be a slit array. When a backlit-type display screen 101 is adopted, this kind of one-dimensional-grating light-splitter device 102 can also be arranged behind the display screen 101 along the propagation direction of the light. As shown in FIG. 20, a slit array behind the display screen 101 is used as a light-splitting device 102. The backlight from a backlight-source array 103 is modulated by the light-splitting device 102 into a light-band structure. The backlight-source array 103 shown here can be any potential optical structure that can provide backlight(s), such as the backlight unit that a paper LARGE REAL-TIME HOLOGRAPHIC 3D DISPLAYS: ENABLING COMPONENTS AND RESULTS from No. 13 of Vol. 36 of Applied Optics, published in 2017, has described, not refer to a specific structure. It is thus shown as a line in FIG. 20 and as an empty frame in FIG. 21, without any restrictive detail. Along the arrangement direction of the light bands, light from a light band will be modulated by a pixel or sub-pixel and then propagates toward the corresponding viewing zone. Thus, light from a pixel group or a sub-pixel group is guided to the corresponding viewing zone, and different viewing zones get generated. As shown in FIG. 20, light band $B_1$ guides a beam from the backlight-source array 103 through pixel $p_1$ to corresponding viewing zone $VZ_1$; light band $B_2$ guides a beam from the backlight-source array 103 through pixel $p_2$ to corresponding viewing zone $VZ_2$; light band $B_2$ guides another beam from the backlight-source array 103 through pixel $p_3$ to corresponding viewing zone $VZ_1$; light band $B_3$ guides a beam from the backlight-source array 103 through pixel $p_4$ to corresponding viewing zone $VZ_2$. For simplicity and clarity, only a few pixels, a few light bands and two viewing zones are shown in FIG. 20 for schematic description, where beams from the pixels $p_1$, $p_3$, $p_5$, $p_7$, . . . are guided to viewing zone $VZ_1$ and beams from the pixels $p_2$, $p_4$, $p_6$, $p_8$, . . . are guided to viewing zone $VZ_2$. Pixels $p_5$, $p_7$, . . . and pixels $p_6$, $p_8$, . . . are not shown in FIG. 20, which can be clearly envisioned according to the drawing rules.

Figure 21:
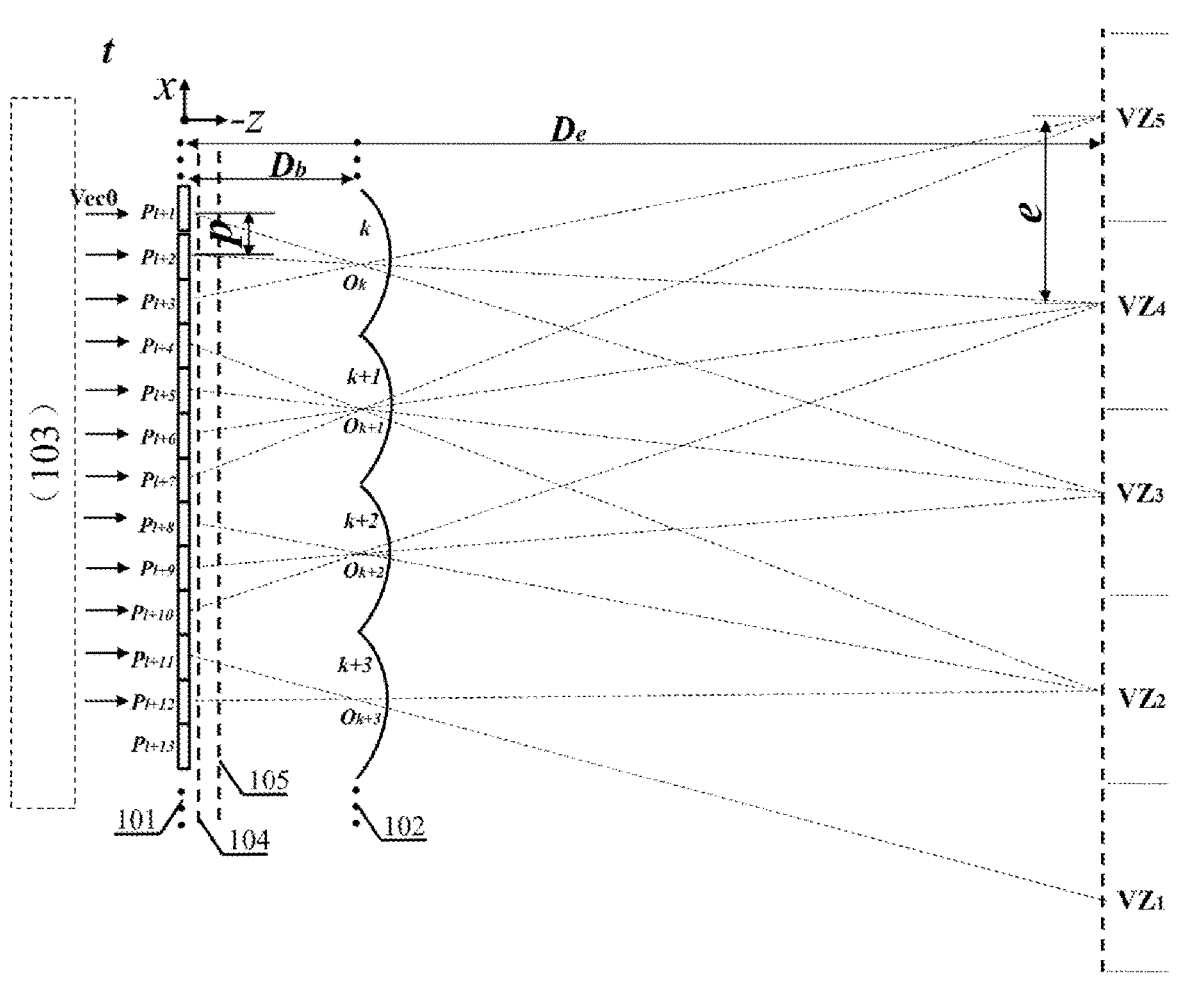
FIG. 21 is a schematic diagram of a multi-view display structure with a backlight-source assembly.
Figure 22:
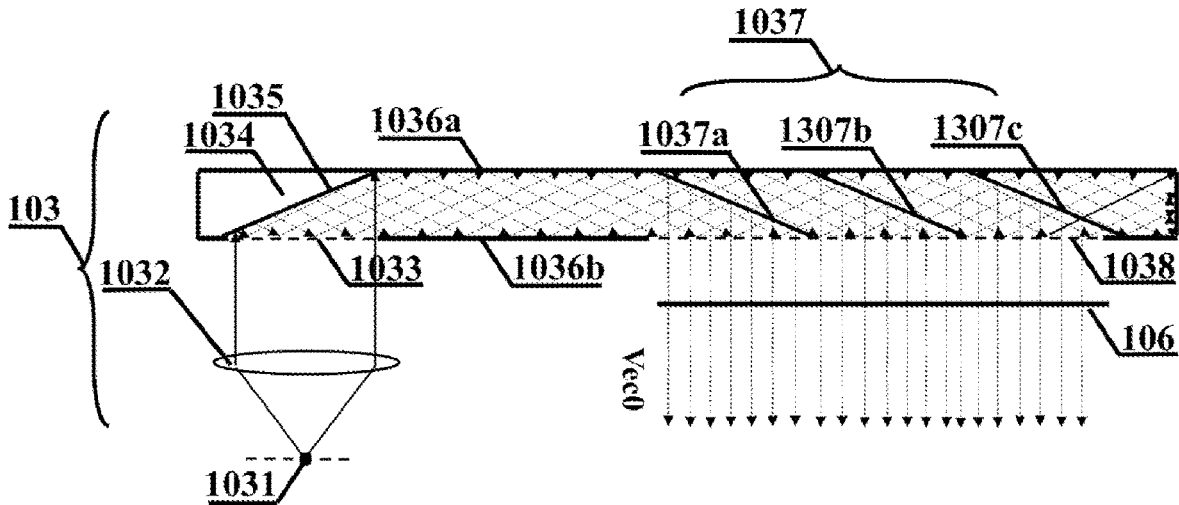
FIG. 22 shows an example I of an optical-waveguide-structure backlight-source assembly which projects a parallel backlight.

For the backlit-type display screen 101, parallel backlight from light-splitting device is often adopted, such as the parallel backlight shown in FIG. 21, which is along the x direction at a time-point t. In FIG. 21, a lenticular grating is taken as an one-dimensional-grating light-splitting device 102, with a cylindrical lens as the grating unit. A direction Vec0 denotes the incident direction of a parallel backlight. Similar to what is shown in FIG. 3, five viewing zones get generated by the light-splitting device 102. The backlight-source assembly 103 can be a lightweight optical waveguide structure, so as to thin the optical structure of the display module. FIG. 22 shows a structure of an optical-waveguide-structure backlight-source assembly 103, which includes a light source 1031, a collimating device 1032, an entrance pupil 1033, an optical waveguide body 1034, a coupling-in device 1035, reflective surfaces 1036a and 1036b, a coupling-out device 1037, and an exit pupil 1038. The exit light from light source 1031 is collimated by the collimating device 1032, then enters the coupling-in device 1035 through the entrance pupil 1033. The coupling-in device 1035 guides the light in the optical waveguide body 1034 to the coupling-out device 1037, by reflections of the reflection surfaces 1036a and 1036b. The coupling-out device 1037 makes the light be coupled out of the optical waveguide body 1034 through the exit pupil 1038 at a parallel state. Here, the shown coupling-out device 1037 is composed of three reflective surfaces 1037a, 1037b, and 1037c. Among them, the reflective surfaces 1037a and 1037b are semi-transparent and semi-reflective to incident light for extending the exit pupil 1038. In FIG. 22, the light source 1031 can also be a strip-like light source, with the long direction being consisted with that of the grating unit. In this case, the display screen 101 can be attached by a unidirectional scattering film 104 to scatter incident light to or outgoing light from each pixel or sub-pixel along the long direction of the grating unit, to make the light intensity distributed more evenly. A converging device 105 can also be placed near to the display screen 103 to converge the light along the long direction of the grating unit, so that the light distribution in each view zone gathers to the deflection apertures or sub-deflection apertures. In FIG. 21, the unidirectional scattering film 104 and the converging device 105 are placed in front of the display screen 101 along the light propagation direction. The unidirectional scattering film 104 or/and the converging device 105 can also be placed behind the display screen 101. When the converging device 105 or/and the unidirectional scattering film 104 are located between the backlight-source assembly 103 and the display screen 101, they can be integrated into the optical waveguide structure. For example, their function is carried out by a coupling-out device 1037 with a holographic grating structure. When a unidirectional scattering film 104 or/and a converging device 105 are adopted, the light source 1031 can also be with a dot shape. The backlight-source assembly 103 can also be stacked by a plurality of optical waveguide structures. For example, such different optical waveguide structures are respectively responsible for backlights of different colors.

Figures 23, 24:
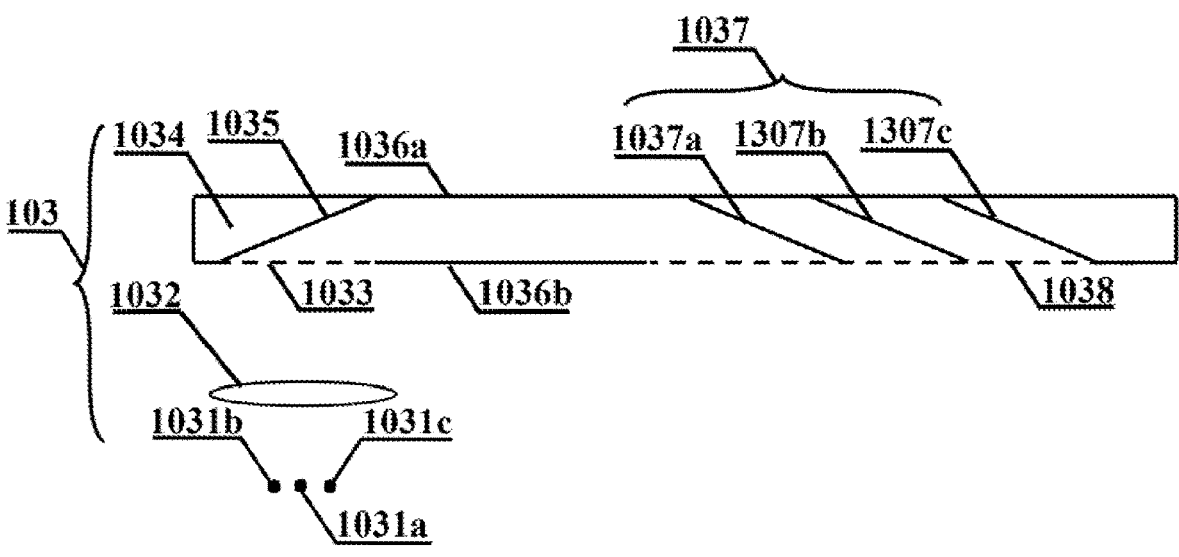
FIG. 23 is a schematic diagram of an optical-waveguide-structure backlight-source assembly with multiple timing light sources.
FIG. 24 shows the propagation directions of light beams from pixels corresponding to a parallel backlight.
Figure 25:
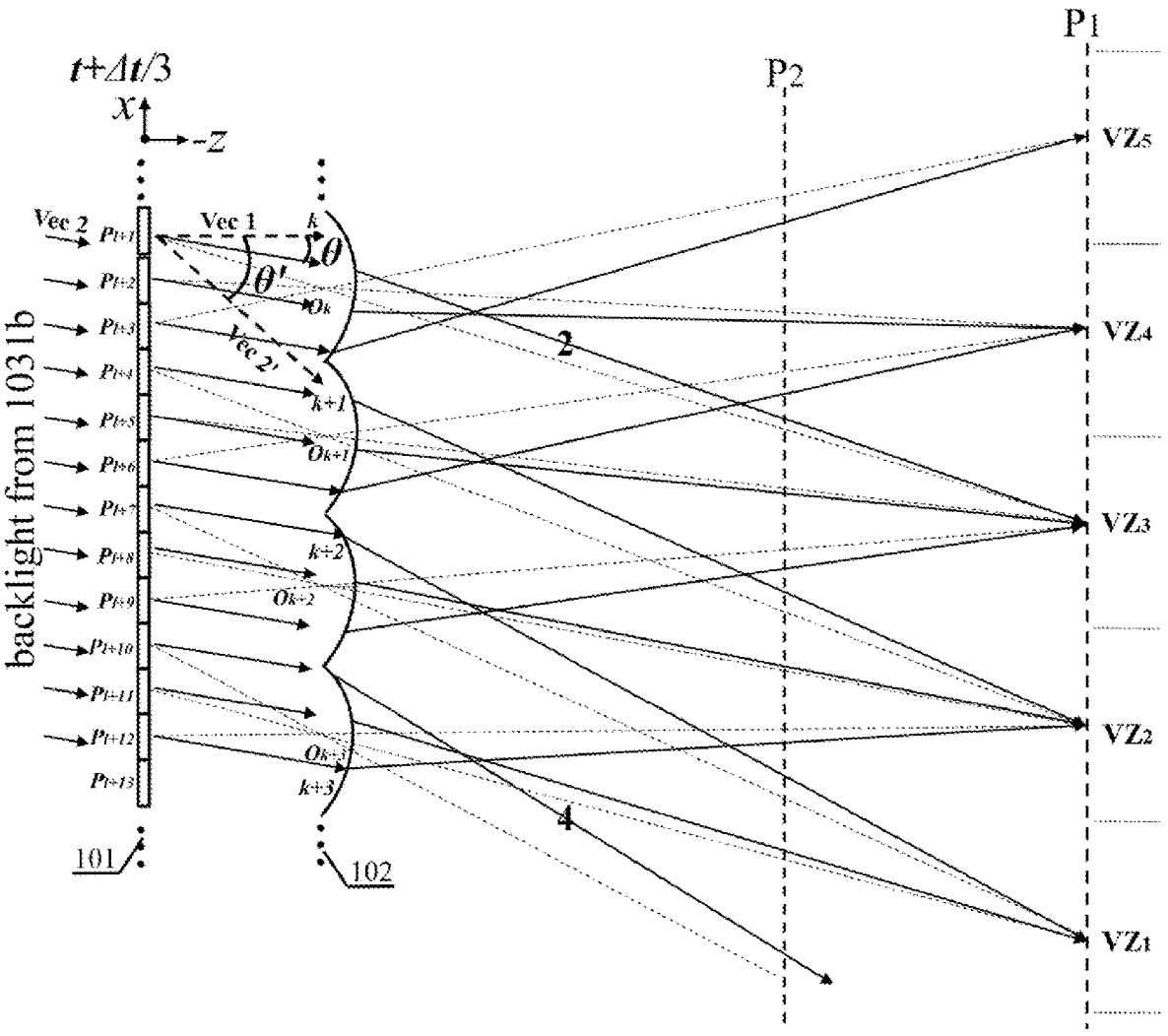
FIG. 25 shows the propagation directions of light beams from pixels corresponding to another parallel backlight.

Furthermore, the backlight-source assembly 103 can be with M≥2 timing light sources, to project backlights along different directions in a time sequential manner. The M≥2 timing light sources are controlled by the control device 30 to respectively project backlight with different directions at adjacent M time-points of a time period. M=3 timing light sources 1031a, 1031b, and 1031c are shown in FIG. 23. Specifically, at M=3 time-points t, t+Δt/3, and t+2Δt/3 of a time period t~t+Δt, the timing light sources 1031a, 1031b, and 1031c are turned on sequentially, and only one timing light source is turned on at one time point. At time point t, the turned-on timing light source 1031a projects a parallel backlight along direction Vec1, as shown in FIG. 24. Then, similar to what is shown in FIG. 3, five viewing zones $VZ_1$, $VZ_2$, $VZ_3$, $VZ_4$, $VZ_5$ get generated by the light-splitting device 102. At time-point t+Δt/3, the turned-on light source 1031b projects a parallel backlight along direction Vec2, as shown in FIG. 25. The angle between the direction Vec1 and the direction Vec2 is θ. The propagating directions of beams from different pixels are shown in FIG. 25. There are two cases. In the first case, beams from a same pixel are guided to a same viewing zone at time-point $t+\Delta t/3$ and time-point t. That is to say, the corresponding grating element of this pixel remains unchanged at these two different time-points. For example, the beam from pixel $p_{i+1}$ is guided to viewing zone $VZ_3$ along path 1 at time-point t, with grating element k whose optical center is $O_k$ as the corresponding grating element. At time-point $t+\Delta t/3$, with the same grating element k as the corresponding grating element, the beam from pixel $p_{i+1}$ is guided to the same viewing zone $VZ_3$, but along path 2. That is to say, at these two time-points, beams from the pixel $p_{i+1}$ is guided to the same viewing zone, but along different paths. Correspondingly, the loading light information is different. Due to refraction of the grating unit, at these two time-points, the eye 40 at viewing zone $VZ_3$ gets two spatial light points on the display screen 101. These two points are the two intersections of the path 1 and path 2 with the plane of display screen 101, respectively. This means an image of higher resolution being projected to the viewing zone $VZ_3$, resulted from temporal multiplexing. In the second case, light beams from a pixel are guided to different viewing zones at time-point $t+\Delta t/3$ and time-point t. That is to say, the corresponding grating element of this pixel changes at these two different time-points. For example, as shown in FIG. 24 and FIG. 25, the beam from pixel $p_{i+10}$ is guided to viewing zone $VZ_4$ along path 3 at a time-point t, with grating element k+2 whose optical center is $O_{k+2}$ as the corresponding grating element. At time-point $t+\Delta t/3$, with grating element k+3 as the corresponding grating element, the beam from pixel $p_{i+10}$ is guided to a new viewing zone along path 4. This new viewing zone is not shown and $O_{k+3}$ is the optical center of the grating element k+3. At these two time-points, beams from the pixel $p_{i+10}$ are guided to different viewing zones along different paths, which leads to more viewing zones.

In practice, when the incident directions of different backlight are with a small included angle, such as the θ shown in FIG. 25, the exit beams from a pixel at different time-points are more likely to reach to a same viewing zone. This results in that a view with higher resolution will be presented to corresponding viewing zone due to temporal multiplexing, as discussed above. In this case, with a larger number of viewing zones generated by the light-splitting device 102 at a time-point, a small included angle such as the θ is designed to promote the resolution of projected view corresponding to a viewing zone through the temporal multiplexing of multiple timing light sources. The final effect is equivalent to increasing the number of viewing zones indirectly. When the incident directions of different backlight are with a large included angle, such as the θ' shown in FIG. 25, the outgoing beams from a pixel at different time-points will reach to different viewing zones. This will result in a direct increasing of the number of viewing zones based on the temporal multiplexing. The θ' shown in FIG. 25 is the included angle between Vec1 and Vec2'. Vec2' is propagation direction of a hypothetical backlight at time-point $t+\Delta t/3$. In FIGS. 24 and 25, along the light propagation direction, the light-splitting device 102 is placed in front of the display screen 101, to guide the propagation direction of beams outgoing from the pixels. When a backlight-source assembly 103 is adopted, the light-splitting device 102 can be placed behind the display screen 101, to guide the propagation directions of incident beams to the pixels.

When the optical waveguide structure with timing light sources is taken as the backlight-source assembly 103, and the number of viewing zones is large enough, it is possible to cover two eyes of a viewer by the viewing zones with interval smaller than the diameter of the eye' pupil. In this case, the display module described in the present patent application can directly be used as a binocular display system, with the deflection-aperture array 20 removed, to realize three-dimensional display with natural focus through More-than-one-views-for-an-eye technique route. The viewer's eyes can be just located on the plane of viewing zones, i.e., on the plane $P_1$ of FIG. 25. It can also on a plane deviating from the plane of viewing zones, such as on the plane $P_2$ of FIG. 25. For example, with a backlit-type display panel of a mobile phone as the display screen 101, accompanied by an optical waveguide structure with timing light sources as backlight-source assembly 103, a handheld three-dimensional display system can be constructed by attaching a lenticular grating to the display panel as light-splitting device 102. In combination with what an American patent of GRATING BASED THREE-DIMENTIONAL DISPLAY METHOD FOR PRESENTING MORE THAN ONE VIEWS TO EACH PUPIL with patent No. U.S. Ser. No. 11/012,673B2. has claimed, the covering range of the viewing zones along connection direction of the viewer's two eyes will get enlarged, when a small included angle between the long direction of the grating element and this connection direction is designed. In addition, when the display screen 101 is with a large size, more than one optical waveguide structures can work together as a backlight-source assembly 103, with an optical waveguide structure projecting backlight to a portion of the display screen 101. The different portions of the display screen 101 can partially coincide with each other, or can be staggered with each other, as long as the premise that at least two passing-though light beams of a displayed object point reach to the corresponding pupil gets satisfied.

Parallel backlights with different propagating directions can also get achieved by a timing deflector 106 shown in FIG. 22. The timing deflector 106 is placed to take backlight from the backlight-source assembly 103 as incident light. At different time-points of a time period, the timing deflector 106 is controlled by the control device 30 to deflect the incident light by different angles, for providing backlights with different propagating directions time-sequentially. For example, a liquid device being capable of modulating the phase of incident light can be taken as the timing deflector 106. Furthermore, multiple timing backlight sources and the timing deflector 106 may work together. The timing deflector 106 can also work together with other type of backlight-source assembly 103.

Figure 26:
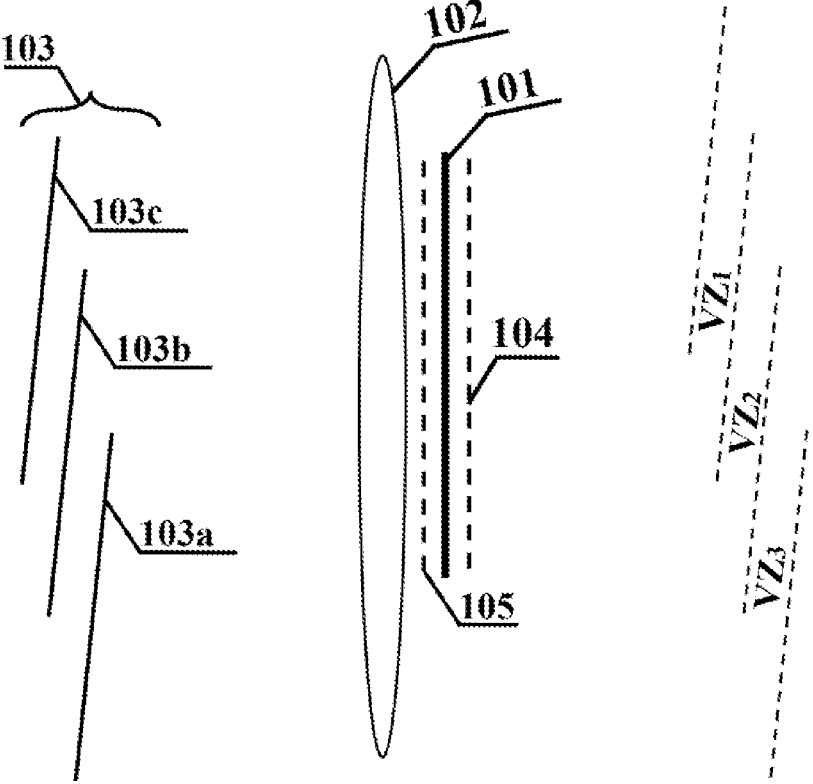
FIG. 26 shows an example of a multi-view display structure with a converging-structure light-splitting device.

When the backlit-type display screen 101 is used and multiple backlights are sequentially projected by the backlight-source assembly 103, a converging-structure light-splitting device 102 can be used, to present one-dimensional-distributed strip-like viewing zones, as shown in FIG. 26. In FIG. 26, the backlight-source assembly 103 consists of M=3 strip-like timing light sources 103a, 103b, and 103c. The converging-structure light-splitting device 102 takes a lens as an example, functioning to image the strip-like timing light sources 103a, 103b, and 103c as viewing zones $VZ_1$, $VZ_2$, and $VZ_3$, respectively. In this case, the display screen 101 can be attached by a unidirectional scattering film 104 to scatter incident light to or outgoing light from each pixel or sub-pixel, along the long direction of the strip-like viewing zones. Thus, the light distribution is distributed more evenly along the long direction in a viewing zone. A converging device 105 can also be placed in front of or behind the display screen 101, to make light emitted from a pixel or sub-pixel converge to the deflection apertures or sub-deflection apertures. The backlight-source assembly 103 in FIG. 26 can be replaced by the optical waveguide structure shown in FIG. 23, or other type of backlight-source assembly 103 which can provide back-lights along different directions. A timing light source of the backlight-source assembly 103 in FIGS. 23 and 26 can be replaced by strip-like light sources of different colors, which are turned on at the time-point corresponding to the replaced timing light source. The colors of the strip-like sources replacing a time light source should coincide with the displayed colors of the display screen 101. For example, three strip-like light sources, which respectively emit R light, G light, and B light, are used to replace a timing light source of FIG. 23 or FIG. 26. At a time-point, three strip-like light sources of different colors get activated simultaneously, and the viewing zones similar to that shown in FIGS. 16, 17, and 18 will get generated. Similarly, a timing light source in FIG. 23 or FIG. 26 can also be replaced by more than one light sources with other orthogonal characteristics, which are turned on simultaneously at time-points for this timing light source. For example, two light sources respectively emitting "·" light and "–" light can replace a corresponding timing light source. Under this condition, the pixels or subpixels of the display screen 101 are divided into two groups, which only transmit "·" light and "–" light, respectively. At a time-point, when lights from two turned-on light sources can reach to the display panel with corresponding polarization characteristics unchanged, the images of the two light sources appear at two viewing zones simultaneously, carrying light information from respective corresponding pixel or subpixel groups.

Embodiment 2

Figure 27:
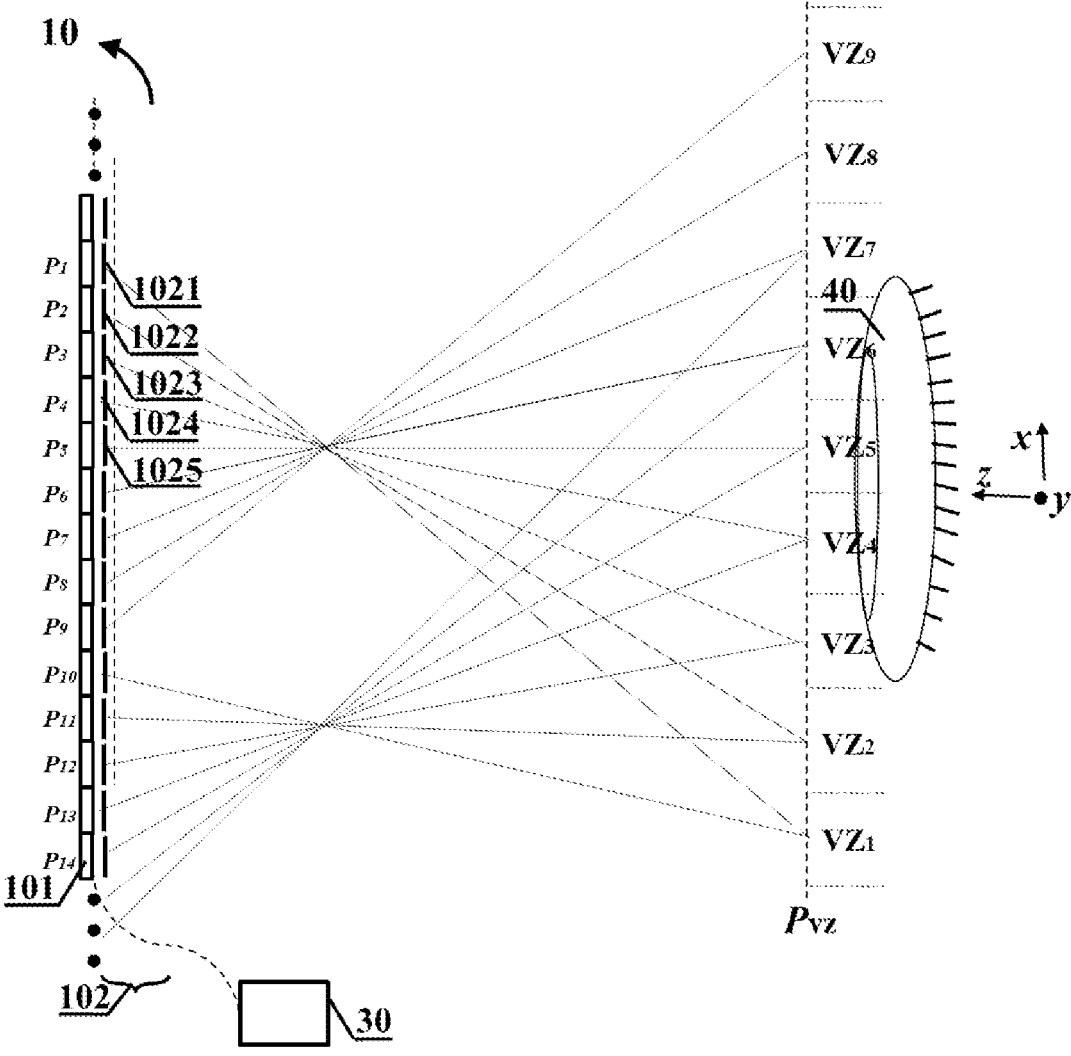
FIG. 27 shows a schematic diagram of a multi-view display structure with a microstructure array as the light-splitting device.
Figure 28:
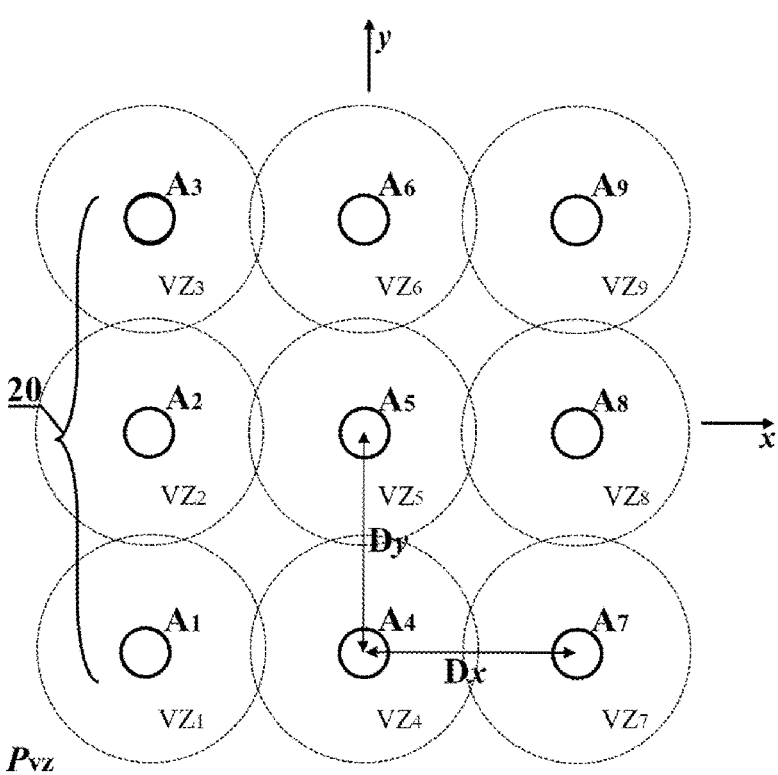
FIG. 28 shows an arrangement of deflection apertures, corresponding to two-dimensional distributed viewing zones.

An array of microstructures is used as the light-splitting device 102, as shown in FIG. 27. A microstructure unit corresponds to a pixel of the display screen 101, to deflect the projection direction of the light beam from the corresponding pixel. Thus, different groups of pixels on the display screen 101 project light beams to corresponding viewing zones, respectively. The display screen 101 and the light-splitting device 102 construct a multi-view display structure 10. The viewing zones are two-dimensionally distributed, as shown in FIG. 28. The nine viewing zones are named as viewing zone $VZ_1$, viewing zone $VZ_2$, viewing zone $VZ_3$, viewing zone $VZ_4$, viewing zone $VZ_5$, viewing zone $VZ_6$, viewing zone $VZ_7$, viewing zone $VZ_8$, and viewing zone $VZ_9$, respectively. They are two-dimensionally arranged along the x direction and the y direction. In an one-to-one manner, nine views are projected by nine pixel groups on the display screen 101 to these nine viewing zones, by the guidance of the light-splitting device 102. There is no common pixel among these pixel groups, and pixels of a pixel group are distributed throughout the display screen 101. That is to say, the nine pixel groups correspond to the nine viewing zones in an one-to-one manner. Each pixel of a pixel group takes the viewing zone corresponded by this pixel group as the corresponding viewing zone.

Figure 29:
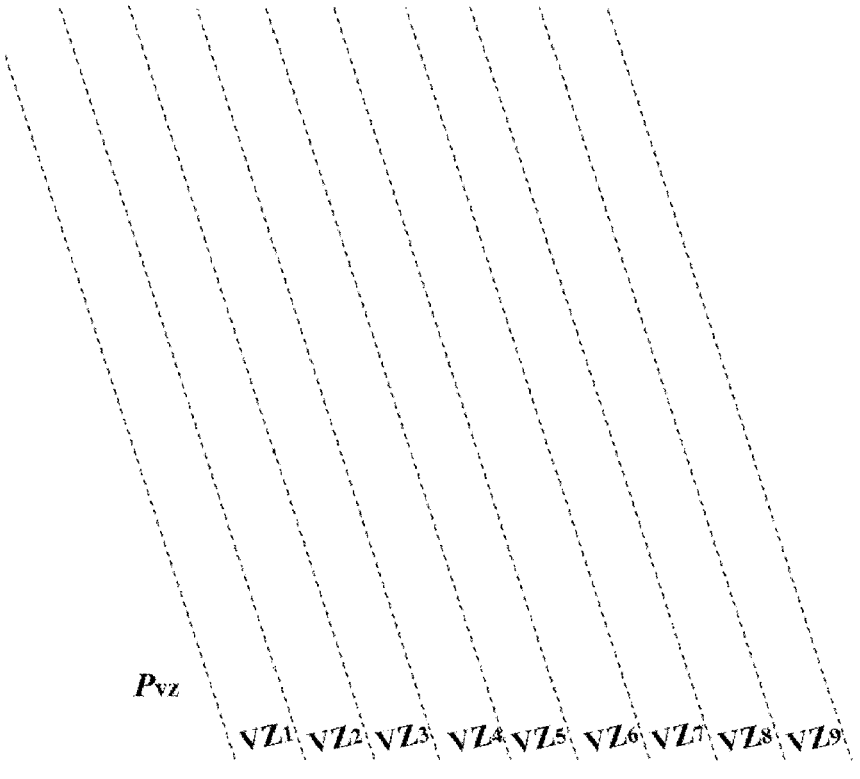
FIG. 29 is a schematic diagram of one-dimensional distributed strip-like viewing zones generated by a microstructure array light-splitting device.

The viewing zones can also be strip-like viewing zones, such as the one-dimensionally distributed viewing zones shown in FIG. 29. For example, a microstructure unit deflects the propagation direction of the incident light along the arrangement direction of the viewing zones, and scatters the light along the direction perpendicular to this arrangement direction. Similar to what has been discussed in Embodiment 1, subpixels can be used as the display units, and the microstructure array of the light-splitting device 102 corresponds to the sub-pixels in an one-to-one manner, to project strip-like viewing zones arranged long an one-dimensional direction. Under this condition, the orthogonal characteristics of the deflection aperture array 20 can be designed as those described in Embodiment 1. In the following part of the present embodiment, only the case of two-dimensional distributed viewing zones will be described.

A deflection aperture is set for each viewing zone. Pixels and a deflection aperture that have a common corresponding viewing zone also take a corresponding relationship. All deflection apertures constitute the deflection aperture array 20. A deflection aperture in FIG. 28 is shown as a circular shape. They can also be of other shapes. Being placed at the corresponding viewing zone is the optimal choice for a deflection aperture. With the premise that beams from all pixels of the corresponding pixel group can reach to a deflection aperture, this deflection aperture can be placed away from the corresponding viewing zone. The following parts of the present embodiment will be described under the condition that each deflection aperture takes its optimal placement. FIG. 28 shows a viewing zone denoted by a dotted circle, which does not mean a real light distribution area. The light from a pixel group transmits or is reflected by refraction or reflection of the corresponding deflection aperture. A control device 30 controls the light information loading of each pixel or sub-pixel, which is the projection light information of the scene to be displayed along the reverse direction of the corresponding projection direction. The projection direction corresponding to a pixel or sub-pixel is the propagation direction of a light beam which is projected by this pixel or sub-pixel and reaches to the observing zone for the eye 40. An image projected by a pixel group is a view of the scene to be displayed with respect to the corresponding deflection aperture. The orthogonal projections of adjacent deflection apertures on the projection plane which is perpendicular to the eye's visual direction are set with an interval smaller than the pupil's diameter $D_p$ of the eye 40. For example, in FIG. 28, the lengths of orthogonal projections of $D_x$ and $D_y$ are both smaller than $D_p$. Here, $D_x$ and $D_y$ are two lines connecting center points of adjacent viewing zones along the arrangement directions x and y, respectively. The projection plane is a plane perpendicular to the visual direction of the eye 40. Then, the eyes 40 located at the plane $P_{VZ}$ of the viewing zones will perceive at least a complete view which is projected by a pixel group to the corresponding viewing zone. So, for a displayed point, the premise that at least one passing-through light beam reach to the eye's pupil gets satisfied. The orthogonal projection of a deflection aperture on the projection plane is designed to be less than 2.5 mm (half of the average diameter of the pupil of the human eye) along all directions, to make a deflected beam propagating to the observing zone for the eye 40 be with a small divergence angle. This can guarantee a small light intensity gradient along a beam's propagation direction. Then, when the eye 40 receives only one complete image, i.e. one complete view, a VAC-free three-dimensional display will get implemented by the binocular system shown in FIG. 2, through the Maxwellian view technique route. As the interval between adjacent deflection apertures decreases, more than one view will be perceived by the eye 40. Under this condition, for a displayed point, more than one passing-through light beams will be perceived by the eye 40 in a display module. A VAC-free three-dimensional display will get implemented in a binocular system shown in FIG. 2, through the More-than-one-views-to-an-eye technique route.

As a physical entity, the deflection-aperture array 20 needs to be with a certain distance to the eye 40. As the distance between the eye 40 and the deflection-aperture array 20 increases, the light information deflected by a deflection aperture and perceived by the eye 40 changes from a complete view into a partial view. When a complete view deflected out by a deflection aperture cannot be perceived completely by the eye 40, the perceived image can be a stitched image of partial views from different pixel groups. In this case, the design requirement that the interval between the orthogonal projections of adjacent deflection apertures is smaller than $D_p$ is necessary. Under this condition, for a displayed point, at least one passing-through beam can be perceived by the eye 40. The Maxwellian view and More-than-one-views-for-an-eye will play functions together when a part of displayed points are with only one passing-through beam perceived by the eye 40 and the other part of displayed points are with more than one passing-through beams perceived by the eye 40.

Figure 30:
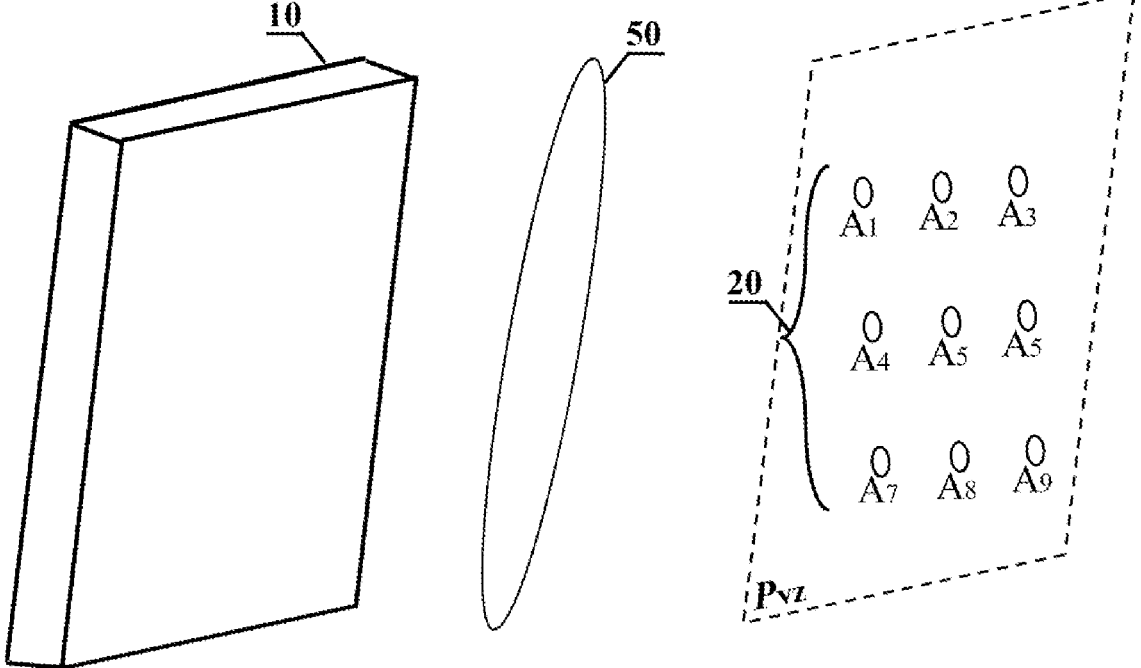
FIG. 30 shows an example II of a display module with a lens as the relay device.

A relay device 50, such as the lens shown in FIG. 30, can also be introduced in. The lens-type relay device 50 magnifies the virtual image of the multi-view display structure 10. The distribution of the viewing zones also changes due to the introduction of the lens-type relay device 50. In this case, the virtual image of the multi-view display structure 10 is used as an equivalent multi-view display structure, and the images of the viewing zones with respect to the lens-type relay device 50 are taken as the equivalent viewing zones. With the equivalent multi-view display structure and the equivalent viewing zones, display can get implemented similar to the case dealing with a multi-view display structure and viewing zones. The lens-type relay 50 can also be a lens group, a phase device, etc.

Figure 31:
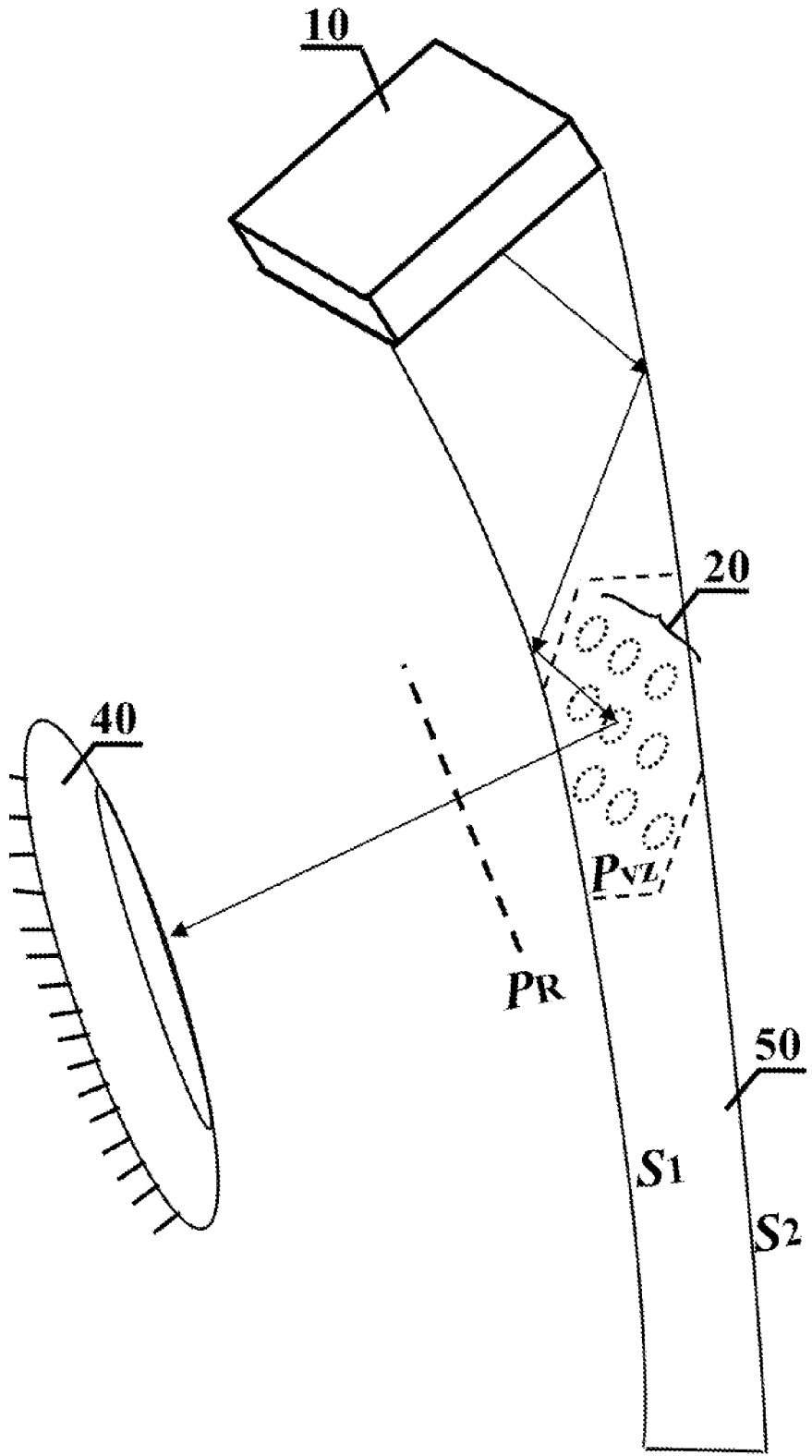
FIG. 31 shows an example II of a display module with an eyeglass-type relay device.
Figure 32:
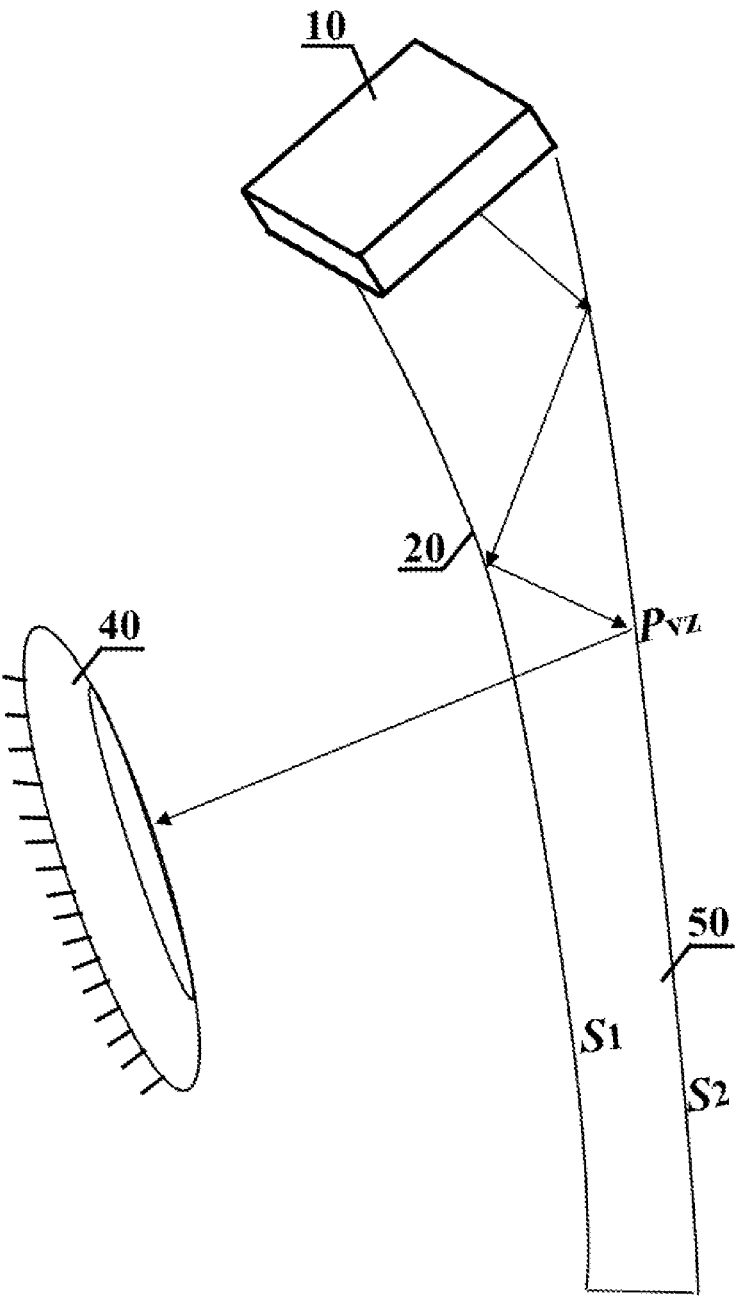
FIG. 32 shows an example III of a display module with an eyeglass-type relay device.
Figure 33:
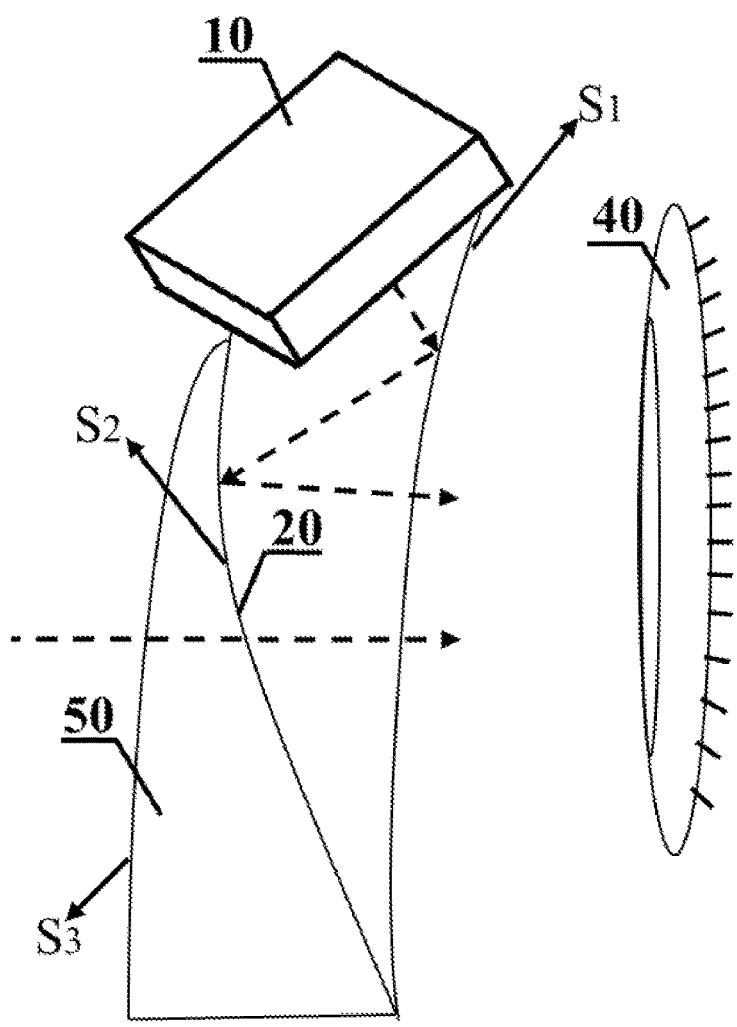
FIG. 33 shows an example II of a display module with a free-form surface device as the relay device.

A deflection aperture of the deflection-aperture array 20 can also be a reflection-type deflection aperture, such as a reflecting surface, which guides the incident light beam by reflecting. FIG. 31 shows a deflection-aperture array 20 composed of reflection-type deflection apertures. The deflection apertures are integrated into a relay device 50, which takes an eyeglass shape. This eyeglass-type relay device 50 is with two surfaces S1 and S2. Light beams from the multi-view display structure 10 propagate and are reflected by the surfaces S1 and S2, then reflected by each deflection aperture of the deflection aperture array 20, and finally transmit the plane S1. Here, the surfaces S1 and S2 can allow the ambient light to transmit. Due to a designed large incident angle, the beams from the display screen 10 are reflected by surfaces S1 and S2. A small incident angle, even approximately orthogonal incidence, of the ambient light and light deflected by the deflection apertures makes them pass through the surface S1. The orthogonal projection of each deflection aperture on the projection plane $P_R$ is smaller than 2.5 mm along all directions. On the projection plane $P_R$, the orthogonal projections of adjacent deflection apertures are with an interval smaller than the eye's pupil diameter $D_p$. Due to independent modulation of a microstructure unit with respect to the corresponding pixel's light beam, different viewing zones can be designed with different distances to the multi-view display structure 10. In FIG. 32, the viewing zones and deflection apertures are disposed on the surface S2. The relay device 50 can also adopt a free-form surface device as shown in FIG. 33. This kind of relay device 50 plays functions of both guidance and imaging. The multi-view display structure 10 is imaged by the surfaces S1 and S2 together. The deflection-aperture array is disposed on surface S2. The surface S3 compensates for the influence of the surfaces S1 and S2 on the external ambient light. In FIG. 33, the deflection apertures can also be disposed on the surface S1, or at other locations.

When viewing zones are arranged with an interval smaller than the pupil diameter $D_p$, the multi-view display structure 10 shown in FIG. 27 can work as an eyepiece directly. Two such eyepieces construct a near-eye VR system for VAC-free three-dimensional display following Maxwellian view or/and the More-than-one-views-for-an-eye technique routes. The multi-view display structure 10 shown in FIG. 27 can be combined with a relay device 50 shown in FIGS. 30~33. When the orthogonal projections of the viewing zones on the plane perpendicular to the eye's visual direction are with an interval smaller than $D_p$, the combination of multi-view display structure 10 and relay device 50 can act as an eyepiece for corresponding eye. For example, an optical structure shown in FIGS. 30 to 33 can work as an eyepiece, with the deflection-aperture array 20 being removed. Two such eyepieces for two eyes of the viewer can also construct a near-eye VR system for VAC-free three-dimensional display following Maxwellian view or/and the More-than-one-views-for-an-eye technique routes. In these cases, the viewing zones can also be of strip-like shape. For example, a microstructure unit of the light-splitting device 102 deflects the propagation direction of incident beam along an one-dimensional direction, but scatters the light along another direction which is perpendicular to above one-dimensional direction.

Figure 34:
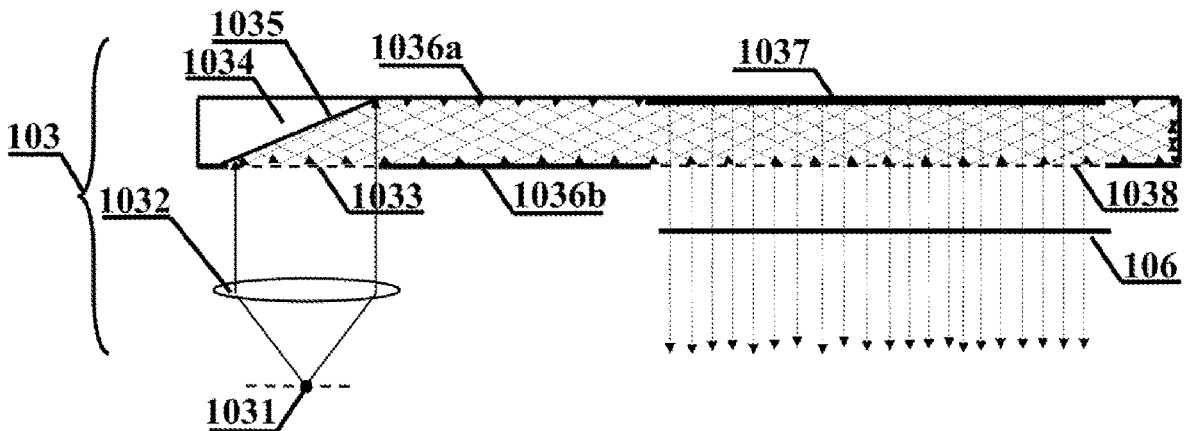
FIG. 34 shows an example II of an optical-waveguide-structure backlight-source assembly which projects a parallel backlight.
Figures 35, 36:
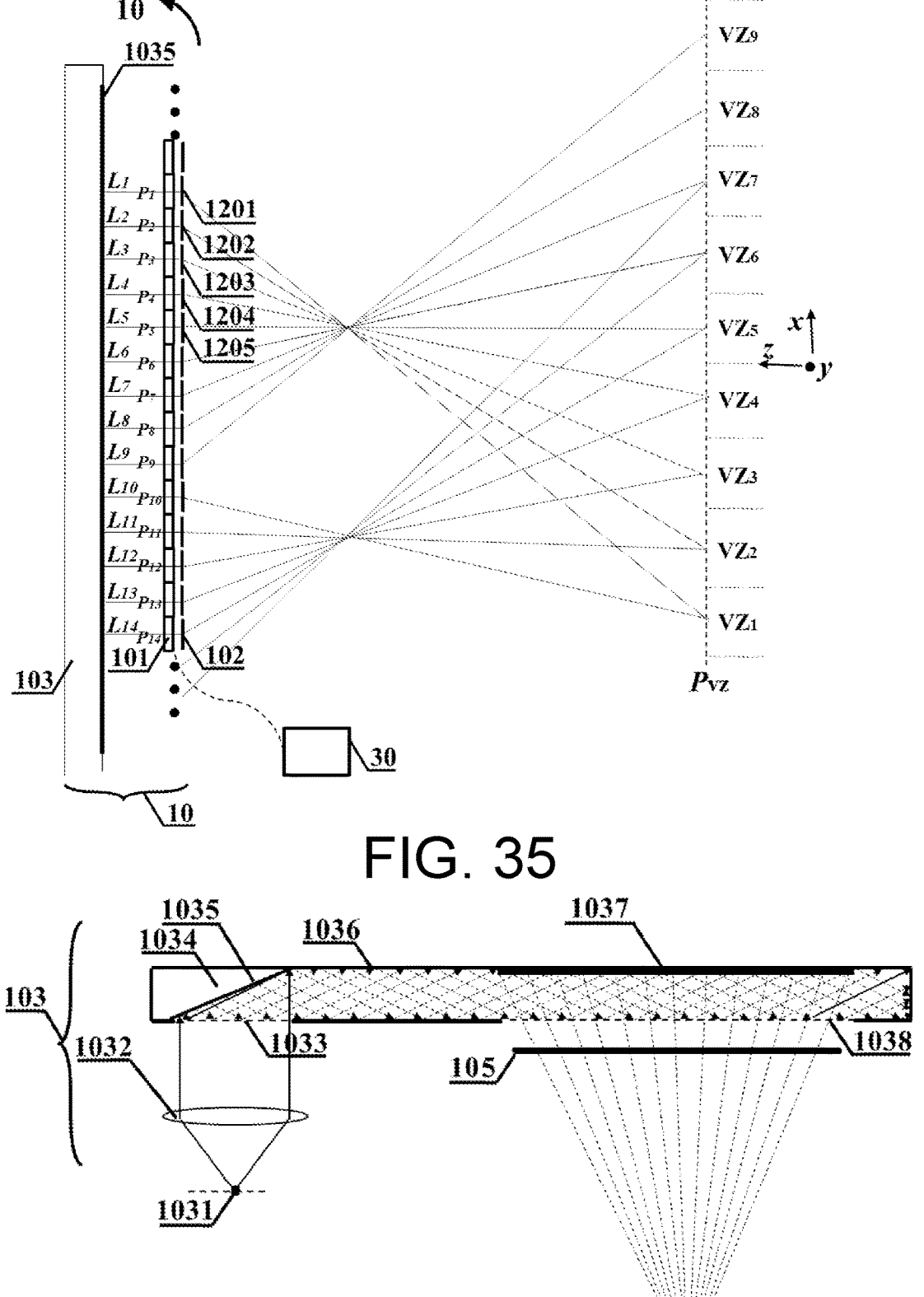
FIG. 35 is a schematic diagram of a multi-view display structure with an optical-waveguide-structure backlight-source assembly and a microstructure array light-splitting device.
FIG. 36 shows a schematic diagram of an optical-waveguide-structure backlight-source assembly combining a converging device to project a converging backlight.
Figure 37:
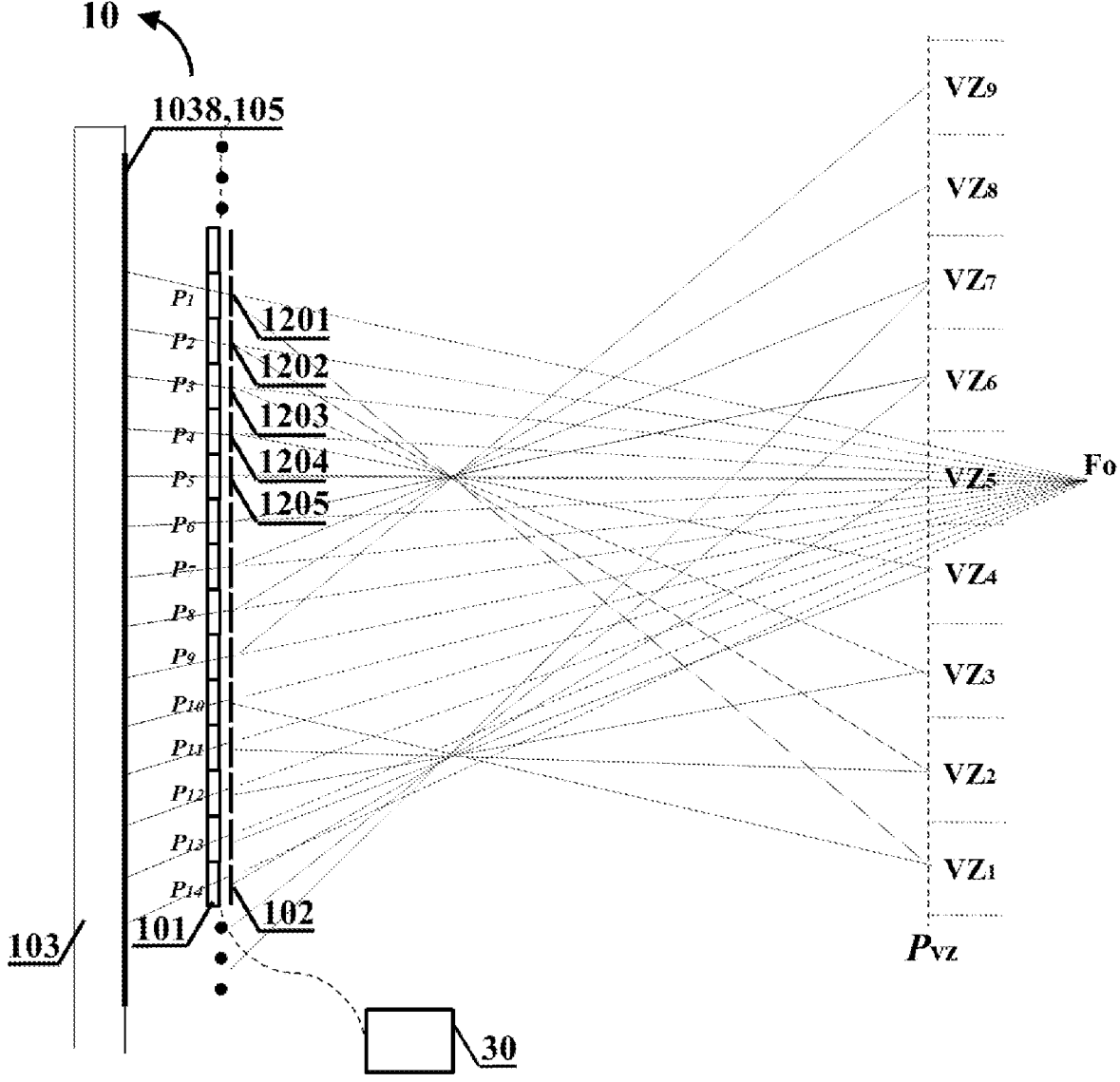
FIG. 37 is a schematic diagram of a multi-view display structure with a converging backlight.
Figure 38:
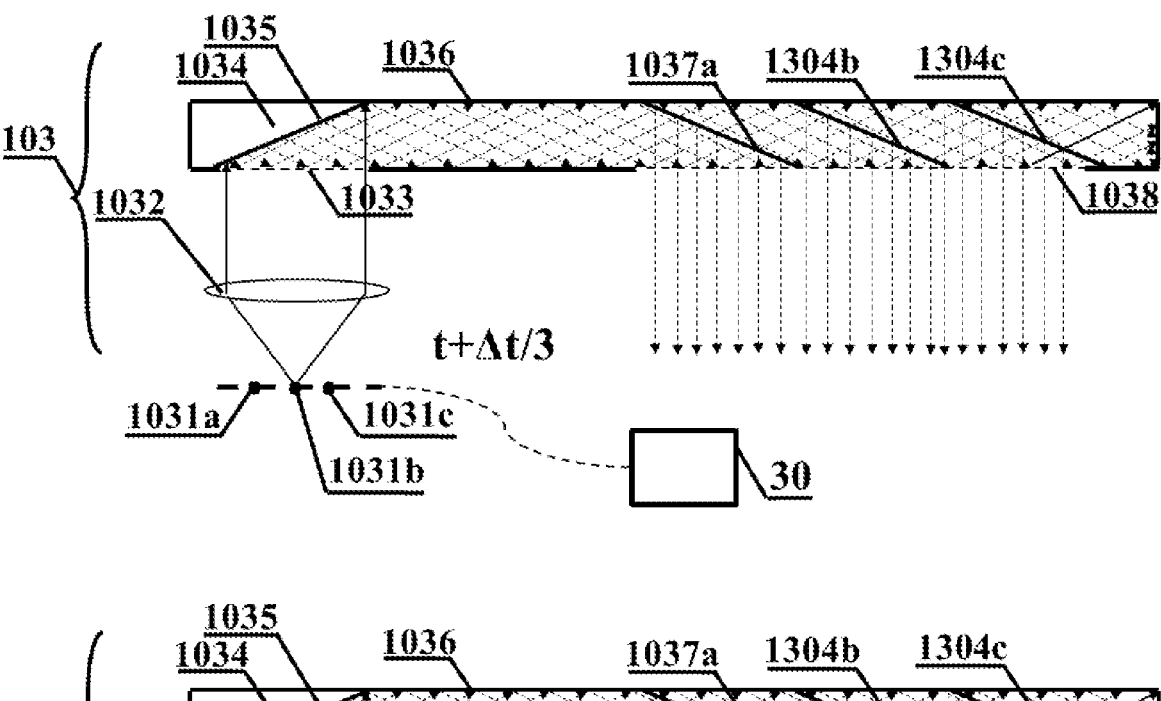
FIG. 38 is a schematic diagram of an optical-waveguide-structure backlight-source assembly which projects backlights along different directions in time sequence.

The display screen 101 in FIG. 27 can be a self-emitting display device or a backlit-type display device with a backlight-source assembly 103. When the display screen 101 is a backlit-type device, its backlight-source assembly 103 can also be an optical waveguide structure. As shown in FIG. 34, an optical-waveguide-structure backlight-source assembly 103 includes a light source 1031, a collimating device 1032, an entrance pupil 1033, an optical waveguide body 1034, a coupling-in device 1035, reflective surfaces 1036*a* and 1036*b*, a coupling-out device 1037, and an exit pupil 1038. The outgoing light from light source 1031 is collimated by the collimating device 1032, then enters the coupling-in device 1035 through the entrance pupil 1033. The coupling-in device 1035 guides the light in the optical waveguide body 1034 to the coupling-out device 1037, by reflections of the reflection surfaces 1036*a* and 1036*b*. The coupling-out device 1037 makes the light be coupled out the optical waveguide body 1034 through the exit pupil 1038 at a parallel state. Here, the shown coupling-out device 1037 is relief grating with the function of extending the exit pupil 1038. A multi-view display structure 10 with optical-waveguide-structure backlight-source assembly 103 is shown in FIG. 35. The backlight is modulated by the display screen 101. The modulated beam from a pixel is guided to the corresponding viewing zone by the light-splitting device 102. As shown in FIG. 35, the light beam $L_1$ from the optical-waveguide-structure backlight-source assembly 103 incidents on the pixel $p_1$. Then the beam with the light information of the pixel $p_1$ is guided to the viewing zone $VZ_1$, by the corresponding microstructure unit 1201 of the light-splitting device 102. The light beam $L_2$ from the optical-waveguide-structure backlight-source assembly 103 incidents on the pixel $p_2$. Then the beam with the light information of the pixel $p_2$ is guided to the viewing zone $VZ_2$, by the corresponding microstructure unit 1202 of the light-splitting device 102. And so on. So, nine viewing zones get generated. The optical-waveguide-structure backlight-source assembly 103 can also work together with a converging device 105 providing converging backlight, as shown in FIG. 36. In FIG. 36, the parallel backlight from the optical-waveguide-structure backlight-source assembly 103 is converged to a spot $F_o$ by the converging device 105. Actually, this converging backlight is converged to a spatial zone around the point $F_o$, not exactly a point $F_o$. The converging device 105 can be integrated into the optical-waveguide-structure backlight-source assembly 103, as shown in FIG. 37. The function of the converging device 105 shown in FIG. 37 is endowed into the coupling-out device 1037. Compared with FIG. 35, in FIG. 37, the backlights with respect to different pixels are along different directions. In the optical-waveguide-structure backlight-source assembly 103 of the FIGS. 34 and 36, M≥2 timing light sources can also be adopted, and the M timing light sources are turned on at different time-points of a time period, respectively. With FIG. 38 as an example, M=3 timing light sources 1031$a$, 1031$b$, and 1031$c$, which are sequentially turned on in a time period, project parallel backlights along different directions to the display screen 101 at M=3 time points of a time period, respectively. At a time-point t+Δt/3 of a time period t~t+Δt shown in the upper figure of FIG. 38, only the timing light source 1031$b$ is turned on, providing a parallel backlight along a direction. At a time-point t+2Δt/3 of a time period t~t+Δt shown in the lower figure of FIG. 38, only the timing light source 1031$c$ is turned on, providing a parallel backlight along another direction. These three kinds of backlight can help to generate more viewing zones based on temporal multiplexing, such as what is shown in FIG. 39. The left figure and right figure of FIG. 39 show different arrangements of viewing zones. Here, only viewing zones along an one-dimensional direction are shown as an example. The coupling-out device 1037 takes a holographic device as an example. Actually, only two classical optical waveguide structures are shown in FIGS. 34 and 36. Other kinds of optical waveguide structures can replace these shown optical waveguide structures.

Backlights with different propagating directions can also get achieved by a timing deflector 106 shown in FIG. 34. The timing deflector 106 is set to take backlight from the backlight-source assembly 103 as incident light. At different time-points of a time period, the timing deflector 106 is controlled by the control device 30 to deflect the incident light by an angle, so as to provide backlights with different propagating directions time-sequentially. The timing deflector 106 can play the same function as that of timing backlight sources. Furthermore, multiple timing backlight sources and the timing deflector 106 can work together.

Figure 40:
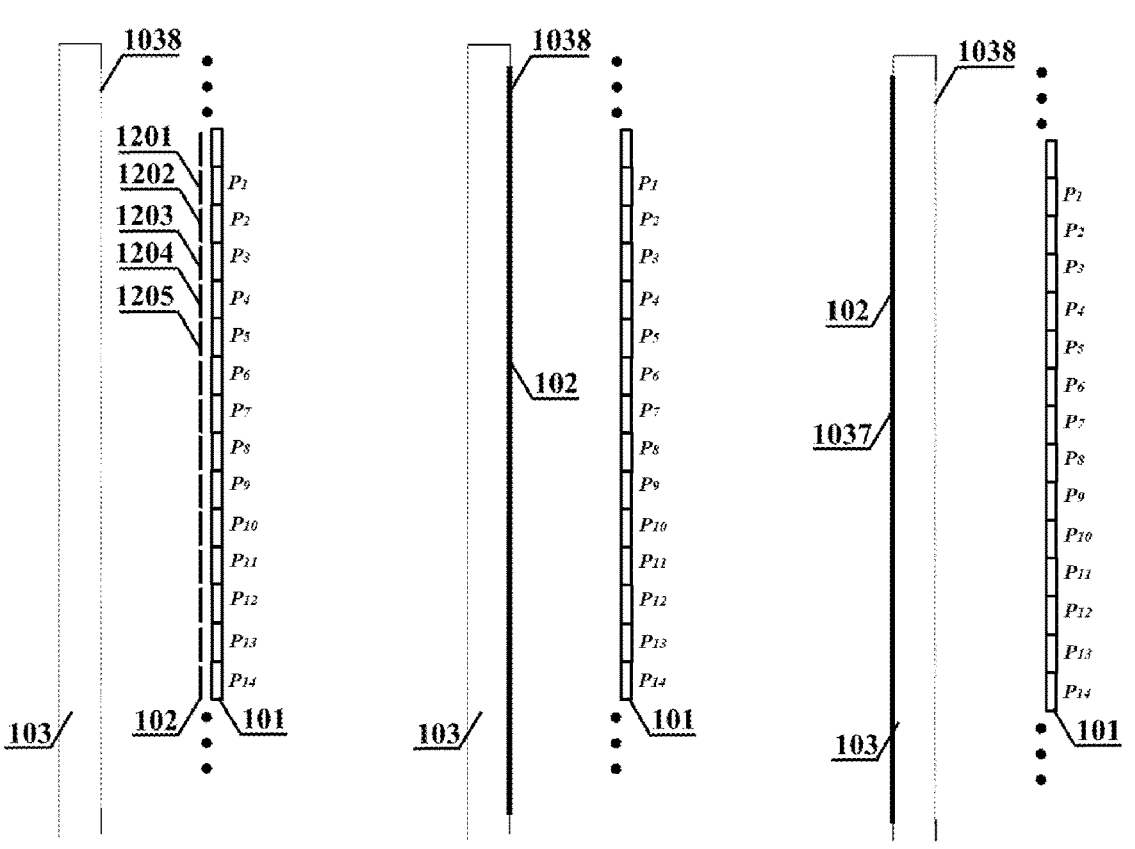
FIG. 40 shows a spatial positional relationship between a microstructure array light-splitting device and an optical-waveguide-structure backlight-source assembly.

In the above-described multi-view display structure 10 with an optical-waveguide-structure backlight-source assembly 103, the light-splitting device 102 always deflects the outgoing beams from the pixels of the display screen 101. The light-splitting device 102 can also deflect the propagating direction of a pixel's incident beam. As shown in the left figure of FIG. 40, the light-splitting device 102 is disposed between the optical-waveguide-structure backlight-source assembly 103 and the display screen 101, that is, the direction of the incident light beam of each pixel on the display screen 101 is deflected by the corresponding microstructure unit of the light-splitting device 102. Under this condition, the light-splitting device 102 can be integrated into the optical-waveguide-structure backlight-source assembly 103. As shown in the middle figure of FIG. 40, the light-splitting device 102 is integrated into the exit pupil 1038 of the optical-waveguide-structure backlight-source assembly 103. Another example as shown in the right figure of FIG. 40, the light-splitting device 102 is integrated into the coupling-out device 1037 of the optical-waveguide-structure backlight-source assembly 103.

Figure 41:
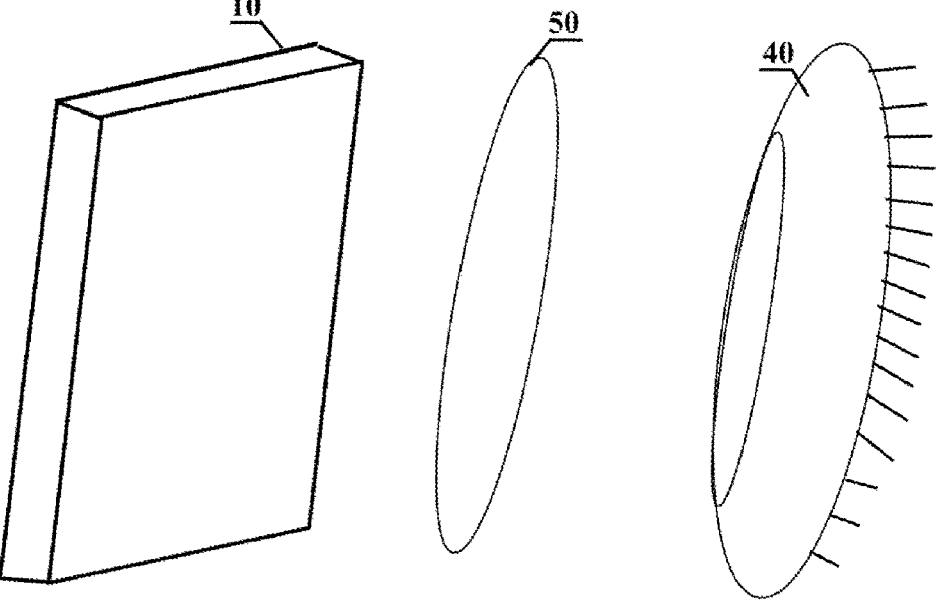
FIG. 41 shows an eyepiece consisting of a multi-view display structure and a lens relay device.
Figure 42:
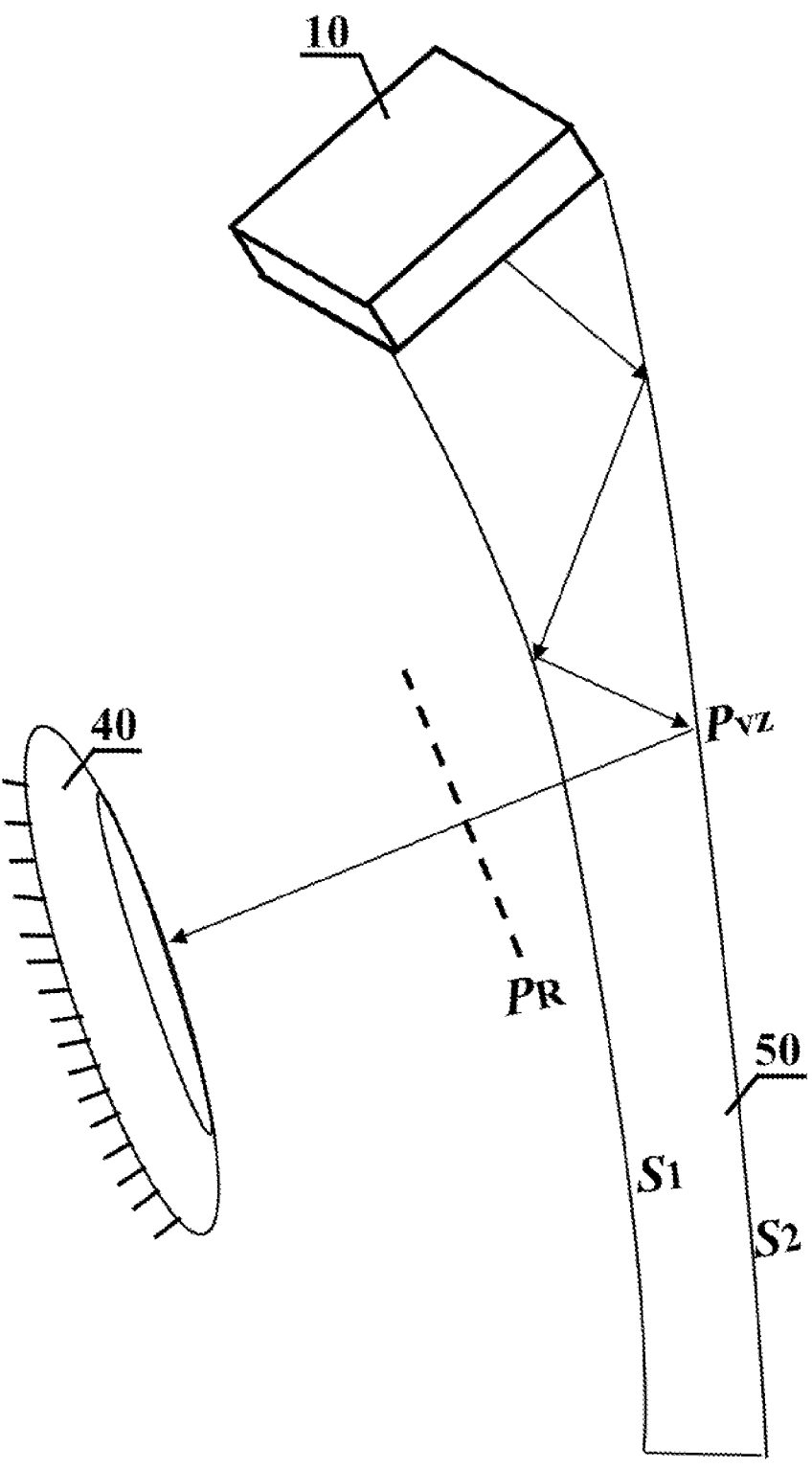
FIG. 42 shows an eyepiece consisting of a multi-view display structure and an eyeglass-type relay device.
Figure 43:
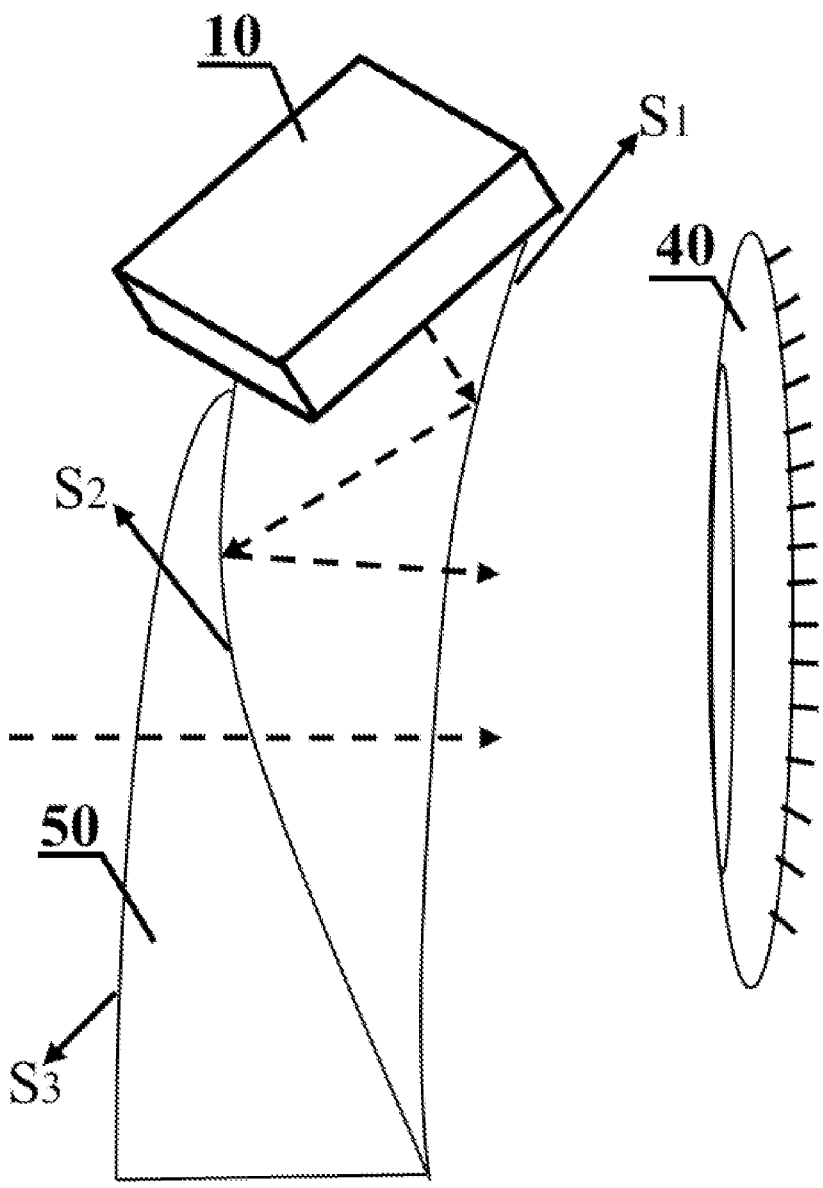
FIG. 43 shows an eyepiece consisting of a multi-view display structure and a free-form surface relay device.

When viewing zones are arranged with an interval smaller than the pupil diameter $D_p$, the multi-view display structure 10 shown in FIG. 27 can be taken as an eyepiece, without the requirement of a deflecting-aperture array 20. A display system can be constructed by two such structures, as eyepieces for two eyes of the viewer, respectively. A three-dimensional display free of VAC can get implemented by this display system through the Maxwellian view or the More-than-one-views-for-an-eye technique routes. The multi-view display structure 10 shown in FIG. 27 can also work together with relay device 50 shown in FIGS. 30~33. Under this condition, when the orthogonal projections of viewing zones on the plane perpendicular to the eye's visual direction are with an interval smaller than $D_p$, the multi-view display structure 10 can be directly used as an eyepiece without deflecting-aperture array 20, such as the eyepiece structures shown in FIGS. 41 to 43. A display system constructed by two such eyepieces can perform VAC-free display through Maxwell Maxwellian or More-than-one-views-for-an-eye technique routes. The display screen 101 in these eyepieces can be a backlit-type device, with backlight from optical-waveguide-structure backlight-source assembly 103 shown in FIG. 34, or in FIG. 36, or in FIG. 38, or other kinds of backlight-source assembly. The light-splitting device 102 can be placed at the positions shown in FIG. 40, to deflect the propagating direction of the incident light beam of each pixel. The viewing zones can take a strip-like shape, when a microstructure unit deflects the propagating direction of incident light along a direction, but scatters the light along another direction.

Figure 44:
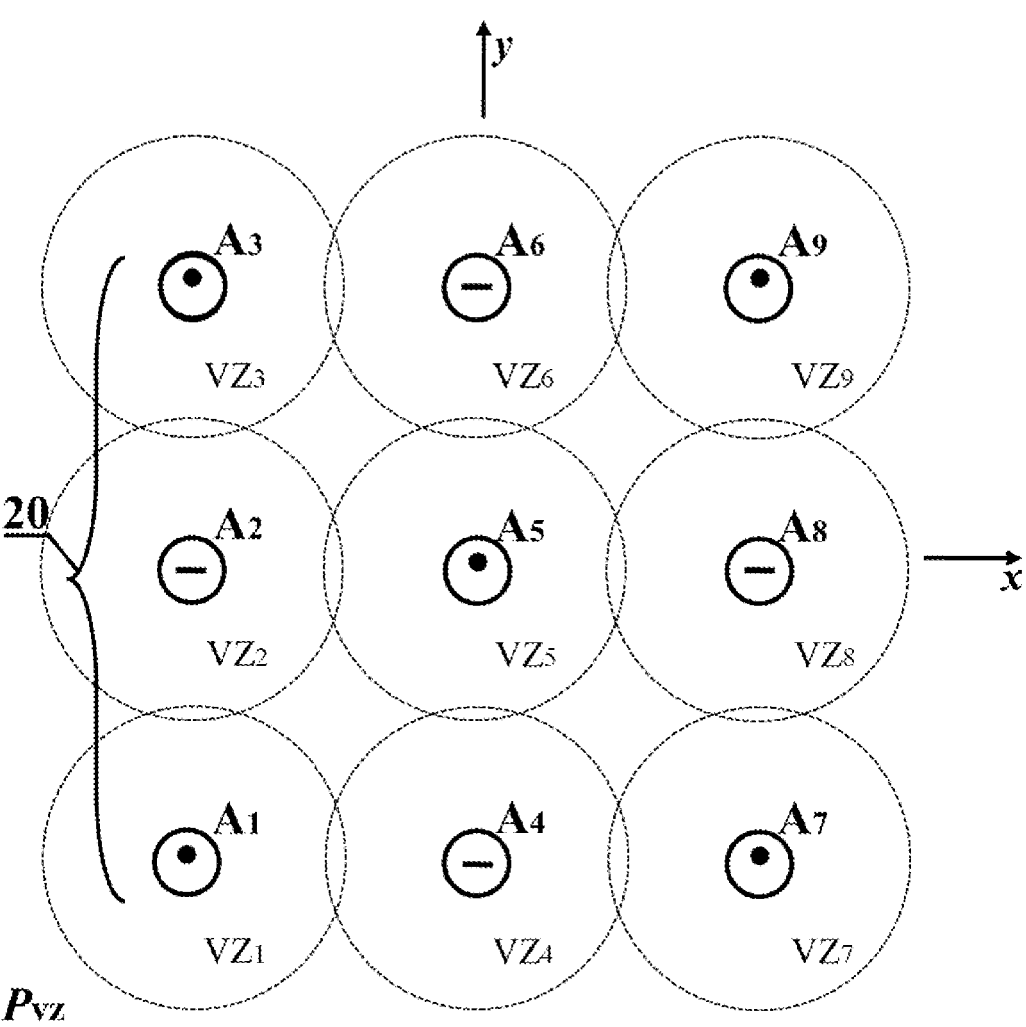
FIG. 44 shows an arrangement example of deflection apertures with orthogonal characteristics of linear polarization states corresponding to two-dimensional distributed viewing zones.
Figure 45:
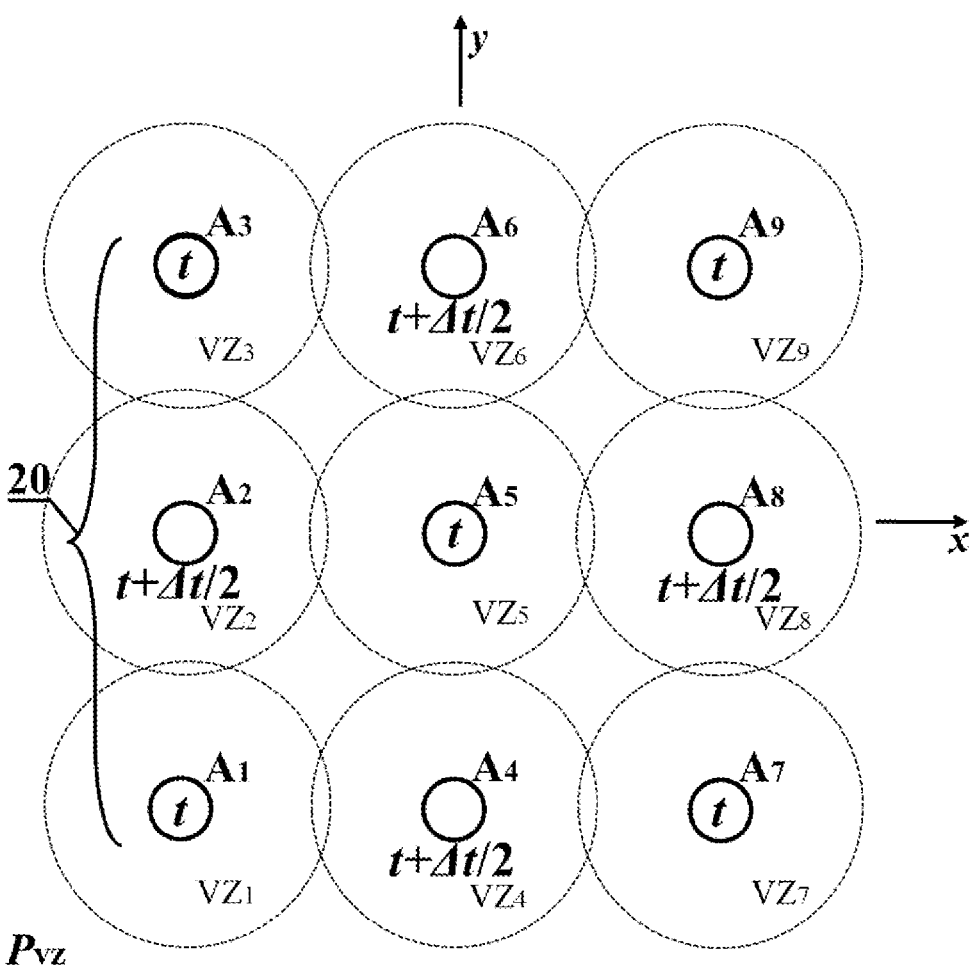
FIG. 45 shows an arrangement example of deflection apertures with temporal orthogonal characteristics corresponding to two-dimensional distributed viewing zones.
Figure 46:
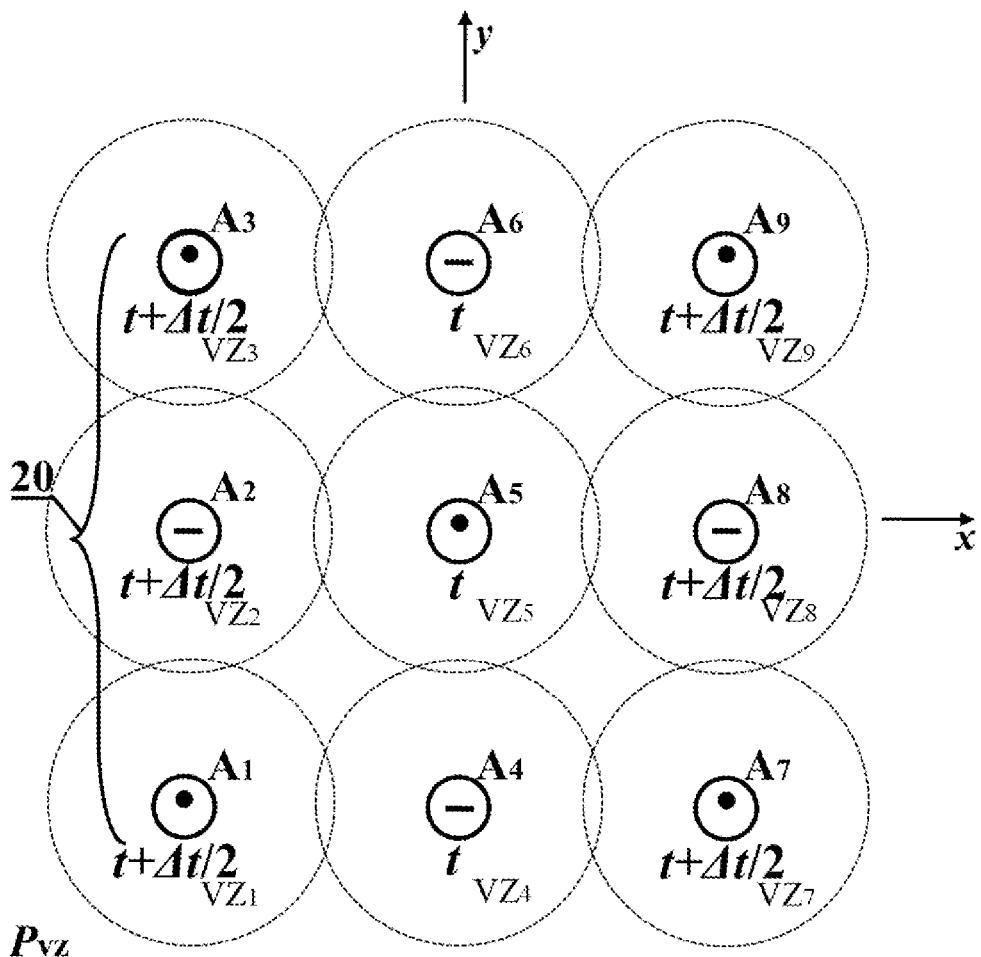
FIG. 46 shows an arrangement example of deflection apertures with orthogonal characteristics of combined linear polarization states and temporal orthogonal states, corresponding to two-dimensional distributed viewing zones.

There is crosstalk noise between light information projected to adjacent viewing zones. To suppress this kind of noise, the deflection apertures corresponding to adjacent viewing zones can be set with different orthogonal characteristics. A deflection aperture only allows light with corresponding orthogonal characteristics being deflected out, with incident light of non-corresponding orthogonal characteristics blocked. Meanwhile, light from a pixel or sub-pixel group is designed with orthogonal characteristics corresponding to the corresponding deflection aperture. FIG. 44 shows the deflection apertures with two linear polarization states as the orthogonal characteristics. These two linear polarization states are with polarization directions perpendicular to each other, and are denoted by "·" and "−", respectively. Specifically, the deflection aperture $A_1$ corresponding to the viewing zone $VZ_1$ is with "·" characteristics, the deflection aperture $A_2$ corresponding to the viewing zone $VZ_2$ is with "−" characteristics, the deflection aperture $A_3$ corresponding to the viewing zone $VZ_3$ is with "·" characteristics, the deflection aperture $A_4$ corresponding to the viewing zone $VZ_4$ is with "−" characteristics, the deflection aperture $A_5$ corresponding to the viewing zone $VZ_5$ is with "·" characteristics, the deflection aperture $A_6$ corresponding to the viewing zone $VZ_6$ is with "−" characteristics, the deflection aperture $A_7$ corresponding to the viewing zone $VZ_7$ is with "·" characteristics, the deflection aperture $A_8$ corresponding to the viewing zone $VZ_8$ is with "−" characteristics, the deflection aperture $A_9$ corresponding to the viewing zone $VZ_9$ is with "·" characteristics. The characteristics of a deflection aperture can be endowed by an attached polarizer. Correspondingly, the pixel group corresponding to the viewing zone $VZ_1$ emits "·" light, the pixel group corresponding to the viewing zone $VZ_2$ emits "−" light, the pixel group corresponding to the viewing zone $VZ_3$ emits "·"

light, pixel group corresponding to the viewing zone $VZ_4$ emits "−" light, the pixel group corresponding to the viewing zone $VZ_5$ emits "·" light, the pixel group corresponding to the viewing zone $VZ_6$ emits "−" light, pixel group corresponding to the viewing zone $VZ_7$ emits "·" light, the pixel group corresponding to the viewing zone $VZ_8$ emits "−" light, a pixel group corresponding to the viewing zone $VZ_9$ emits "·" light. The orthogonal characteristics can be two polarization states of left-handed polarization and right-handed polarization, or temporal orthogonal states in which the deflection apertures or sub-deflection apertures play functions at different time-points of a time period. FIG. 45 shows an example in which temporal orthogonal states are adopted as orthogonal characteristics. In a time period $t{\sim}t{+}\Delta t$, two time-points t and $t{+}\Delta t/2$ are taken. At the time-point t, only deflection aperture $A_1$ corresponding to the viewing zone $VZ_1$, deflection aperture $A_3$ corresponding to the viewing zone $VZ_3$, deflection aperture $A_5$ corresponding to the viewing zone $VZ_5$, deflection aperture $A_7$ corresponding to the viewing zone $VZ_7$, and deflection aperture $A_9$ corresponding to the viewing zone $VZ_9$ are activated for light deflecting; the pixel groups corresponding to the activated deflection apertures get light information being loaded by the control device 30 synchronously and other pixel groups are set with no light information being loaded. Similarly, at time-point $t{+}\Delta t/2$, only deflection aperture $A_2$ corresponding to the viewing zone $VZ_2$, deflection aperture $A_4$ corresponding to the viewing zone $VZ_4$, deflection aperture $A_6$ corresponding to the viewing zone $VZ_6$, and deflection aperture $A_8$ corresponding to the viewing zone $VZ_8$ are activated for light deflecting; the pixel groups corresponding to the activated deflection apertures get light information being loaded by the control device 30 synchronously, and other pixel groups are set with no light information being loaded. When the temporal orthogonal states are used as the orthogonal characteristic, a deflection aperture should have a gate switchable by the control device 30. For example, liquid crystal gates corresponding to different deflection apertures in an one-to-one manner can activate some deflection apertures and shut down other deflection apertures at a time-point by the control device 30. FIG. 45 explains the process with two time-points as an example in a time period. More time-points can work in a similar way. Furthermore, the orthogonal characteristics can take other types of states, or feasible combination of different types of states, as long as a deflection aperture with corresponding orthogonal characteristics can block light with other non-corresponding orthogonal characteristics. More kinds of orthogonal characteristics will make crosstalk noise between more adjacent deflection apertures be suppressed. FIG. 46 shows an example of combination of linear polarization states and temporal orthogonal states. As shown in FIG. 44 and FIG. 45, along x direction and y direction, the adjacent deflection apertures are with different orthogonal characteristics. But along the two directions with an included angle of 45° to the x direction and y direction, respectively, adjacent deflection apertures are with same orthogonal characteristics. Along these two directions, light information from a pixel group will probably reach to non-corresponding deflection aperture, as crosstalk noise. In FIG. 46, the combination of linear polarization states and temporal orthogonal states increase the number of orthogonal states. Along the two directions with an included angle of 45° to the x direction and y direction, the adjacent deflection apertures can take different orthogonal characteristics for better noise suppression.

Figure 47:
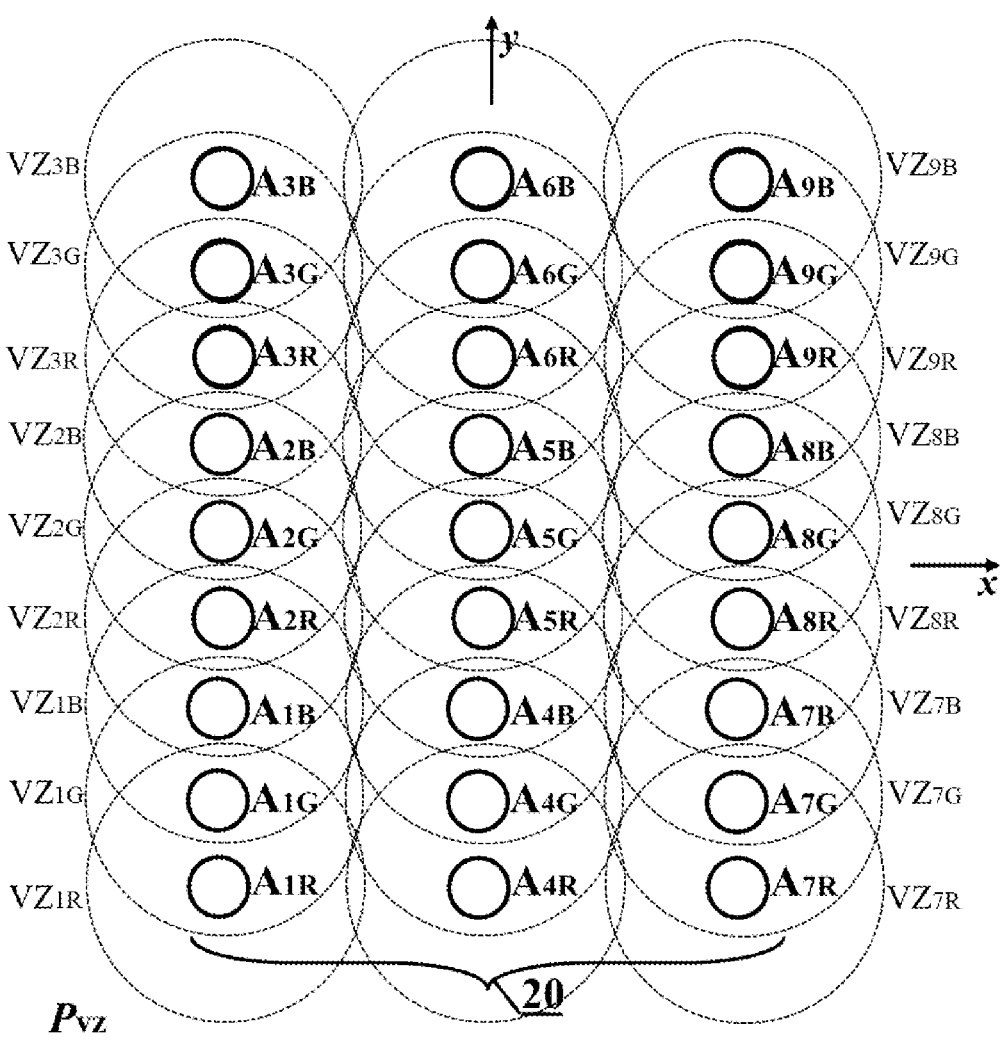
FIG. 47 shows an arrangement example of two-dimensional distributed viewing zones which correspond to different subpixel groups respectively.
Figure 48:
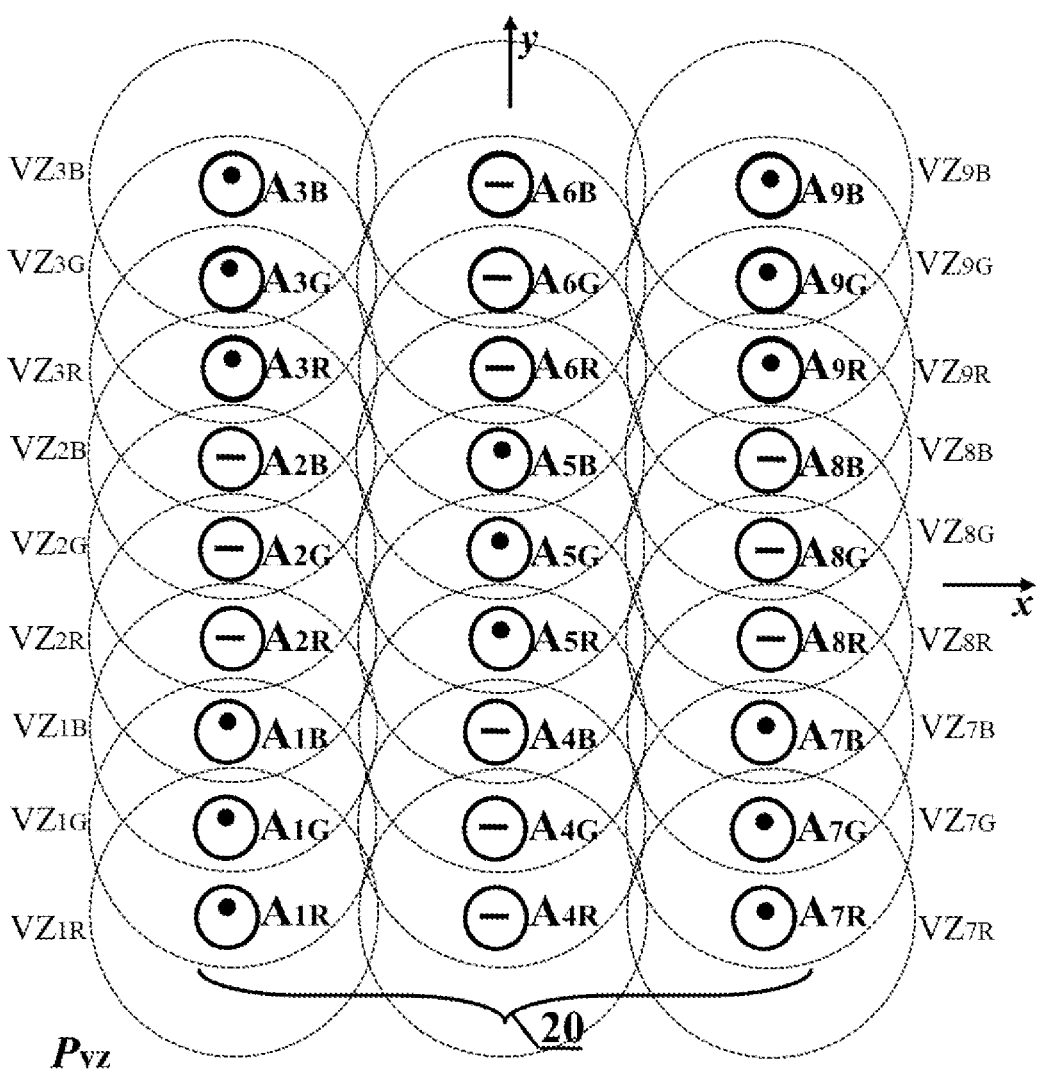
FIG. 48 shows an arrangement example of deflection apertures with orthogonal characteristics of linear polarization states corresponding to two-dimensional distributed viewing zones which correspond to different subpixel groups.

In above examples, in a multi-view display structure 10, the light-splitting device 102 guides light from different pixel groups to corresponding viewing zones. Furthermore, the light-splitting device 102 can also guide light from different subpixel groups to corresponding viewing zones, respectively. For example, a display screen 101 with three kinds of subpixels is adopted. Among them, R subpixel emits R light, G subpixel emits G light, and B subpixel emits B light. The R subpixels are divided into three subpixel groups, whose exit light is guided to viewing zones $VZ_{1R}$, $VZ_{2R}$, and $VZ_{3R}$ by the light-splitting device 102, respectively, as shown in FIG. 47. The G subpixels are divided into three subpixel groups, whose exit light is guided to viewing zones $VZ_{1G}$, $VZ_{2G}$, and $VZ_{3G}$ by the light-splitting device 102, respectively. The B subpixels are divided into three subpixel groups, whose exit light is guided to viewing zones $VZ_{1B}$, $VZ_{2B}$, and $VZ_{3B}$ by the light-splitting device 102, respectively. Similarly, a deflection aperture is set corresponding to each viewing zone. Similar as above discussed process in the Embodiment 1, VAC-free three-dimensional display gets implemented through the Maxwellian View or/and More-than-one-views-for-an-eye technique routes. Similarly, the deflection apertures corresponding to adjacent viewing zones can be designed with different orthogonal characteristics, so as to suppress crosstalk noise between light information projected to adjacent viewing zones. FIG. 47 takes three color orthogonal states as an example. A color filter attached to a deflection aperture only allows light with a color same to that of the corresponding subpixels passing through. FIG. 48 shows orthogonal characteristics combining three color orthogonal states and two linear polarization orthogonal states. In FIG. 47 and FIG. 48, the color of the light that can be deflected out by a deflection aperture is denoted by the second letter of subscript of viewing zone's name. Such as the deflection aperture $A_{1R}$ in FIG. 48, the color filter attached to this deflection aperture only allows R light incoming and outgoing.

Figure 49:
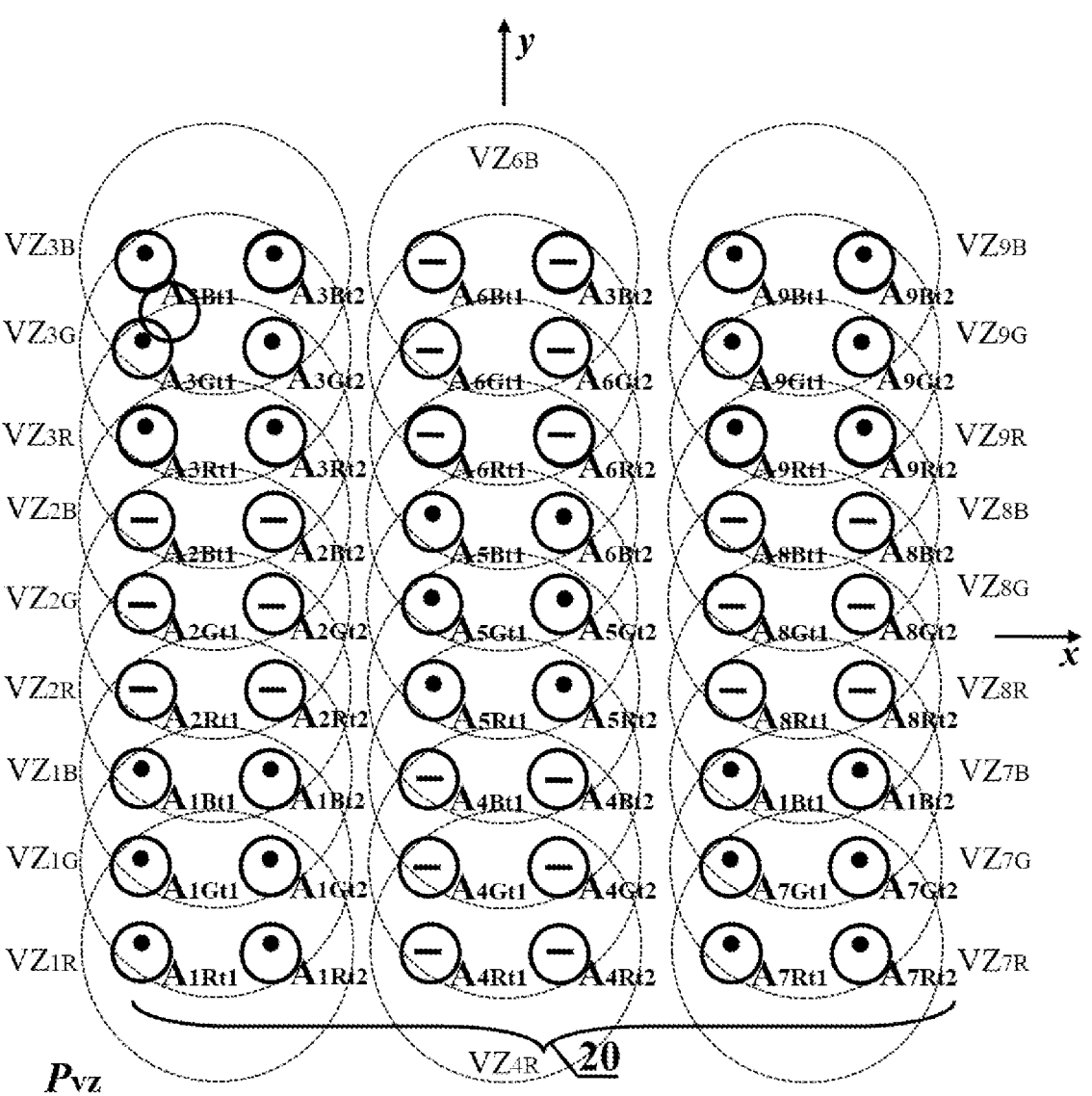
FIG. 49 show an arrangement example I of sub-deflection apertures corresponding to two-dimensional distributed viewing zones which correspond to different sub-subpixel groups.

A deflection aperture corresponding to a viewing zone can be replaced by more than one sub-deflection apertures, to increase the density of the viewing points. The density of the viewing points is also the density of the sub-deflection apertures. Sub-deflection apertures corresponding to a viewing zone are with different orthogonal characteristics. Pixels or subpixels corresponding to a viewing zone are divided into different sub-pixel groups or sub-subpixel groups. There is an one-to-one corresponding relationship between sub-pixel groups or sub-subpixel groups and the sub-deflection apertures. A sub-pixel group or sub-subpixel group project light of characteristics that can be deflected out by the corresponding sub-deflection aperture. FIG. 49 is with viewing zones same to those of FIG. 48. The difference lies in that K=2 sub-deflection apertures are set for each viewing zone of FIG. 49. Specifically, taking the viewing zone $VZ_{1R}$ as an example, which corresponds to K=2 sub-deflection apertures $A_{1Rt1}$ and $A_{1Rt2}$. The sub-deflection aperture $A_{1Rt1}$ is with an orthogonal characteristic combining a color orthogonal state and a temporal orthogonal state. In a time period of $t{\sim}t{+}\Delta t$, the sub-deflection aperture $A_{1Rt1}$ allows "·" R light being deflected out only at time-point t, with G light, B light and "−" light blocked. Similarly, the sub-deflection aperture $A_{1Rt2}$ allows "·" R light being deflected out only at time-point $t{+}\Delta t/2$, with G light, B light and "−" light blocked.

Figure 50:
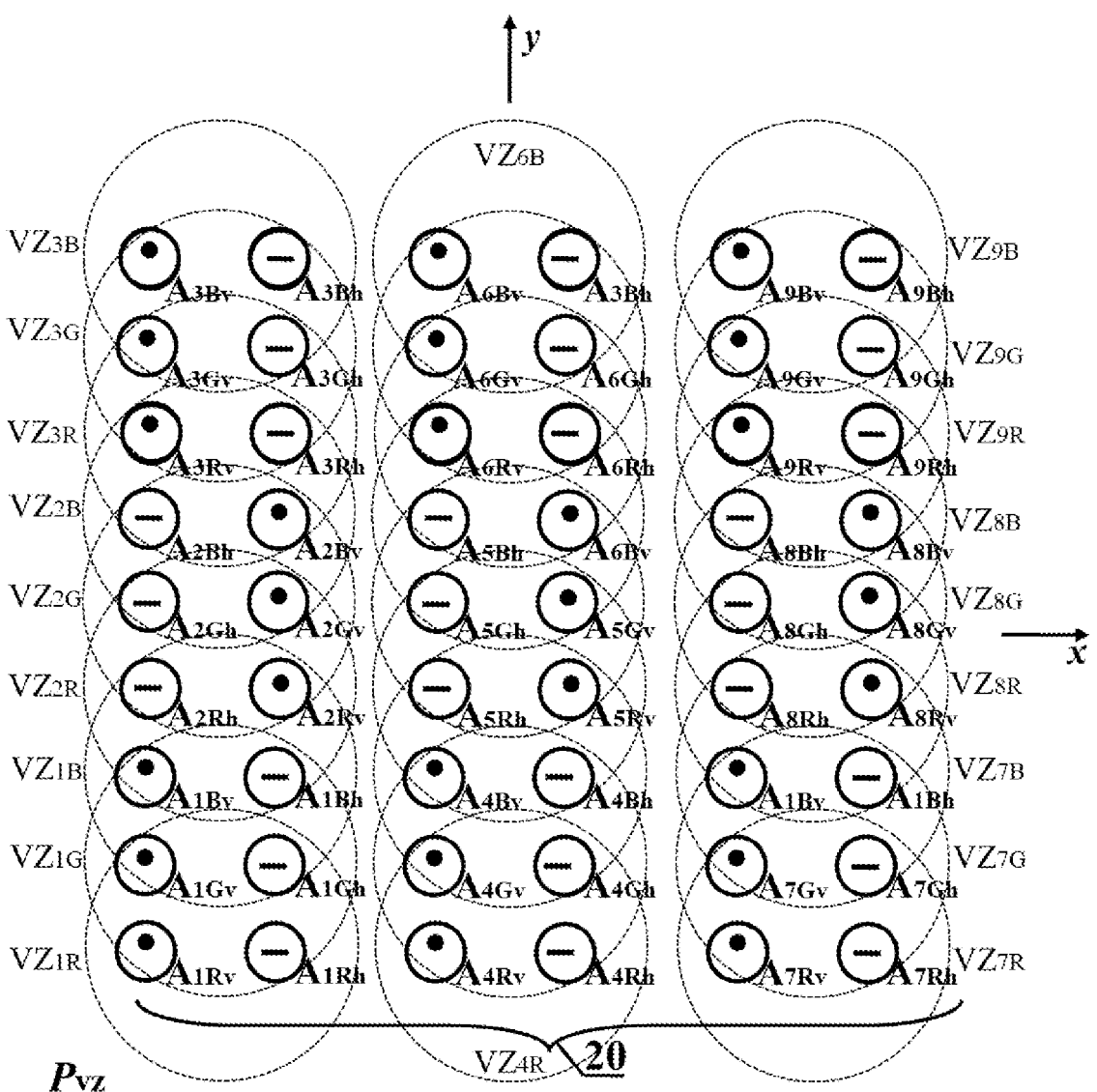
FIG. 50 shows an arrangement example II of sub-deflection apertures corresponding to two-dimensional distributed viewing zones which correspond to different sub-subpixel groups.

At the same time, for the nearest two viewing zones corresponding to subpixels of the same color, sub-deflection apertures corresponding to different viewing zones can be with different orthogonal characteristics. For example, $VZ_{1R}$ and $VZ_{4R}$ are two nearest viewing areas corresponding to R light. The sub-deflection apertures $A_{4Rt1}$ and $A_{4Rt2}$, which correspond to $VZ_{4R}$, allow only "–" light deflected out. Other sub-deflection apertures are designed according to the same law. Here, two sub-deflection apertures corresponding to a same viewing zone are with different temporal orthogonal characteristics. Under this condition, the sub-subpixel group for those different sub-deflection apertures corresponding to a same viewing zone is with identical subpixels, but work at different time-points in a time period. The sub-deflection apertures shown in FIG. 49 are with compound orthogonal characteristics of color orthogonal states, linear polarization states and temporal orthogonal states. The orthogonal characteristics of a sub-deflection aperture can also be other types of combinations, such as a combination of color orthogonal states and polarized orthogonal states, as shown in FIG. 50.

A deflection aperture or sub-deflection aperture can take a phase modulation function, to modulate the divergence angle of deflected light beams furtherly. For example, the surface of a reflection aperture or sub-reflection aperture is designed as a curved surface, playing a function of a reflective convergent lens, to reflect and collimate the deflected beams. Another example, all deflection apertures of the deflection-aperture array 20 (deflection apertures of the deflection-aperture array 20 is considered as L=1 deflection-aperture group) play function of a transmissive or reflective imaging lens jointly, for projecting an image of the multi-view display structure 10. To do this, a transmissive or reflective imaging lens is virtually placed at the position of the deflection-aperture array 20. The phase modulation function of a deflection aperture is consistent with the virtual imaging lens in corresponding spatial region. Furthermore, deflection apertures of the deflection-aperture array 20 can also be divided into L>1 groups, wherein a group is designed to jointly image the multi-view display structure to the corresponding depth. In a case, different groups correspond to different depth, for expanding the display depth with natural focusing. In the other case, the images projected by different groups are arranged end-to-end along the angular direction, for enlarging field of view. Here, partial overlapping between different images along the angular direction is allowable. These designments are applicable to sub-deflection apertures.

Above only are preferred embodiments of the present invention, but the design concept of the present invention is not limited to these, and any insubstantial modification made to the present invention using this concept also falls within the protection scope of the present invention. Accordingly, all related embodiments fall within the protection scope of the present invention. For example, in above figures, transmission-type display screens 101 are taken for example illustration. Obviously, reflection-type display device can also be used as the display screen 101.

The core idea of the present invention is to constrain the divergence angle of light beam from a multi-view display structure for realizing VAC-free Maxwellian view display or more-than-one-view-one-eye display, by small-size deflection apertures or sub-deflection apertures around the viewing zones. Multiple deflection apertures or sub-deflection apertures are designed for larger field of view, and orthogonal characteristics assigned to the deflection apertures or sub-deflection apertures for crosstalk noise suppression and more projected views.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents. For example, other optical structure which guides light from different groups of pixels or sub-pixels to different viewing zones can be used as the light-splitting device of this patent application. For another example, the deflection aperture or sub-deflection aperture itself can also have a phase modulation function to further optimize the divergence angle of defected beams. For another example, the optical waveguide structure described in this patent application is exemplified by a limit number of specific structures, but any optical waveguide structure being capable of providing the backlight as claimed in this patent, as well as other optical structures, can be used as the backlight-source assembly of this patent. The deflection aperture or sub-deflection aperture in present patent is with refractive or reflective function. They can also be through-holes, with no phase function. Actually, any modifications, equivalent substitution, improvement, etc. within the spirit and principles of the present invention will be within the protection of the present patent application.

What is claimed is:

1. A display module with a divergence angle of an outgoing beam constrained again by a corresponding deflection aperture, comprising:

a multi-view display structure arranged for a single eye of a viewer, comprising a display screen and a light-splitting device, wherein the light-splitting device guides light beams from different subpixel groups on the display screen to corresponding viewing zones, respectively, and subpixels of a same group are arranged throughout the display screen, and light beams from at least adjacent 3 subpixels are respectively guided to different viewing zones;a deflection-aperture array composed of deflection apertures, which respectively correspond to different viewing zones, wherein, each deflection aperture guides the projected light beams from the corresponding subpixel group, which corresponds to the viewing zone being corresponded by this deflection aperture, to transmit to the observing zone for the eye through deflecting an incident light beam, wherein, the deflection aperture corresponding to each viewing zone consists of N>2 sub-deflection apertures, which respectively allows N kinds of mutually different orthogonal characteristic lights to be deflected out, and the subpixel group corresponding to each viewing zone is divided into N sub-subpixel groups, which correspond to these N sub-deflection apertures in an one-to-one manner, and each sub-subpixel group only projects light of orthogonal characteristic capable of being deflected out by the corresponding sub-deflection aperture, and the orthogonal projection of a sub-deflection aperture on the plane perpendicular to the eye's visual direction is smaller than 2.5 mm along all directions, wherein at least two sub-deflection apertures from different viewing zones are turned on at a time point; and a control device connected with the multi-view display structure for refreshing the display screen, wherein the information displayed by a subpixel at a time point is a projection information of a scene to be displayed along a projection direction of the subpixel, wherein the projection direction of the subpixel is the propagation direction of a light beam which is from the subpixel and reaches the observing zone for the eye, wherein for a displayed object point, at least one passing-through light beam is guided into the pupil of the eye, wherein the light-splitting device is a single lenticular grating consisting of one-dimensional aligned cylindrical lenses, or a slit grating, or a microstructure array composed of microstructures, or a converging structure when a backlit-type display device with a backlight-source assembly is adopted, wherein said microstructures correspond to the subpixels of display screen in a one-to-one manner, and each microstructure deflects the propagation direction of the incident or exit beam to or from the corresponding subpixel, to guide light beams from a or subpixel group to the corresponding viewing zone, and wherein said backlight-source assembly projects a plurality of backlights sequentially, and said converging structure converges backlights to different viewing zones, with a backlight corresponding to only a viewing zone at a time point.

2. The display module with the divergence angle of the outgoing beam constrained again by the corresponding deflection aperture according to claim 1, wherein the display screen of the multi-view display structure is a backlit-type display device, with backlights provided by a backlight-source assembly.

3. The display module with the divergence angle of the outgoing beam constrained again by the corresponding deflection aperture according to claim 1, wherein the display screen is a backlit-type display device and a backlight-source assembly providing a plurality of backlights to the display screen is an optical waveguide structure, and wherein the backlight-source assembly projects backlights along different directions at M time-points of a time period respectively, where M≥2.

4. The display module with the divergence angle of the outgoing beam constrained again by the corresponding deflection aperture according to claim 3, wherein the backlight-source assembly includes a light source, a collimating device, an entrance pupil, an optical waveguide body, a coupling-in device, reflective surfaces and, a coupling-out device, an exit pupil, and a timing deflector, and wherein, the exit light from the light source is collimated by the collimating device, then enters the coupling-in device through the entrance pupil; the coupling-in device guides the light in the optical waveguide body to the coupling-out device, by reflections of the reflection surfaces and; the coupling-out device makes the light be coupled out of the optical waveguide body through the exit pupil at a parallel state; the timing deflector time-sequentially deflects the incident light from the exit pupil under the control of the control device, to provide backlights along different directions.

5. The display module with the divergence angle of the outgoing beam constrained again by the corresponding deflection aperture according to claim 3, wherein the backlight-source assembly includes multiple timing light sources which time-sequentially turned on under the control of the control device, a collimating device, an entrance pupil, an optical waveguide body, a coupling-in device, reflective surfaces and, a coupling-out device, and an exit pupil, and wherein, a light exiting from a light source is collimated by the collimating device, then enters the coupling-in device through the entrance pupil; the coupling-in device guides the light in the optical waveguide body to the coupling-out device, by reflections of the reflection surfaces and; the coupling-out device makes the light be coupled out of the optical waveguide body through the exit pupil at a parallel state.

6. The display module with the divergence angle of the outgoing beam constrained again by the corresponding deflection aperture according to claim 3, wherein the display screen is attached with a unidirectional scattering film for scattering incident or exit light to or from a subpixel along an one-dimensional direction.

7. The display module with the divergence angle of the outgoing beam constrained again by the corresponding deflection aperture according to claim 3, wherein a converging device is located in front of or behind the display screen for converging the incident light.

8. The display module with the divergence angle of the outgoing beam constrained again by the corresponding deflection aperture according to claim 3, wherein the back-light- source assembly consists of more than one optical waveguide structures, with different optical waveguide structures projecting backlight to different segments of the display screen.

9. The display module with the divergence angle of the outgoing beam constrained again by the corresponding deflection aperture according to claim 1, wherein the orthogonal characteristic are two linear polarization states whose polarization directions are perpendicular to each other, or two polarization states of left-handed circular polarization and right-handed circular polarization, or color orthogonal states which respectively allow lights with different wavelengths being deflected out, or combination of two or more of the two linear polarization states, the two polarization states, temporal orthogonal states and color orthogonal states.

10. The display module with the divergence angle of the outgoing beam constrained again by the corresponding deflection aperture according to claim 1, wherein the display module comprises a relay device to guide the projected light from the multi-view display structure to propagate through the deflection aperture array to the observing zone for the eye, and wherein the orthogonal projection of each sub-deflection aperture's image with respect to the relay device on the plane perpendicular to the eye's visual direction is smaller than 2.5 mm along all directions.

11. The display module with the divergence angle of the outgoing beam constrained again by the corresponding deflection aperture according to claim 1, wherein the relay device is a lens, or a lens group, or a phase element capable of projecting an image of the multi-view display structure.

12. The display module with the divergence angle of the outgoing beam constrained again by the corresponding deflection aperture according to claim 1, wherein the relay device is an eyeglass structure which guides light by reflecting the light.

13. The display module with the divergence angle of the outgoing beam constrained again by the corresponding deflection aperture according to claim 1, wherein the relay device is a free-form surface device.

* * * * *